United States Patent
Uno et al.

(10) Patent No.: US 6,995,849 B2
(45) Date of Patent: Feb. 7, 2006

(54) DISPLACEMENT SENSOR

(75) Inventors: Tetsuya Uno, Kyoto (JP); Hiroaki Takimasa, Kyoto (JP); Takahiro Suga, Kyoto (JP)

(73) Assignee: Omron Corporation, Kyoto (JP)

(*) Notice: Subject to any disclaimer, the term of this patent is extended or adjusted under 35 U.S.C. 154(b) by 147 days.

(21) Appl. No.: 10/366,687

(22) Filed: Feb. 14, 2003

(65) Prior Publication Data

US 2003/0179387 A1   Sep. 25, 2003

(30) Foreign Application Priority Data

Feb. 15, 2002 (JP) .............................. 2002-038593

(51) Int. Cl.
*G01B 11/24* (2006.01)

(52) U.S. Cl. ...................................... 356/609; 356/624

(58) Field of Classification Search ................ 356/609, 356/623, 624; 250/201.2, 201.6, 559.22, 250/559.23
See application file for complete search history.

(56) References Cited

U.S. PATENT DOCUMENTS

| | | | | |
|---|---|---|---|---|
| 3,715,165 A | * | 2/1973 | Smith | ........................ 356/609 |
| 3,847,485 A | * | 11/1974 | Zanoni | ........................ 356/624 |
| 4,017,188 A | * | 4/1977 | Sawatari | ...................... 356/609 |
| 4,079,248 A | * | 3/1978 | Lehureau et al. | ......... 250/201.3 |
| 4,730,927 A | * | 3/1988 | Ototake et al. | ............. 356/609 |
| 5,216,235 A | * | 6/1993 | Lin | .......................... 250/201.6 |
| 5,991,040 A | | 11/1999 | Doemens et al. | |

FOREIGN PATENT DOCUMENTS

| | | |
|---|---|---|
| JP | 7-113617 A | 5/1995 |
| JP | 10-512054 | 11/1998 |

* cited by examiner

Primary Examiner—Richard A. Rosenberger
(74) Attorney, Agent, or Firm—Foley & Lardner LLP

(57) ABSTRACT

A displacement sensor is provided with: a light-projection unit; a light-receiving unit having a light-shielding mask and a light-receiving element; a first light-converging element which converges luminous fluxes released from the light-projection unit on a measuring object; a second light-converging element which converges reflected luminous fluxes on the light-receiving unit; a first light-path control element which allows a projection-light light axis and a receiving-light light axis to be coaxially set on the measuring object side; and a light-path length sweeping mechanism which continuously changes a light-path length from the light-projection unit to the measuring object and a light-path length from the measuring object to the light-receiving unit.

16 Claims, 48 Drawing Sheets

DISPLACEMENT SENSOR

BACKGROUND OF THE INVENTION

1. Field of the Invention

The present invention relates to a displacement sensor which measures a displacement of a measuring object in a non-contact state.

2. Description of the Background Art

In the technical field such as FA (factory automation), many displacement sensors have been used in positional controlling processes for manufacturing devices used for manufacturing products or positional controlling processes for products with respect to the manufacturing devices, or inspection processes for products and the like. These displacement sensors generally use a triangulation surveying system. In this system, light is applied to a measuring object, and the light reflected by the measuring object is detected by a position detection element and the like, and based upon the positional change in the center of gravity of a light-receiving spot on the position detection element that is changed in accordance with the displacement of the measuring object, the amount of displacement is measured.

In this displacement sensor in the triangulation surveying system, it is not possible to maintain the size of the light spot applied on the measuring object at a fine spot size corresponding to a diffraction limit. As shown in FIG. 48, even when coherent light from, for example, a laser 1001 serving as a light source is converged by using a lens 1002, the spot size corresponding to the diffraction limit is obtained only at one point indicated by reference numeral 1006, as indicated by a solid line, and the spot size at almost all the other positions is expanded. Even when the reflected light derived from such expanded irradiation light on the measuring object 1005 is converged on a position detection element 1004 by a lens 1003, the resulting light-receiving spot has an expanded form as indicated by a broken line.

Here, any measuring object has irregularities in reflection intensity due to fine roughness on the surface and color unevenness as long as it does not have a complete mirror surface. Consequently, luminance irregularities occur in the reflected light spot on the measuring object, resulting in a positional change in the center of gravity of the light-receiving spot on the position detection element. In other words, even when the amount of displacement in the measuring object is 0, a positional difference on the surface of the measuring object causes a change in the position of the center of gravity of the light-receiving spot on the position detection element due to irregularities in the reflection intensity, with the result that the displacement measured value as the result of measurements becomes different. This causes a measuring error, and disturbs measuring processes with high precision.

With respect to a displacement sensor that prevents this measuring error, conventionally, a device has been proposed in Japanese Patent Application Laid-Open No. 7-113617. In the technique disclosed in this gazette, different from the triangulation surveying system, by sweeping the lens in the displacement measuring direction, the light-converging position of irradiation luminous fluxes is changed, and based upon the fact that when the light-converging position of the irradiation luminous fluxes is coincident with the position of the measuring object, the size of the light-receiving spot of the reflected light is minimized, the amount of displacement is measured. In accordance with this method, since the position of the center of gravity of the light-receiving spot of the reflected light is not utilized, it is possible to carry out displacement measurements without having any adverse effect from the irregularities in reflection intensity.

However, in the displacement sensor of this type, since the sweeping process is carried out by using the lens attached to a tuning fork, there is a limitation in increasing the sweeping frequency. This is because, the lens, which needs to have a predetermined size so as to reduce the spot diameter that is determined by the diffraction limit in order to maintain a sufficient amount of receiving light, cannot be miniaturized. This causes a reduction in the natural frequency, making it difficult to increase the sweeping frequency. The low sweeping frequency makes longer the time required for measurements for the amount of displacement at one point. In the case of measurements at a plurality of points or in the case when measured values at the same point are averaged to obtain measured values with higher precision, the total measuring time becomes longer in proportion to the number of measuring points or the number of averaging processes.

Further, the displacement sensor of this type is often used for measurements of the shape of an object with high precision, and in such a case, a great number of measuring points are required, and averaging processes for measurements with higher precision are often required. In an attempt to measure the shape of a measuring object with high precision, although it depends on applications, the total measuring time often reaches an order of seconds to minutes, causing a step that limits the number of products. When some of the inspection processes are omitted in order to shorten the total measuring time, defective products might escape from rejection, and when the number of averaging processes of measured values is reduced, there is degradation in the measuring precision.

Moreover, since the natural frequency is determined integrally by the lens and tuning fork, and since the sweeping frequency is virtually determined by the natural frequency, it is not possible to easily alter the detection distance and the displacement measuring range by exchanging lenses. This is because the exchange of lenses requires the alteration in the sweeping frequency, causing changes in the processing circuits, the tuning-fork-driving coils and the like. In an attempt to make changes in the detection distance and displacement measuring range without changing the sweeping frequency, it is necessary to change the optical characteristics of the lens in an equalizing manner by adding a number of lenses in the light path in a separated manner with the lens integral with the tuning fork being maintained as it is, or to redesign the entire optical system so that, after the lens to be subjected to the sweeping process having been altered, the sweeping frequency is maintained at the same value. When a number of lenses are added, the outside shape becomes larger, causing high costs. In the case when the sensor is redesigned and manufactured in response to the detection distance and displacement measuring range corresponding to the changed measuring object and shape of the device, high developing costs and the like are required, also resulting in high costs.

The present invention has been devised to solve the above-mentioned conventional problems, and its objective is to provide a displacement sensor which can carry out displacement measuring processes with high precision without receiving virtually any adverse effects from irregularities in the reflection intensity, and shorten the time required for measurements.

Further, another objective of the present invention is to provide a displacement sensor which has an arrangement capable of exchanging lenses so that the detection distance and the displacement measuring range are easily altered, and is also adapted for various individual applications.

Moreover, still another objective of the present invention is to provide a displacement sensor which is designed to easily select lenses of different kinds at the time of manufacturing processes, and easily manufactured at low costs while being adapted for a combination selected from a wide range of combinations between the detection distance and the displacement measuring range.

SUMMARY OF THE INVENTION

Referring to reference numerals of FIGS. 1 and 2 that show two examples of aspects for convenience of explanation, the following description will discuss the present invention. In the case when reference numerals are different between FIG. 1 and FIG. 2, the reference numeral of FIG. 1 is placed at the preceding part of slash "/" and that of FIG. 2 is placed at the succeeding part thereof. The displacement sensor of the present invention is provided with: a light-projection unit (1); a light-receiving unit (9) having a light-shielding mask (901a) and a light-receiving element (902a); a first light-converging element (3, 5, 7/14) which converges luminous fluxes released from the above-mentioned light-projection unit on a measuring object; a second light-converging element (7, 5, 3/15) which converges luminous fluxes reflected from the above-mentioned measuring object (8) on the above-mentioned light-receiving unit (9); a first light-path control element (2) which is placed in a projection-light path extending from the above-mentioned light-projection unit (1) to the measuring object (8) as well as in a receiving-light path extending from the measuring object (8) to the above-mentioned light-receiving unit (9), and allows a projection-light light axis specified by the above-mentioned first light-converging element (3, 5, 7/14) and the above-mentioned light-projection unit (1) and a receiving-light light axis specified by the above-mentioned second light-receiving element (7, 5, 3/15) and the above-mentioned light-receiving unit (9) to be coaxially set on the measuring object (8) side; and a light-path length sweeping mechanism (6) which is placed in a light path in which the projection-light light axis and the receiving-light light axis are set coaxially as well as at a position in which the luminous fluxes in the projection-light path and the luminous fluxes in the receiving-light path are set to be non-collimated, and continuously changes a light-path length from the light-projection unit to the measuring object and a light-path length from the measuring object to the light-receiving unit. The above-mentioned light-shielding mask (901a) is placed in a light path from the above-mentioned second light-converging element (7, 5, 3/15) to the above-mentioned light-receiving element (902a) so that, when the position at which luminous fluxes reflected from the above-mentioned measuring object (8) are converged by the above-mentioned second light-converging element (7, 5, 3/15) is changed by an operation of the above-mentioned light-path length sweeping mechanism (6), the ratio at which one portion of the reflected luminous fluxes is light-shielded by the above-mentioned light-shielding mask (901a) is changed. The above-mentioned light-receiving element (902a) is allowed to receive luminous fluxes that have been transmitted through the above-mentioned light-shielding mask (901a). The displacement sensor of the present invention has the above-mentioned arrangement so that information with respect to a distance up to the measuring object (8) is obtained based upon the output signal of the light-receiving element (902a) that is varied by the operation of the above-mentioned light-path length sweeping mechanism (6).

The following description will discuss the operation principle of the displacement sensor of the present invention. Luminous fluxes released from the light-projection unit are converged on the measuring object through the first light-converging element, and the reflected luminous fluxes are converged on the light-shielding mask of the light-receiving unit by the second light-converging element. Here, various shapes of the light-receiving mask are proposed, and, for example, in the case of a mask with a pinhole formed therein, during the process in which the spot size of the reflected luminous fluxes is changed on the shielding mask, at the time when the spot size is minimized with the most portion of the reflected luminous fluxes being allowed to pass through the pinhole, the amount of receiving light of the light-receiving unit is maximized.

The light-converging position of luminous fluxes applied to the measuring object is varied by the operation of the light-path-length sweeping mechanism. Here, the light-path length refers to a light-path length from the light-projection unit to the measuring object as well as a light-path from the measuring object to the light-receiving unit. For example, in the case when the light-path-length sweeping mechanism is maintained in a neutral state, supposing that the measuring object is located at such a position that the luminous fluxes, released from the light-projection unit, are converged thereon, when the light-path-length sweeping mechanism comes to shorten the light-path length (FIG. 3), the luminous fluxes have not been converged yet (supposing that there is no measuring object, converged at a position farther from the corresponding position thereof).

Here, in the case when the measuring object is a mirror face object, the reflected luminous fluxes from the measuring object are not completely converged on the light-shielding mask as shown in FIG. 4, causing a reduction in the amount of receiving light in the light-receiving unit since the spot size of the luminous fluxes on the light-shielding mask is comparatively large.

In the case when the measuring object is a diffusion reflective object, since the luminous fluxes on the measuring object are expanded (FIG. 5) and since the reflected luminous fluxes are not converged to form an image on the light-shielding mask (that is, to form an image at a position closer to the light-receiving element side than the light-shielding mask, the amount of receiving light of the light receiving unit also becomes smaller.

In contrast, in the case when the light-path-length sweeping mechanism makes the light-path length longer, the light-converging positions of the reflected luminous fluxes from the irradiation luminous fluxes and the measuring object are allowed to shift toward respectively opposite sides to the above-mentioned positions with respect to the light-converging position of the reflected luminous fluxes in the neutral state of the light-path-length sweeping mechanism; thus, in the same manner as the case of short light-path length, the luminous fluxes on the light-shielding mask become comparatively larger, resulting in a reduction in the amount of receiving light.

As described above, in the case when a pinhole is formed in the light-shielding mask, in both of the cases when the measuring object is an mirror face object and when it is a diffusion reflective object, the amount of receiving light is maximized when the light-converging position of the irradiation luminous fluxes is made coincident with the measuring object by the operation of the light-path-length sweeping mechanism, resulting in a maximum output signal from the light-receiving unit.

The displacement is found from the above-mentioned output signal in the following method. FIG. 6 shows a change in the light-path length in response to the operation of the light-path length sweeping mechanism as well as a change in the output signal in the light-receiving unit. The maximum value of the output signal is obtained when the light-path length sweeping mechanism has carried out a sweeping process of the light-path length to make the irradiation luminous fluxes converged on the measuring object. In FIG. 6, the amount of change in the light-path length at this time is set to X1. The light-converging position of the irradiation luminous fluxes on the measuring subject provides a one-to-one correspondence with respect to the amount of change in the light-path length so that, by preliminarily finding an equation which converts the amount of change in the light-path length due to the sweeping process to the amount of change in the light-converging position, it is possible to find the amount of displacement in the measuring object from the amount of change in the light-path length at the time when the output signal of the light-receiving unit is maximized, by always measuring the amount of change in the light-path length directly or indirectly using a sensor or the like.

Not limited to the arrangement having a pinhole, the light-shielding mask may be constituted by knife edges with two-division photodiodes (element in which two photodiodes are placed adjacent to each other) being used as a light-receiving element; thus, displacement measurements can also be carried out. The following description will discuss the principle in this case.

FIG. 7 shows a state corresponding to the above-mentioned state of FIG. 1 in which irradiation luminous fluxes have been converged on the measuring object. Here, the tip of the knife edge is placed in a manner so as to coincide with the light-converging position of the reflected luminous fluxes, and the two-division photodiodes serving as the light-receiving element are set so as to make the amounts of receiving light of the two photodiodes equal to each other. FIG. 8 shows a state in which the light-path length is shortened due to the sweeping process of the light-path length, that is, a state corresponding to the state of FIG. 4, with luminous fluxes directed toward the photodiode on the left side being shielded by the knife edge. In contrast, FIG. 9 shows a state in which the light-path length is lengthened, with luminous fluxes directed toward the photodiode on the right side being shielded by the knife edge. As clearly shown by these figures, when irradiation luminous fluxes are converged on the measuring object, the two photodiodes of the two-division photodiode are allowed to have the same output, while these are not converged thereon, the output of one of the photodiodes becomes greater. Therefore, in order to find displacement by using the output signals, the displacement measuring processes can be carried out in the same manner by replacing the point of time when the output of the light-receiving element has a peak with the point of time when the outputs of the two photodiodes of the two-division photodiode are made coincident with each other in the above-mentioned method.

In accordance with this invention, since the measurements are carried out based upon the light-path length when the irradiation luminous fluxes are formed into a fine spot on the measuring object, it is possible to carry out displacement measurements without being adversely influenced by irregularities in reflection intensity of the measuring object. Moreover, different from a method in which the light-converging position of irradiation luminous fluxes is changed with the light-path length from the light-projection unit to the measuring object being maintained at a constant value, such as a method for sweeping a lens having large size and mass, the light-converging function is carried out by using a light-converging element that is immovable, with the light-path length sweeping mechanism that has a function for changing the light-path length without its own light-converging function being placed in a separate manner; thus, it is possible to achieve small size and light weight of the light-path length sweeping mechanism. Therefore, it becomes possible to increase the sweeping frequency, and also to shorten the time required for measurements for one point. The response time refers to time required from the start of the measurements to the output of the measured results, and in the present sensor, the time required for the outputting process is very short in comparison with the measuring time, regardless of the number of the measuring points including averaging processes, with the most of the response time being occupied by the measuring time; thus, by shortening the time required for the measurements using the present aspect, it becomes possible to achieve measurements with a short response time. Moreover, in the case of a fixed response time, it is possible to achieve measurements that are less susceptible to measuring errors with high precision by increasing the number of averaging processes.

With respect to the light-projection unit, when the light-emitting area of the light source is large, it is preferable to make the actual light-emitting area smaller by using such a method as to allow light emitted from the light source to once pass through a pinhole. This is because when the light-emitting area is too large, the minimum spot size of luminous fluxes to be formed on the measuring object when the sweeping process of the light-path length is carried out by the light-path length sweeping mechanism becomes large and susceptible to being adversely influenced by irregularities in reflection intensity of the measuring object. Here, the light-projection unit in "the light-projection light axis determined by the first light-converging element and the light-projection unit" refers to a light-emitting position of the light source, and the center of the light-emitting face and the center of gravity thereof are typically adopted as the light-emitting position. In the case when the pinhole is used as described above, the position of the center of the pinhole may be used as such a position.

In the case when the light-shielding mask is prepared as a mask having a pinhole formed therein, since it is only necessary for the light-receiving element to receive luminous fluxes that have passed through the pinhole, an element such as a photodiode for converting the light intensity to a current and a voltage may be used for this purpose. In this case, the term, "the light-receiving light axis determined by the second light-converging element and the light-receiving unit" more specifically refers to a light-receiving light axis determined by the second light-converging element and the center of the pinhole.

Further, in the case when the light-shielding mask is prepared as a mask formed by knife edges, with respect to the light-receiving element, a two-division photodiode whose output is varied depending on a change in the position of incident light, a photodiode array the number of divisions of which is further increased, a position detection element (PSD), a CCD and the like are used so that the change in the position of luminous fluxes that have passed through the knife edges can be obtained as a change in the output. In the case of the knife edges, "the light-receiving unit" which determines the light-receiving light axis in "the light-receiving light axis determined by the second light-converging element and the light-receiving unit" is not one point preliminarily specified, such as the above-mentioned pinhole, but any one point (more strictly, a point slightly apart from the knife edge) along the edge line of knife edge. In a state where the adjustment of the optical system has been completed, the center position of reflected luminous fluxes from the measuring object is supposed to coincide with any one point along the edge line of the knife edge, and in this case, the light-projection light axis and the light-receiving light axis are coaxially maintained by the first light-path control element on the measuring object side. In the case when, for the reason such as insufficient adjustments in the optical system, the center position of reflected luminous fluxes from the measuring object is not coincident with any one point along the edge line of the knife edge, it is considered that the closest point to the center position of the reflected luminous fluxes on the edge line of the knife edge defines the light-receiving light axis.

The light-converging element is an optical element, such as a concave face mirror and a hologram, having a light-converging function.

The term, 'converging light', in "the first light-converging element which converges luminous fluxes released from the light-projection unit on the measuring object" does not refer to a state in which light-converging is always carried out on the measuring object. This refers to a state in which a light-path length sweeping mechanism, which is placed between the light-projection unit and the measuring object, allows the light-converging position to vary due to the sweeping process in terms of time, and during the sweeping process, the light-converging position is made coincident with the measuring object instantaneously.

The light-path control element is an optical element, such as a half mirror and a polarizing beam splitter, a grating and a hologram that allows one portion of luminous fluxes to branch in a different direction by utilizing diffraction, and a Wollaston prism that makes the direction of released luminous fluxes different depending on the polarizing direction by utilizing birefringence, which has a function for releasing incident luminous fluxes in a certain direction at a predetermined rate with one portion thereof being simultaneously released in another direction at a predetermined rate.

The light-path length sweeping mechanism continuously changes the light-path length from the light source to the measuring object as well as the light-path length from the measuring object to the light-receiving unit, in terms of time. With respect to the light-path length sweeping mechanism, various devices, such as a device that has a reflection face attached onto a tuning fork or a cantilever beam so as to be vibrated, a device that has a reflection face that is reciprocally moved in perpendicular directions to its face by using a voice coil motor and a piezoelectric element and a devise that applies an external voltage to an electro-optical crystal to change the refractive index of the medium, may be used.

In another aspect of the present invention, as indicated by reference numerals in FIG. 10 that shows one example thereof, the displacement sensor is provided with: a sixth light-converging element (13) that serves as the first light-converging element and second light-converging element, and the first light-path control element (2) is placed between the sixth light-converging element (13) as well as the light-projection unit (1) and the light-receiving unit (9).

The optical system shown in FIG. 1 also shows one example of this aspect, and the light-converging element 3, 5, 7 shows one example of the sixth light-converging element.

The first light-converging element and the second light-converging element are made compatible with each other (commonly used) so that it is possible to reduce the number of parts, and also to reduce costs. Simultaneously, it also becomes possible to achieve a miniaturization of the device.

Moreover, in the case when, for example, upon using a pinhole in the light-shielding mask, the spot size and the corresponding size of the pinhole are made extremely small, the optical positional relationship between the pinhole and the light-emitting point might have an offset due to a temperature change and the like, failing to operate correctly; however, the first light-converging element and the second light-converging element are made compatible with each other (commonly used) so that it becomes possible to reduce the number of optical parts that determine the optical positions between the pinhole and the light source, to shorten the distance between the first light-path control element and the light-projection unit as well as the distance between the first light-path control element and the pinhole, and consequently to reduce the amount of relative positional offsets among the light-projection unit, the pinhole and the first light-path control element due to a temperature and the like. In other words, it becomes possible to detect a temperature change stably.

As shown in FIG. 10, the light-path length sweeping mechanism may be placed between the sixth light-converging element (13) and the measuring object (8), or as shown in FIG. 11, it may be placed between the sixth light-converging element (13) and the first light-path control element (2).

In another preferable aspect of the present invention, as indicated by reference numerals in FIG. 12 that shows one example thereof, the light-path length sweeping mechanism (6) is provided with: a reflection face (6) that is placed perpendicularly to the light axis and allowed to shift along the light-axis direction that has been coaxially set, and a second light-path control element (4*a*) which directs luminous fluxes released from the light-projection unit (1) to the reflection face, directs luminous fluxes reflected from the reflection face (6) to the measuring object (8), and also directs luminous fluxes reflected from the measuring object (8) in the reversed direction along the same light path as the light path through which the luminous fluxes have been directed to the measuring object (8).

The optical system as shown in FIG. 1 also shows one example of this aspect.

In accordance with this aspect, it is possible to carry out measuring processes without allowing the displacement measuring point on the measuring object to shift on the measuring object surface even during the operations of the light-path length sweeping mechanism (that is, the center of the spot is not moved although the spot size is changed); therefore, it is always possible to carry out displacement measurements of specific points in a stable manner. For this reason, it is possible to carry out displacement measurements on a fine object and a fine portion.

Here, the term, "perpendicular to the light axis", is used in a manner so as to include a case in which there is an offset from normal to a degree causing no problems with respect to measurements. For example, when the light-path length sweeping mechanism is formed by using a cantilever beam and the like, the sweeping process causes slight variations in the angle of the reflection face; however, the term, "perpendicular" used here includes such a degree of angular offset from normal.

The reflection face (6) placed perpendicularly to the above-mentioned light axis may be placed at a position that passes through the second light-path control element (FIG. 12) or may be placed at a position reflected therefrom (FIG. 13).

Moreover, in this arrangement, the sixth light-converging element (13) in which the first light-converging element and the second light-converging element are made compatible with each other (commonly used) may be used (FIG. 14, FIG. 15). With this arrangement, it is possible to reduce the number of light-converging elements, and also to shorten the distance between the light-projection unit and the light-path control element as well as the distance between the light-shielding mask and the first light-path control element; thus, it becomes possible to carry out a stable detecting process with respect to temperature changes and the like, in the same manner as described above.

In another preferable aspect of the present invention, as indicated by reference numerals in FIGS. 16 and 17 that show examples thereof, the second light-path control element (4a) is placed between the first light-path control element (2) and the reflection face (6); the first light-converging element is constituted by a third light-conversing element (16) and a fourth light-converging element (17); and the second light-converging element is constituted by the third light-converging element (16) and a fifth light-converging element (18). Moreover, the fourth light-converging element (17) is composed of a single lens or a plurality of lenses that are placed in a light path from the light-projection unit (1) to the reflection face (6) in a concentrated or dispersed manner, with at least one lens being placed in a light path from the light-projection unit (1) to the second light-path control element (4a) so that luminous fluxes released from the light-projection unit (1) is converged in the vicinity of the reflection face (6); the third light-converging element (16) is composed of a single lens or a plurality of lenses that are placed between the reflection face (6) and the measuring object (8) in a concentrated or dispersed manner, with at least one lens being placed between the second light-path control element (4a) and the measuring object (8) so that luminous fluxes reflected by the reflection face (6) are converged on the measuring object (8), with luminous fluxes reflected by the measuring object (8) being converged on the vicinity of the reflection face (6); the fifth light-converging element (18) is composed of a signal lens or a plurality of lenses that are placed in a light path from the reflection face (6) to the light-receiving unit (9) in a concentrated or dispersed manner, with at least one lens being placed in a light path from the second light-path control element (4a) to the light-receiving unit (9) so that luminous fluxes that have been reflected by the reflection face (6) after having been reflected by the measuring object (8) are converged on the light-receiving unit (9).

The optical system shown in FIG. 1 also shows one example of this aspect, and light-converging elements 5, 7 are examples for the third light-converging element, and light-converging elements 3, 5 are made compatible with (commonly used as) the fourth light-converging element and the fifth light-converging element. The light-converging element 5 forms a portion that is commonly contained in the third, fourth and fifth light-converging elements.

In accordance with this aspect, light released from the light-projection unit is converged in the vicinity of the reflection face of the light-path length sweeping mechanism so that it becomes possible to miniaturize the area of the reflection face to a great degree. Consequently, even when a cantilever beam, a tuning fork or the like is used in the light-path length sweeping mechanism, it is possible to achieve a small size and light weight, and also to increase the natural frequency. Thus, it becomes possible to increase the sweeping frequency, and consequently to achieve measurements with a short response time. Moreover, in the case of a fixed response time, it is possible to achieve measurements that are free from measuring errors with high precision by increasing the number of averaging processes.

In this case, the term, "converging in the vicinity of the reflection face", includes a case in which the light-converging point is located in a range in which the reflection face is allowed to move reciprocally in the light-axis direction; however, not limited to this case, even a case in which the light-converging is carried out on the periphery of the range is included therein, as long as the spot size on the reflection face is sufficiently small with a small-size reflection face so that the above-mentioned effects are obtained. Moreover, any arrangement in which luminous fluxes released from the light-projection element (1) is once converged before they are made incident on the third light-converging element is included in the above-mentioned term, "converging in the vicinity of the reflection face", since the above-mentioned effects are obtained.

The term, "single", in "single or a plurality of lenses" refers to the number on a lens function basis, and includes a case like a combination lens in which a plurality of lenses are integrally combined to function as a single lens such as a convex lens and a concave lens. Moreover, the term, "a plurality of lenses", refers to the fact that there are a plurality of lenses, each corresponding to the above-mentioned "single" lens.

Moreover, as a modified example of this aspect, as indicated by reference numerals in FIGS. 18 and 19 that show examples thereof, the fourth light-converging element and the fifth light-converging element may be made compatible (commonly used) with each other to form a seventh light-converging element (19), and this may be placed between the first light-path control element (2) and the second light-path control element (4a).

In accordance with this aspect, the light-converging elements are commonly used more effectively so that it becomes possible to reduce the number of parts, and consequently to achieve low costs and a miniaturization.

In another aspect of the present invention, as indicated by reference numerals in FIGS. 20 and 21 that show examples thereof, the third light-converging element, the fourth light-converging element and the fifth light-converging element may be made compatible (commonly used) with each other to form an eighth light-converging element (20), and this may be placed between the second light-path control element (4a) and the reflection face (6).

In accordance with this aspect, since the light-converging elements are formed into a single element, it becomes possible to further reduce costs, and also to achieve a small size.

In a preferable aspect of the present invention, the light-projection unit and the light-receiving unit are placed with a positional relationship so as to mutually form mirror images with respect to the function of the first light-path control element.

The term, "a positional relationship so as to mutually form mirror images", refers to a positional relationship in terms of optical functions, and does not refer simply to the external shapes of the light-projection unit and the light-receiving unit. Therefore, in this case, the light-projection unit refers to a light-emitting point of the light source, in the case when a pinhole is formed in the light-shielding mask of the light-receiving unit, it refers to the pinhole, and in the case when the light-shielding mask is constituted by knife edges, it refers to a point which is any one point along the edge line of the knife edge, and determines the light-receiving light axis.

In an arrangement where a pinhole is formed in the light-shielding mask, when the pinhole and the light-emitting point of the light source of the light-projection unit are placed with a positional relationship so as to mutually form mirror images with respect to the function of the first light-path control element, regardless of cases when the measuring object is a mirror-face object and when it is a diffusion reflective object, including a case when the measuring object is located at such a position that irradiation light is converged on the measuring object in a state where the light-path length is in a state other than the neutral position, the same displacement measured value is obtained. In the case when the light-shielding mask is constituted by knife edges, regardless of the measuring object prepared as a mirror face object or a diffusion reflective object, the same displacement measured value can be obtained, as long as the point that defines the light-receiving light axis on the edge line of the knife edge and the light-emitting point of the light source of the light-projection unit are placed with a positional relationship so as to mutually form mirror images with respect to the function of the first light-path control element.

In another preferable aspect of the present invention, as indicated by reference numerals in FIGS. 22 and 23 that show examples thereof, an area (21) in which the reflection face is allowed to shift along the light-axis direction is set so as not to include a position (22) at which luminous fluxes released from the light-projection unit (1) are converged by the fourth light-converging element (3, 5).

The term, "a position at which luminous fluxes are converged by the fourth light-converging element", refers to a position at which, supposing that no reflection face exist, luminous fluxes would be converged by the fourth light-converging element.

Devices such as a half-mirror and a polarizing beam splitter are used as the second light-path control element as described above; however, it is actually impossible to direct all the amount of luminous fluxes to the measuring object when the luminous fluxes reflected by the reflection face are directed to the measuring object. Although there are variations in the degree, return light is always generated in a direction other than the direction to the measuring object, that is, in a direction toward the light-projection unit or a direction toward the light-receiving unit. In the case when luminous fluxes released from the light-projection unit are converged on the reflection face, this return light is converged on the light-receiving unit with most of the light being received by the light-receiving element. Therefore, the intensity thereof becomes un-ignorable in comparison with the output signal derived from reflected luminous fluxes from the measuring object, resulting in disturbance in the detection.

In accordance with this aspect, an arrangement is made so that luminous fluxes released from the light-projection unit are not converged on the reflection face although they are converged on the vicinity of an area in which the reflection face is allowed to shift along the light-axis direction; therefore, no return light is converged on the light-receiving element. Therefore, it is possible to reduce the intensity of the return light to such a level that causes no problem, and it becomes possible to surely detect the output signal of the light-receiving element based upon luminous fluxes reflected from the measuring object.

In another aspect of the present invention, as indicated by reference numerals in FIG. 24 that shows an example thereof, an area (21) in which the reflection face is allowed to shift along the light-axis direction is set so as to include a position (22) at which luminous fluxes released from the light-projection unit (1) are converged by the fourth light-converging element (3, 5), and when the measuring object is located inside an effective measuring area (23), an area (25) in which luminous fluxes reflected from the measuring object can be converged by the third light-converging element (7, 5) is set so as not to include a position (22) at which luminous fluxes released from the light-projection unit (1) are converged by the fourth light-converging element (3, 5).

Referring to FIG. 24 showing a structure that is one example of the present aspect and FIG. 25 showing an output signal of a light-receiving element corresponding to the structure thereof for convenience of explanation, the following description will discuss the function of the present aspect. In these Figures, reference numeral 21 represents an area in which the reflection face is allowed to shift along the light-axis direction, 6d is a reflection face in a state where the light-path length sweeping mechanism makes the light-path length shortest, 6e is a reflection face in a state where the light-path length sweeping mechanism makes the light-path length longest, 23 is an effective measuring area, 8b shows the measuring object in the case when it is located at the farthest position from the objective lens 7 within the effective measuring area, 8c shows the measuring object in the case when it is located at the closest position to the objective lens 7 within the effective measuring area, 24b is a point in which reflected luminous fluxes from the measuring object 8b located at the farthest position from the objective lens 7 within the effective measuring area are converged by the third light-converging element, and 24c is a point in which reflected luminous fluxes from the measuring object 8c located at the closest position to the objective lens 7 within the effective measuring area are converged by the third light-converging element. Reference numeral 25 shows an area in which luminous fluxes reflected from the measuring object 8 within the effective measuring area 23 can be converged by the third light-converging element. Correspondingly, in FIG. 25, in the same manner as above-mentioned FIG. 6, when the amount of change in the light-path length is X1, luminous fluxes reflected from the measuring object not shown in FIG. 24 are made incident on the light-receiving element so that an output signal 27 is obtained. When the amount of change in the light-path length is X2, luminous fluxes released from the light-projection unit are converged on the reflection face by the fourth light-converging element so that return light is generated at this time, and received by the light-receiving element to generate a light-receiving signal 26. The amounts of change in the light-path length, X3, X4, respectively correspond to cases in which, in FIG. 24, the reflection face is located at 24b, 24c, and an area 28, indicated by slanting lines, represents a time area in which luminous fluxes reflected from the measuring object within the effective measuring area can be received.

In accordance with this aspect, the light-receiving element output signal 26 derived from the return light is always obtained outside the area 28 in which light fluxes reflected from the measuring object within the effective measuring area can be received; therefore, it is possible to prevent the return light from disturbing an accurate detection of the light-receiving element output signal 27 derived from the light reflected from the measuring object located within the effective detection area. Here, the output signal 26 of the light-receiving element derived from the return light is always generated when the amount of displacement of the reflection face is set to X2 regardless of the position of the measuring object. In order to measure the displacement of the measuring object, the amount of change in the light-path length is measured by a certain sensor and the like so that the amount of change in the light-path length is converted to the amount of displacement in the measuring object; and upon conversion, the measured value of the amount of change in the light-path length is corrected by the amount of displacement at the time of generation of this signal 26 so that it is possible to reduce measuring errors in the amount of change in the light-path length due to influences from temperature drifts of the above-mentioned sensor and the like, and consequently to provide more stable displacement measuring processes.

In more preferable aspect of the present invention, the displacement sensor is arranged so that displacement of the reflection face that is allowed to shift along the light-axis direction is given as periodic vibration, and is provided with: a means which selects desirably set one of the output signal obtained when the displacement of the reflection face is in the outward movement and the output signal obtained when the displacement of the reflection face is in the homeward movement, from output signals of the light-receiving element generated when the position of the reflection face and the position at which luminous fluxes released from the light-projection unit are converged by the fourth light-converging element are coincident with each other, and acquires the resulting signal; a means which measures a period of time until the time at which, when luminous fluxes released from the light-projection unit are converged on the measuring object, an output signal of the light-receiving element is obtained due to the resulting reflected luminous fluxes, referring to the time at which the selected output signal is obtained; and a means which obtains information with respect to the distance to the measuring object based upon the above-mentioned measured time.

The fact that the displacement of the reflection face is given as periodic vibration means that the displacement in the reflection face is carried out periodically, and when the reflection face is located at a position of the reflection face (the same area as that of the above-mentioned 25) that allows luminous fluxes released from the light-projection unit to be converged on the measuring object, the reflection face is displaced in a monotonically increasing manner or in a monotonically decreasing manner. With this arrangement, in the outward movement of the vibration or in the homeward movement thereof, the amount of displacement of the reflection face at the time when the irradiation light is converged on the measuring object located at least within the effective measuring area is uniquely determined with respect to time.

In this arrangement, no sensors or the like is used for measuring the amount of displacement of the light-path length, and supposing that the change in the light-path length is periodically changed in terms of time, for example, a change in sine-waveform vibration or the like, the displacement of the measuring object is measured by measuring an elapsed time from a specific point at which the amount of change in the light-path length has been known. With respect to the specific point at which the amount of change in the light-path length has been known, the light-receiving element output signal 26 derived from the above-mentioned return light is used.

In accordance with this arrangement, it is possible to eliminate the necessity of a sensor and the like for measuring the amount of change in the light-path length.

In more preferable aspect of the present invention, as indicated by reference numerals of FIGS. 26 and 27 showing examples thereof, the fourth light-converging element is constituted by a collimate lens (11) and an intermediate lens (5), with the collimate lens (11) being placed between the light-projection unit (1) and the second light-path control element (4a) so that luminous fluxes released from the light-projection unit (1) are made virtually collimated, with the intermediate lens (5) being placed between the second light-path control element (4a) and the reflection face (6) so that the above-mentioned luminous fluxes, made virtually collimated, are converged in the vicinity of the reflection face (6). Moreover, the fifth light-converging element is constituted by the intermediate lens (5) and light-receiving lens (12), with the light-receiving lens being placed between the light-receiving unit (9) and the second light-path control element (4a), so that luminous fluxes reflected from the measuring object (8) are converged on the light-receiving unit (9). The term, "converging in the vicinity of the reflection face", is used in the same manner as described earlier.

With respect to the state where this displacement sensor is used, depending on the shape, size and degree of deviations of these of the measuring object, desirable detection distance and displacement measuring range are different. In order to adapt this sensor to various applications, various types of devices having different detection distances and different displacement measuring ranges are actually required. In the case when each of the range from the light-projection unit to the measuring object and the range from the measuring object to the light-receiving unit is formed by using a single lens, in order to obtain desired detection distance and displacement measuring range, modifications in the lens and the light-path length sweeping mechanism are required, with the result that the entire sensor needs to be designed and manufactured from the beginning. In accordance with the present aspect, it is possible to obtain desired detection distance and displacement measuring range by simply modifying the focal lengths and positions of the intermediate lens and the objective lens. More specifically, the detection distance is determined by adjusting the operation distance of the objective lens, and the size of the displacement measuring area is determined by the magnification of a composite lens system (hereinafter, referred to as composite lens) determined by the focal distances and positions of the intermediate lens and the objective lens, and the amount of displacement of the reflection face. This arrangement makes it possible to exchange lenses, and to provide various types of devices that are suitable for various applications. Moreover, by providing a structure that allows different kinds of lenses to be easily selected and applied during manufacturing processes, it is possible to commonly use parts other than the lenses in a manner so as to fit to a combination selected from a wide range of combinations in the detection distance and displacement measuring range, and consequently to manufacture a displacement sensor at low costs.

Moreover, in the present detection principle, as the minimum spot size on the measuring object is made smaller, the irregularities in the reflection intensity become more serious; therefore, it is preferable to provide an optical system in which the lens aberration is sufficiently reduced. When luminous fluxes between the intermediate lens and the objective lens are either converging luminous fluxes or diffusion luminous fluxes, the state of the luminous fluxes is changed between converging and dispersion states by the change in lenses; however, a light-path control element exists between the intermediate lens and the objective lens so that the amount of aberration is consequently changed.

Therefore, in order to obtain a small spot size on the measuring object, it is necessary to use an aspherical and a combination lens that are specially made so as to minimize the aberration when used in an optical system as a whole, causing very high costs. In the present aspect, the luminous fluxes between the intermediate lens and the objective lens are maintained virtually (with respect to the structure of an optical system, luminous fluxes between the collimate lens and the intermediate lens as well as between the intermediate lens and the light-receiving lens are also maintained) collimated; therefore, lenses having a general specification for use in infinite optical system may be used so that it becomes possible to a displacement sensor for providing a small spot size on the measuring object at low costs. The term, "virtually in parallel with", refers to a state that is close to parallel luminous fluxes to such a degree as to provide the above-mentioned effects, and this state is not limited to strict parallel luminous fluxes.

In further preferable aspect of the present invention, as indicated by reference numerals of FIG. 28 (having the same optical layout as FIG. 1) and FIG. 29 showing examples thereof, the collimate lens and light-receiving lens are prepared as a common lens (3), and placed between the first light-path control element (2) and the second light-path control element (4a). By making the collimate lens and the light-receiving lens compatible with each other (commonly used), it becomes possible to reduce the number of parts, and consequently to achieve low costs and a small size. Moreover, in the same manner as the aforementioned devices, it is possible to shorten the distance between the light-projection unit and the first light-path control element as well as the distance between the light-shielding mask and the first light-path control element, and consequently to carry out a stable detecting process with respect to temperature changes.

In further preferable aspect of the present invention, as indicated by reference numerals of FIG. 30 showing an example thereof, the light-projection unit (1) releases plane polarized light, and the second light-path control element is a polarization beam splitter (4b) that is placed so that the plane polarized light is set vertically to or in parallel with the incident plane; and a ¼-wavelength plate (29) with respect to the wavelength of light released from the light-projection unit (1) is placed in a light path through which luminous fluxes released from the polarization beam splitter (4b) are directed to the intermediate lens (5) and a light path through which, after having been reflected by the reflection face, luminous fluxes released from the intermediate lens (5) are directed to the polarization beam splitter (4b).

In accordance with this arrangement, most of the plane polarized light, released from the light-projection unit, is reflected from or transmitted through the second light-path control element, and after having been transmitted through the intermediate lens and the ¼-wavelength plate, this is again transmitted through the ¼-wavelength plate and the intermediate lens, and made incident on the polarization beam splitter. At this time, since the polarized light is transmitted through the ¼-wavelength plate back and forth, the plane polarized light is allowed to rotate by 90 degrees; in the case when the optical system is arranged so that most of the polarized light is first reflected by the polarization beam splitter, most of the polarized light is transmitted, while in the case when the optical system is arranged so that most of the polarized light is transmitted, most of the polarized light is reflected. In comparison with a case in which a half-mirror is utilized as the second light-path control element, the amount of luminous fluxes to be applied to the measuring object can be increased by approximately four times. Therefore, the output signal of the light-receiving element is also increased correspondingly so that it is possible to carry out displacement measurements with high precision and measurements with a short response time by improving the S/N ratio.

In further preferable aspect of the present invention, as indicated by reference numerals of FIG. 31 showing an example thereof, the displacement sensor is provided with: a reflection-face-use light-projection unit (30) which releases luminous fluxes to the reflection face (6) in a direction other than the direction perpendicular to the reflection face (6); and a position detection element (33) which receives luminous fluxes that are released from the reflection-face-use light-projection unit (30) after having been reflected by the reflection face (6), and in this arrangement, information with respect to a distance up to the measuring object (8) is obtained based upon an output signal from the position-detection element (33) and an output signal from the light-receiving unit (9).

With this arrangement, it is possible to find the position of the reflection face corresponding to the amount of change in the light-path length based upon the output signal from the position detection element. FIG. 36 shows an example of the position detection element output calculation result that is found based upon the output signal from the position detection element. This corresponds to the amount of change in the light-path length in FIG. 6. With respect to the calculation process, any process may be used as long as it uniquely determines the results of calculations in response to the position of luminous fluxes made incident on the position detection element; thus, supposing that two outputs of the position detection element are A and B, A/(A+B), (A−B)/(A+B), and the like are generally used. Moreover, simply, A, B or A−B may be used. As described in FIG. 6 earlier, the position of the reflection face has a one-to-one correspondence to the light-converging position of irradiation luminous fluxes to the measuring object, and by preliminarily finding an equation for converting it to the amount of displacement in the measuring object, it is possible to find the amount of displacement of the measuring object from the output of the position detection element corresponding to the time at which the output signal of the light-receiving unit is maximized. Moreover, the rear face of the reflection face may be utilized as a reflection face of the above-mentioned optical system used for finding the position of the reflection face, and in an arrangement in which the face on the side for reflecting luminous fluxes to be applied to the measuring object is utilized as shown in FIG. 6, the reflection-face-use light-projection unit and the position detection element are placed on the measuring object side in relation to the reflection face, with the light-path length sweeping mechanism being freely placed on the rear face side of the reflection face without limitations to the shape and the like; thus, it becomes possible to provide a sweeping mechanism having a simple structure.

The luminous fluxes, released from the reflection-face-use light-projection unit, may be arranged so as to be converged to form a spot having a fine size on the light-receiving face of the position detection element; this arrangement is preferable, since the resolution of the position detection element is improved. Moreover, these luminous fluxes may be applied so as to be always included in the reflection face even when the reflection face is displaced; this arrangement is more preferable since it is possible to prevent the position of the center of gravity of the spot being irregularly varied on the position detection element, and consequently to eliminate the necessity of exception process and correction.

For convenience of reference, the following description will again show the relationship between mutual names of the light-converging elements.

The sixth light-converging element (13) is allowed to compatibly have functions of the first light-converging element (3, 5, 7/14) and the second light-converging element (7, 5, 3/15). Here, the reference numeral of FIG. 1 is placed at the preceding part of slash "/" and that of FIG. 2 is placed at the succeeding part thereof.

The seventh light-converging element (19) is allowed to compatibly have functions of the fourth light-converging element (17) and the fifth light-converging element (18).

The eighth light-converging element (20) is allowed to compatibly have functions of the third light-converging element (16), the fourth light-converging element (17) and the fifth light-converging element (18).

The first light-converging element may be constituted by the third light-converging element and the fourth light-converging element.

The second light-converging element may be constituted by the third light-converging element and the fifth light-converging element.

DESCRIPTION OF THE PREFERRED EMBODIMEMTS

Referring to attached Figures, the following description will discuss embodiments of a displacement sensor of the present invention in detail.

Figure 1:
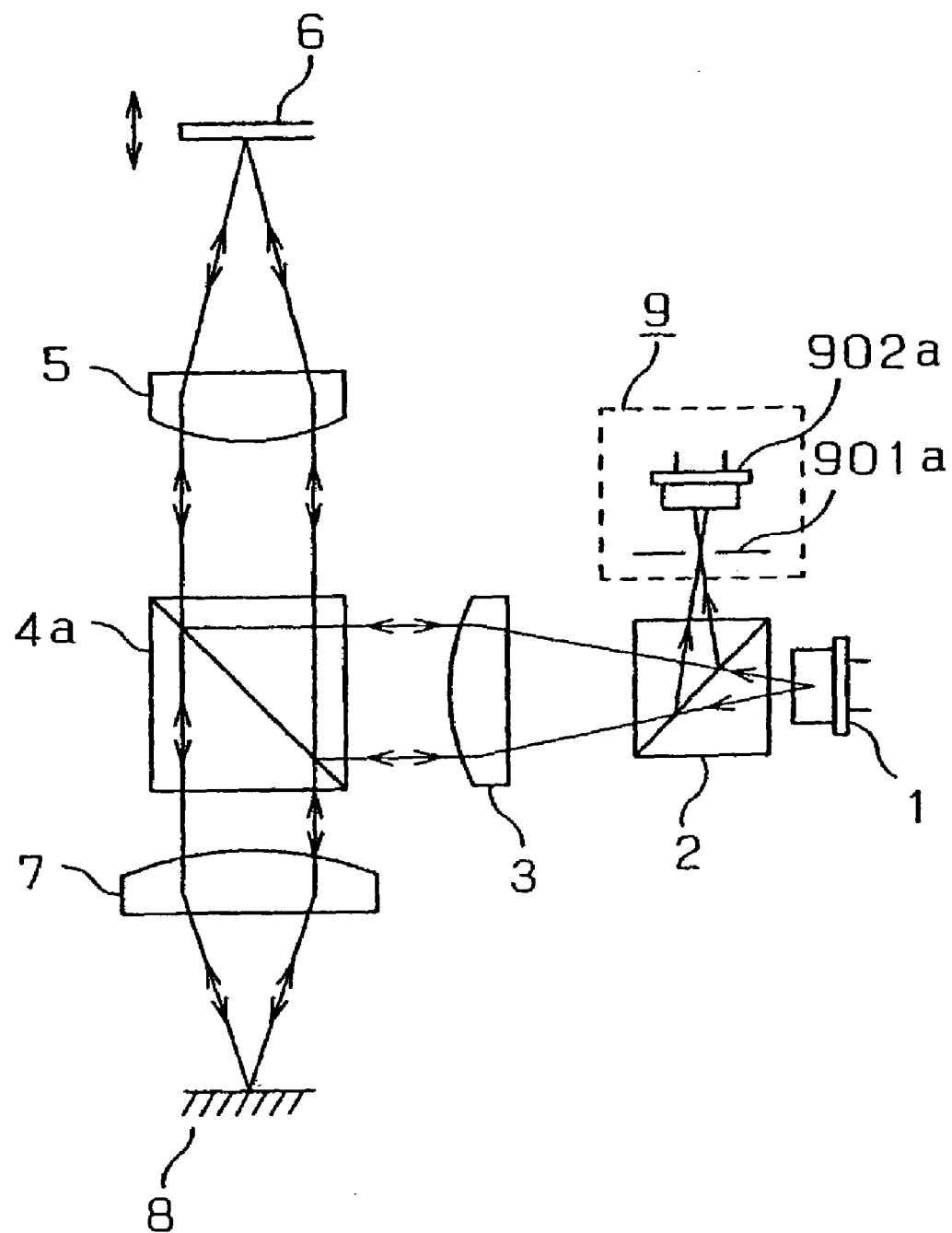
FIG. 1 shows a structure of an optical system in accordance with one embodiment of the present invention.
Figure 2:
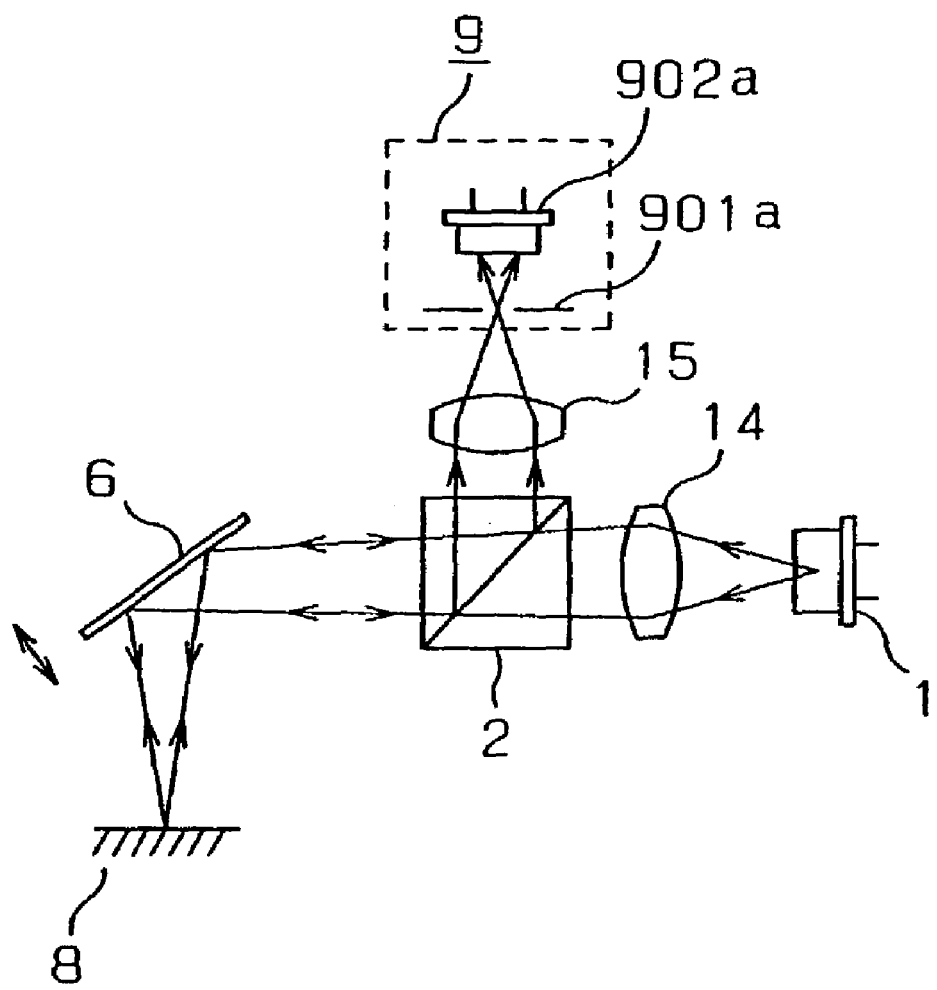
FIG. 2 shows a structure of an optical system in accordance with another embodiment of the present invention.
Figure 3:
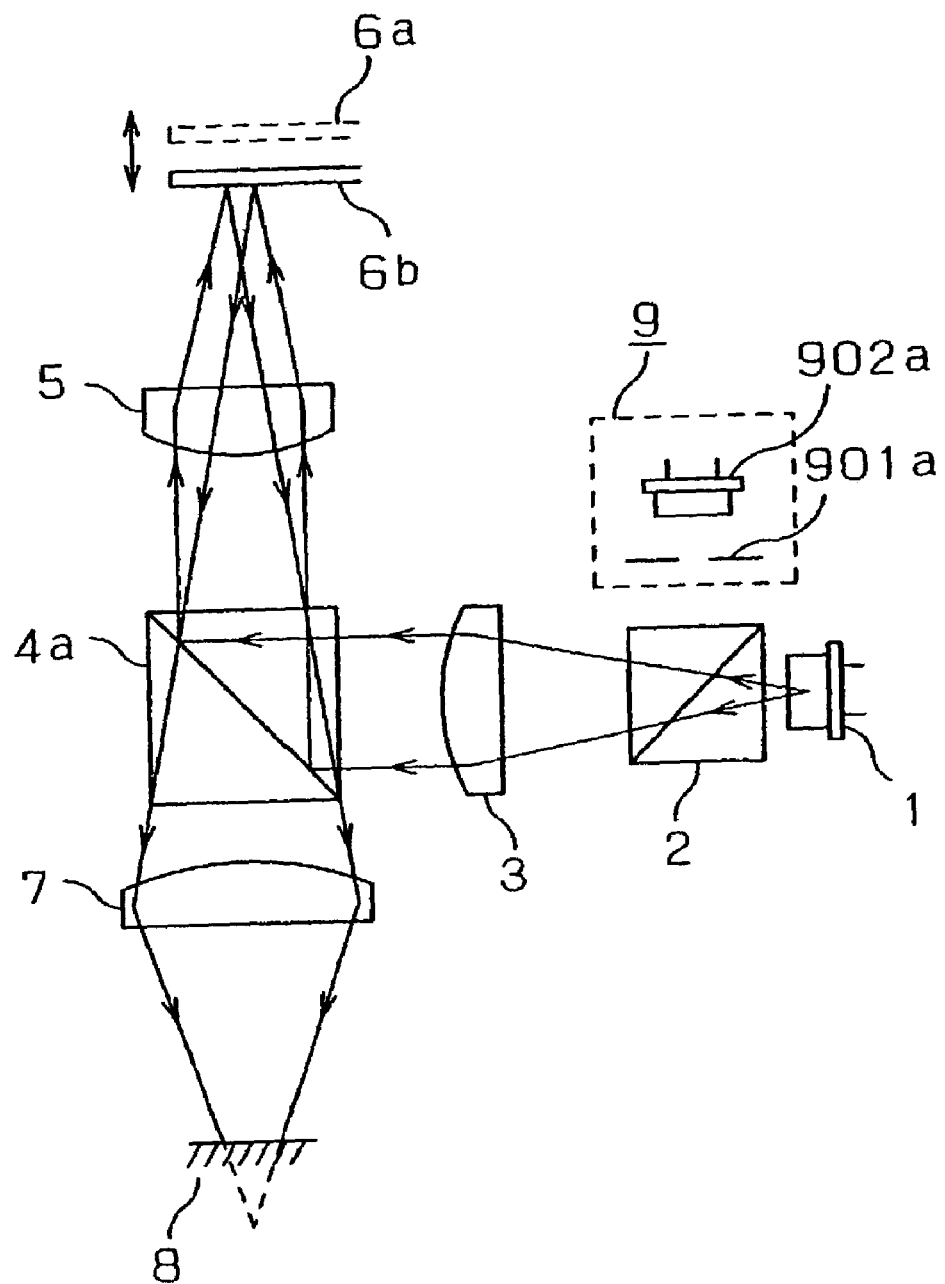
FIG. 3 shows irradiation luminous fluxes in a state in which a light-path sweeping mechanism shortens a light-path length in the structure of the optical system in accordance with the embodiment of FIG. 1.
Figure 4:
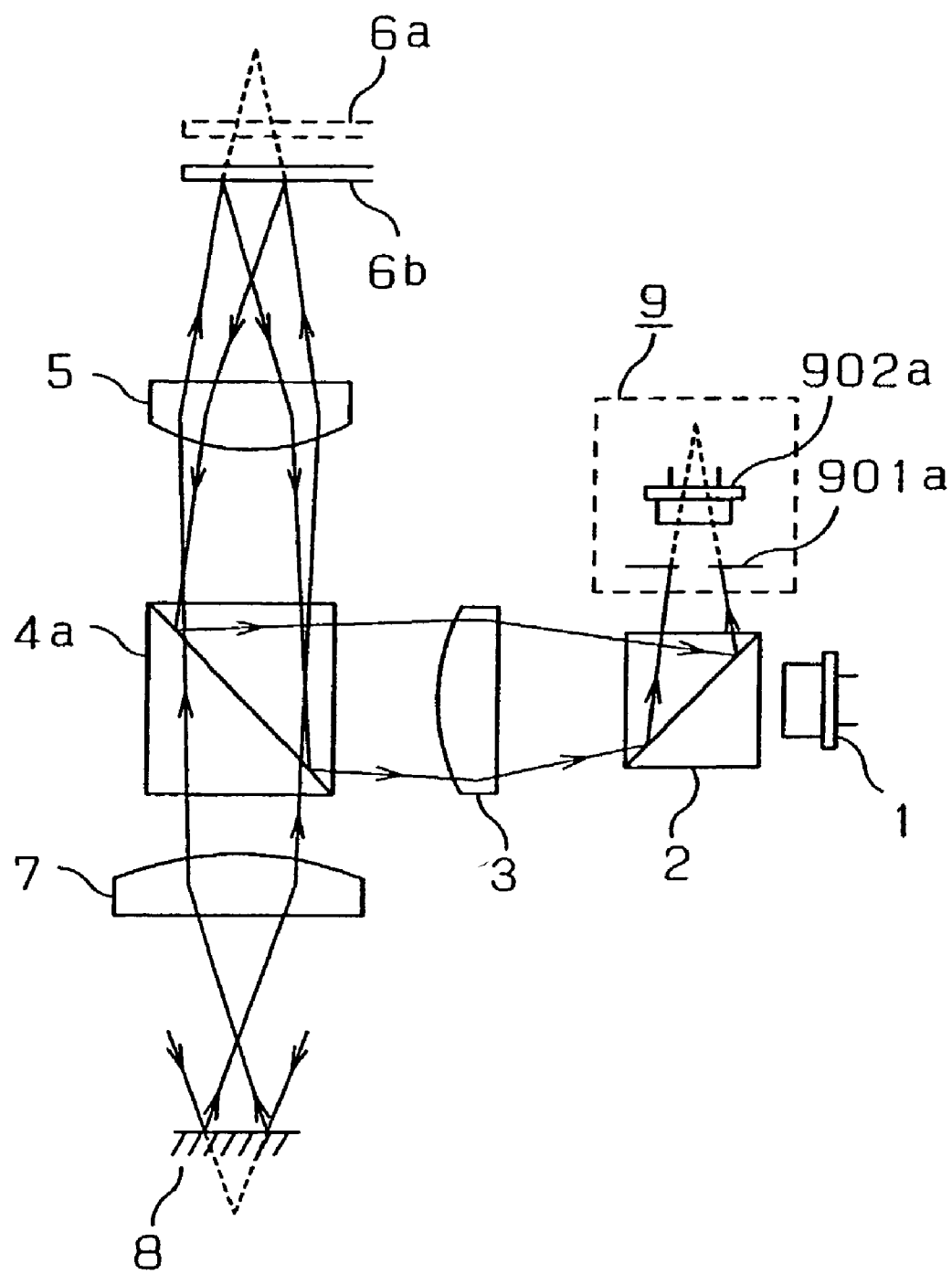
FIG. 4 shows reflected luminous fluxes in a state in which, in the case when a measuring object is a mirror face object, the light-path sweeping mechanism shortens the light-path length in the structure of the optical system in accordance with the embodiment of FIG. 1.
Figure 5:
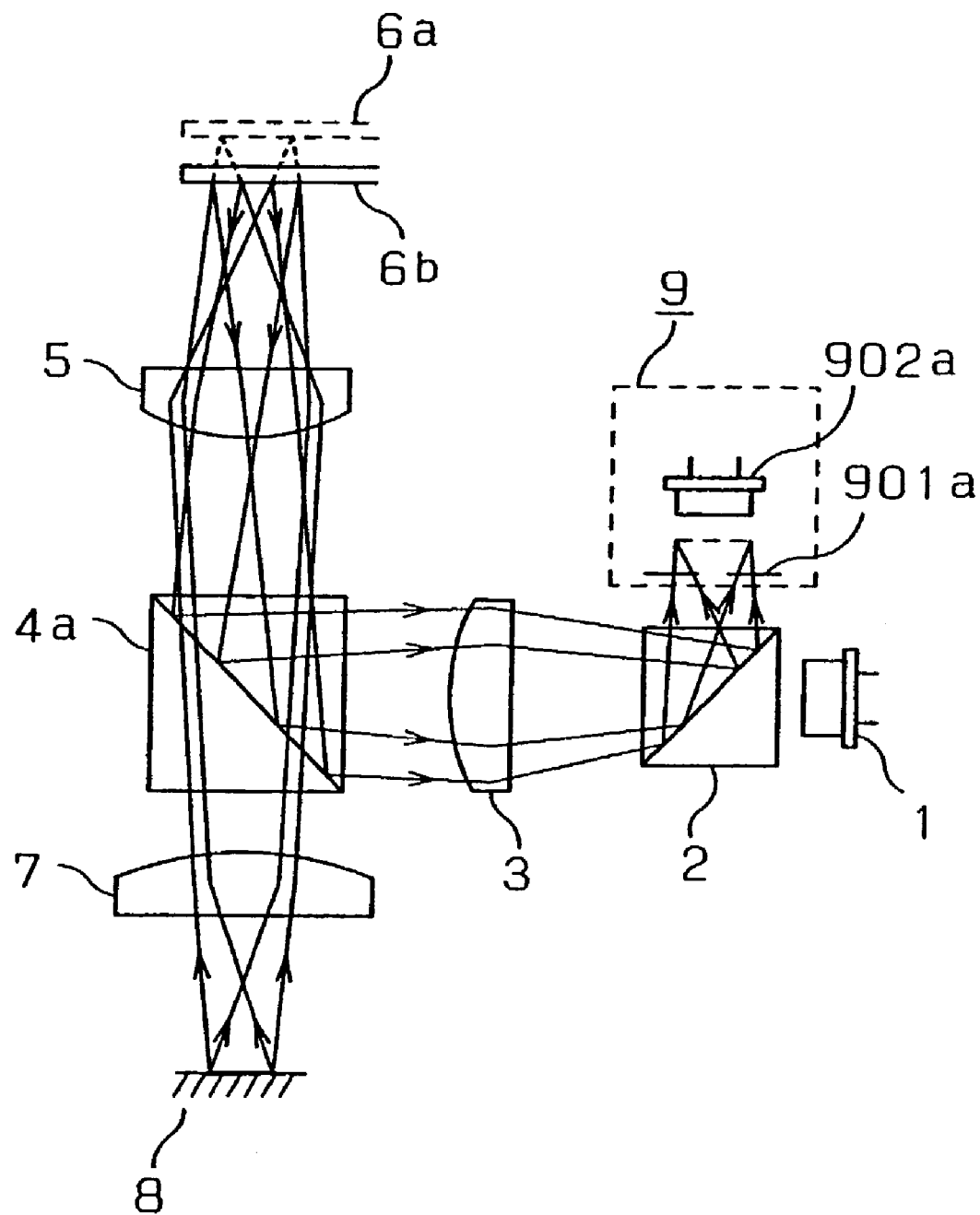
FIG. 5 shows reflected luminous fluxes in a state in which, in the case when a measuring object is a diffusion reflective object, the light-path sweeping mechanism shortens the light-path length in the structure of the optical system in accordance with the embodiment of FIG. 1.
Figure 6:
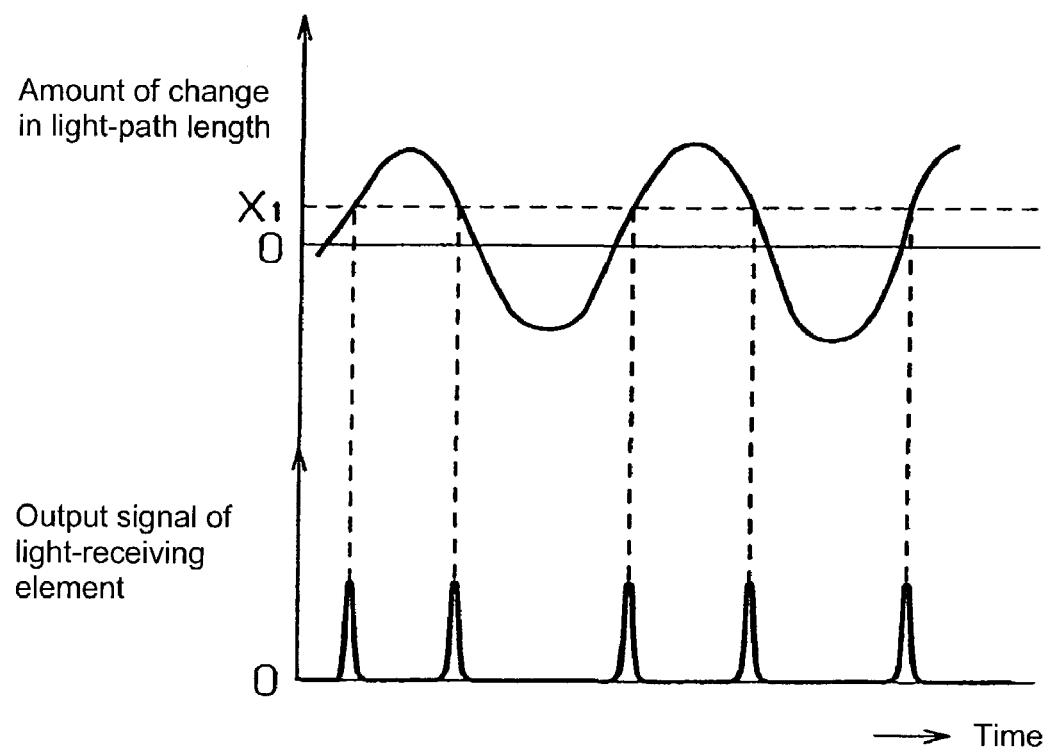
FIG. 6 is a drawing that shows a change in the light-path length resulting from operations of the light-path sweeping mechanism and a time-based change in an output signal from a light-receiving unit.
Figure 7:
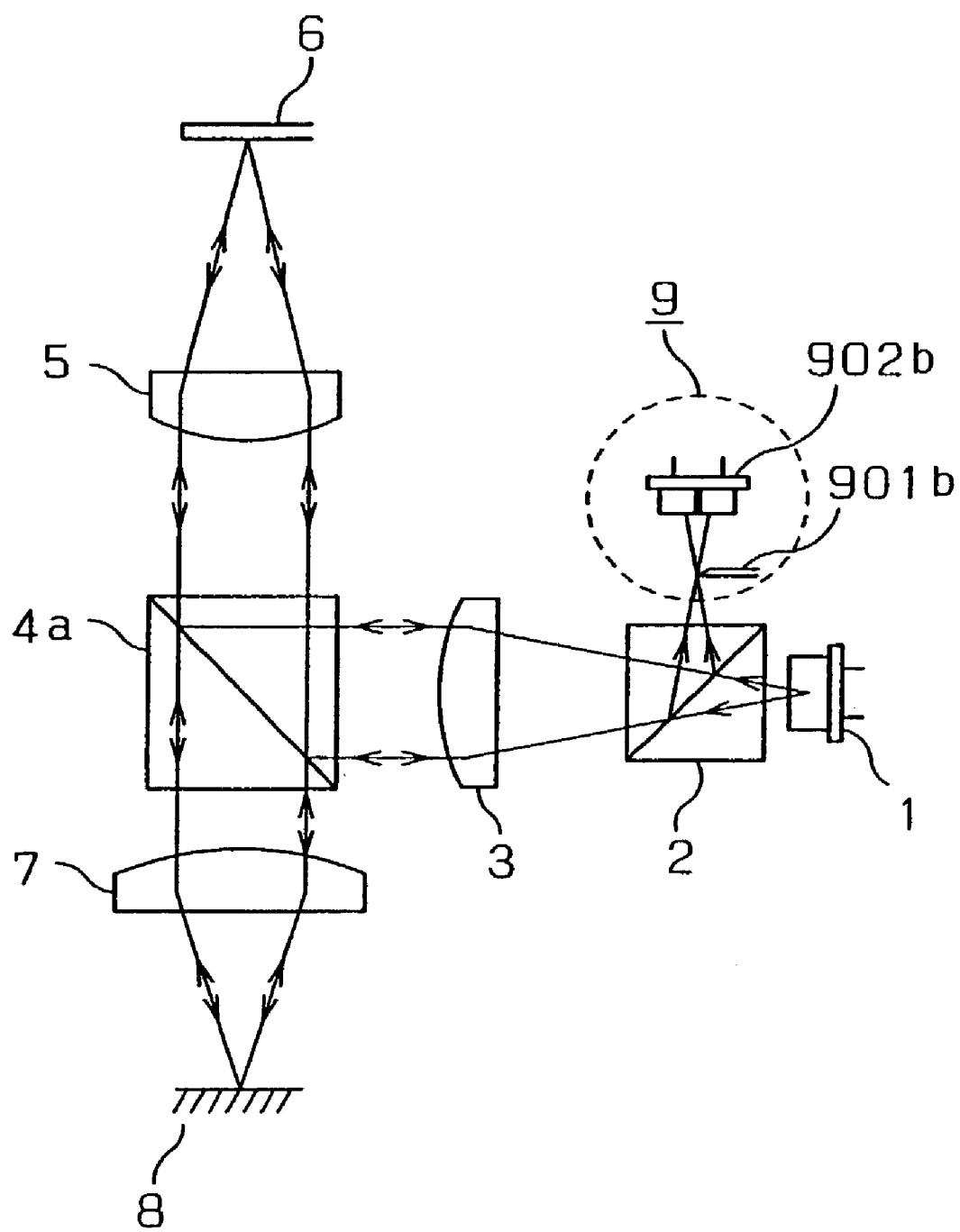
FIG. 7 shows a structure of an optical system in an embodiment in which a knife edge member is used as a light-shielding mask with a two-division photodiode being used as a light-receiving element.
Figure 8:
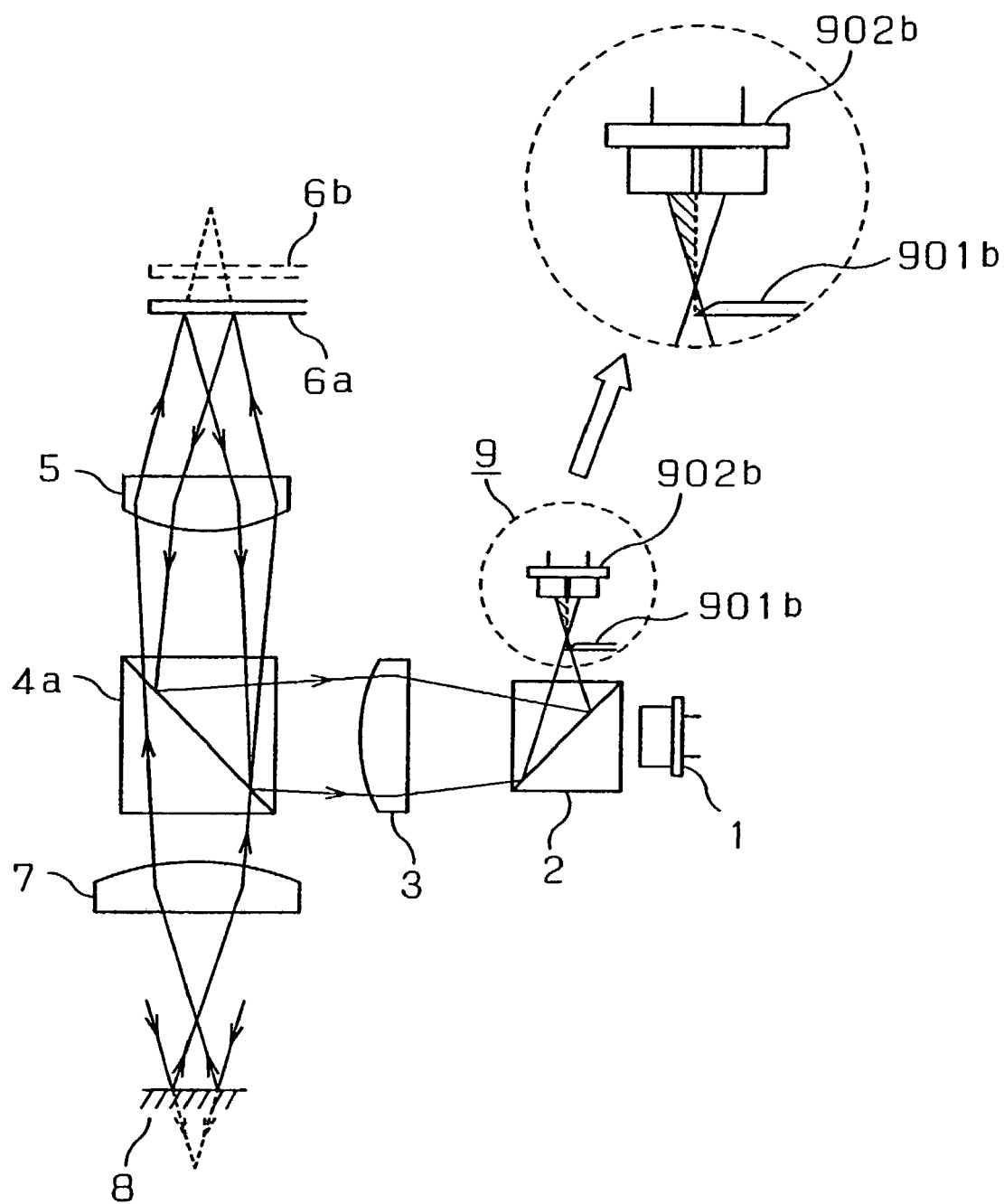
FIG. 8 shows reflected luminous fluxes in a state in which the light-path sweeping mechanism shortens the light-path length in the structure of the optical system in accordance with the embodiment in which a knife edge member is used as a light-shielding mask with a two-division photodiode being used as a light-receiving element.
Figure 9:
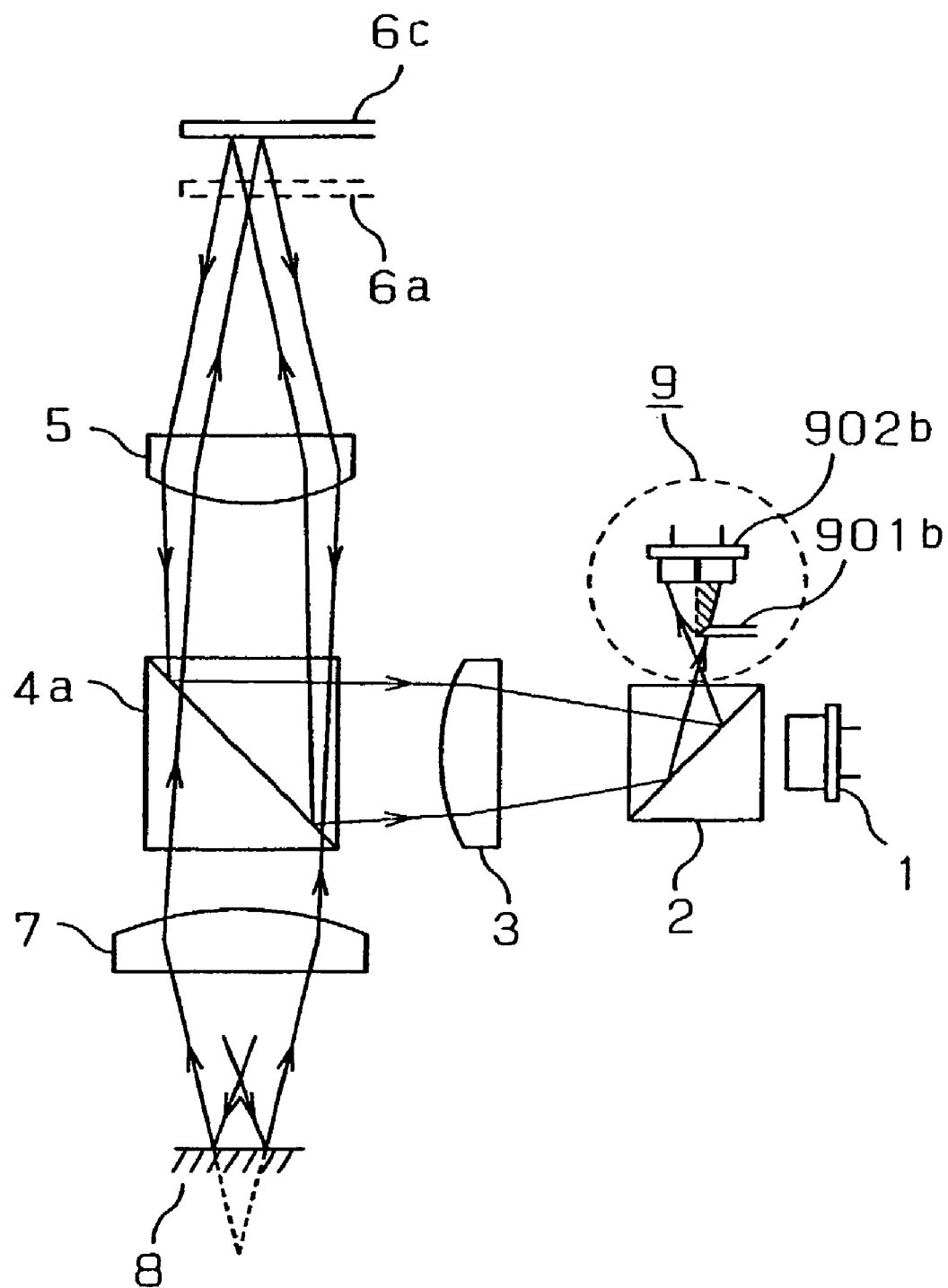
FIG. 9 shows reflected luminous fluxes in a state in which the light-path sweeping mechanism lengthens the light-path length in the structure of the optical system in accordance with the embodiment in which a knife edge member is used as a light-shielding mask with a two-division photodiode being used as a light-receiving element.
Figure 10:
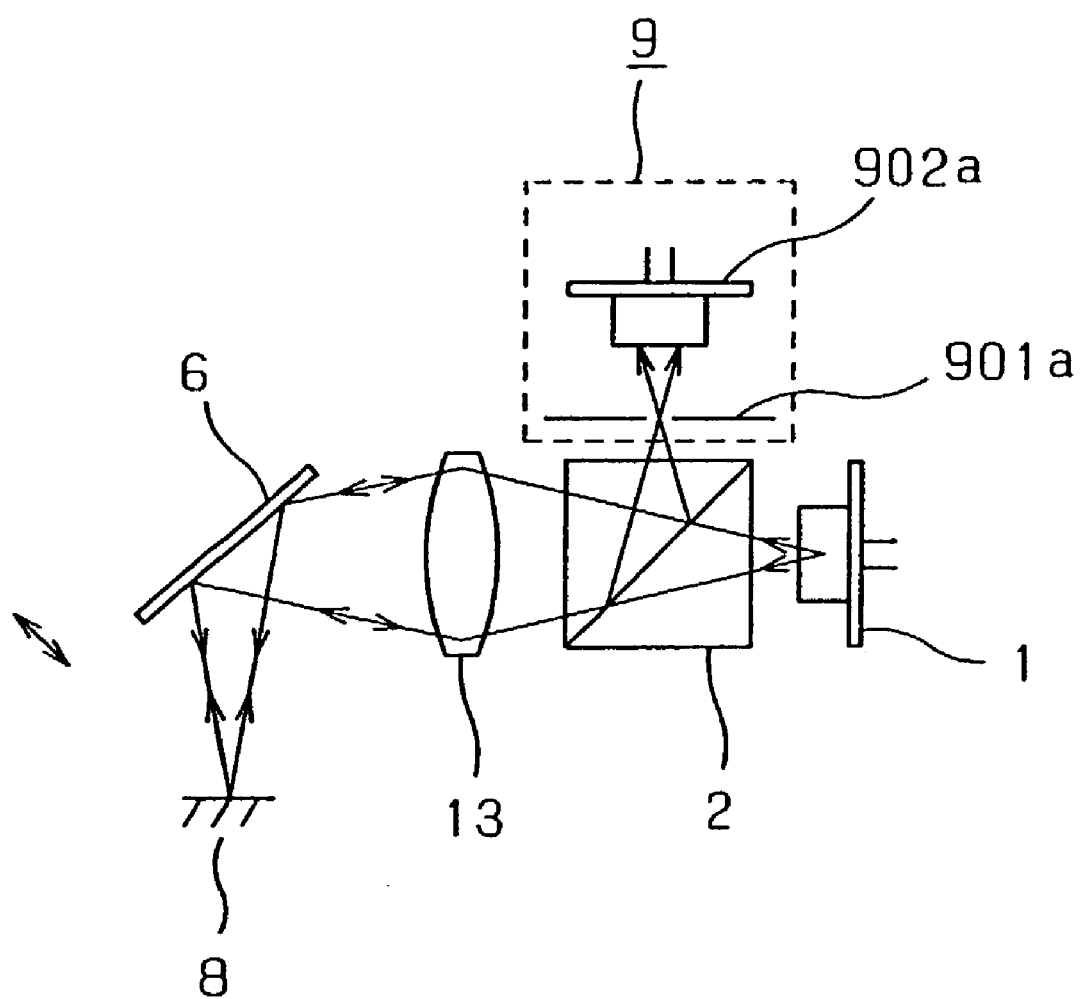
FIG. 10 shows a structure of an optical system in accordance with another embodiment of the present invention.
Figure 11:
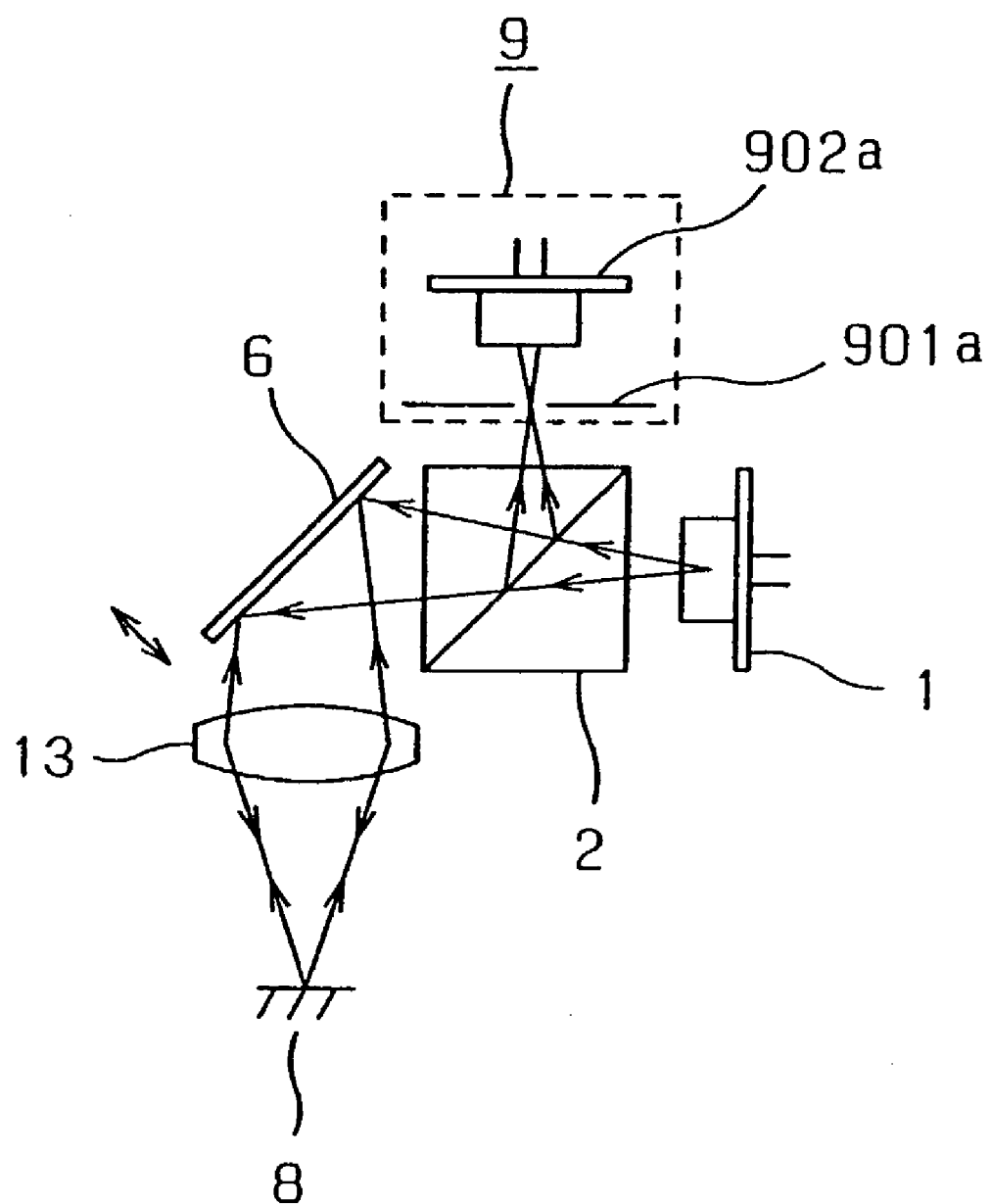
FIG. 11 shows a structure of another optical system in accordance with the embodiment of FIG. 10.
Figure 12:
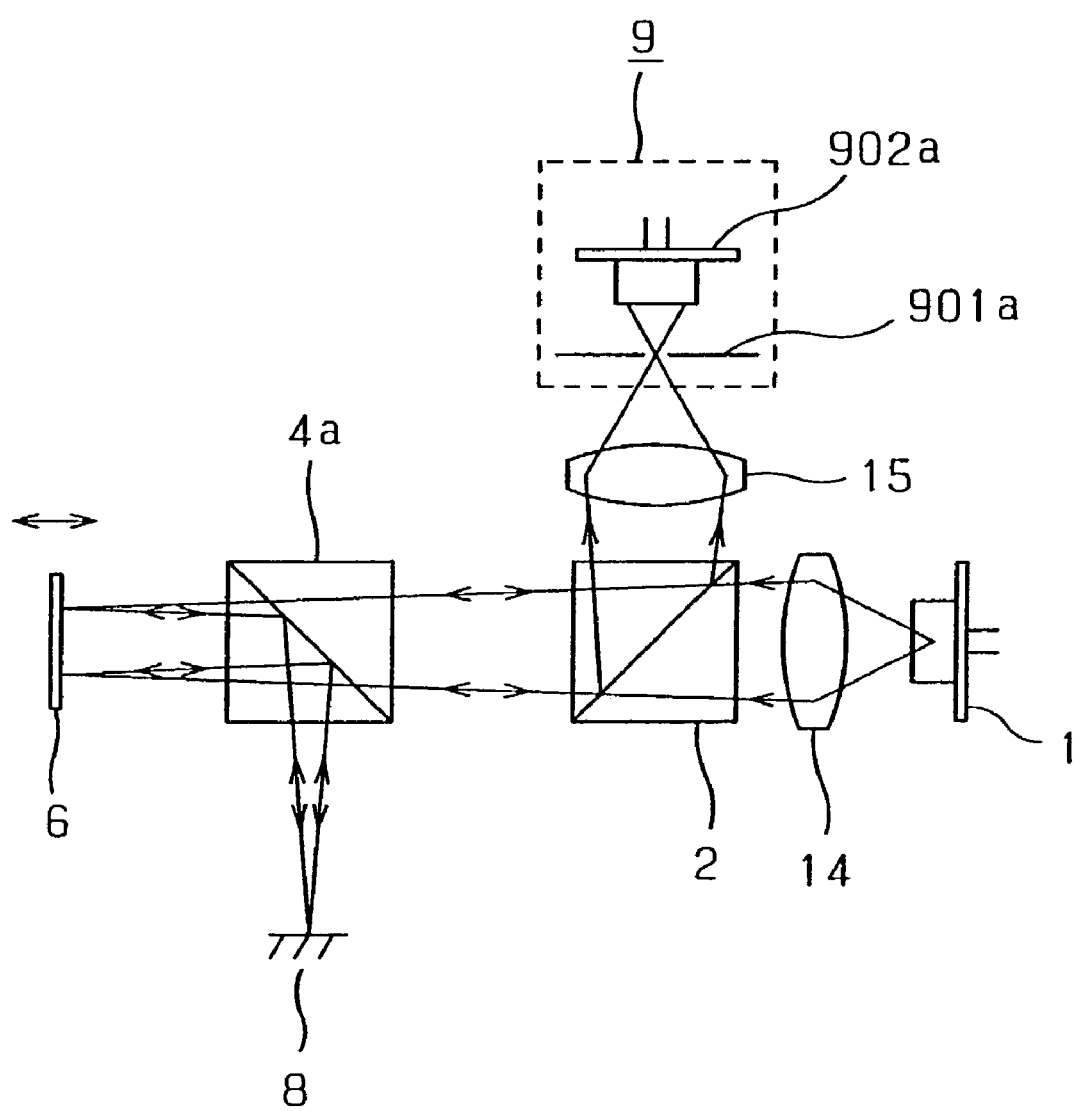
FIG. 12 shows a structure of an optical system in accordance with another embodiment of the present invention.
Figure 13:
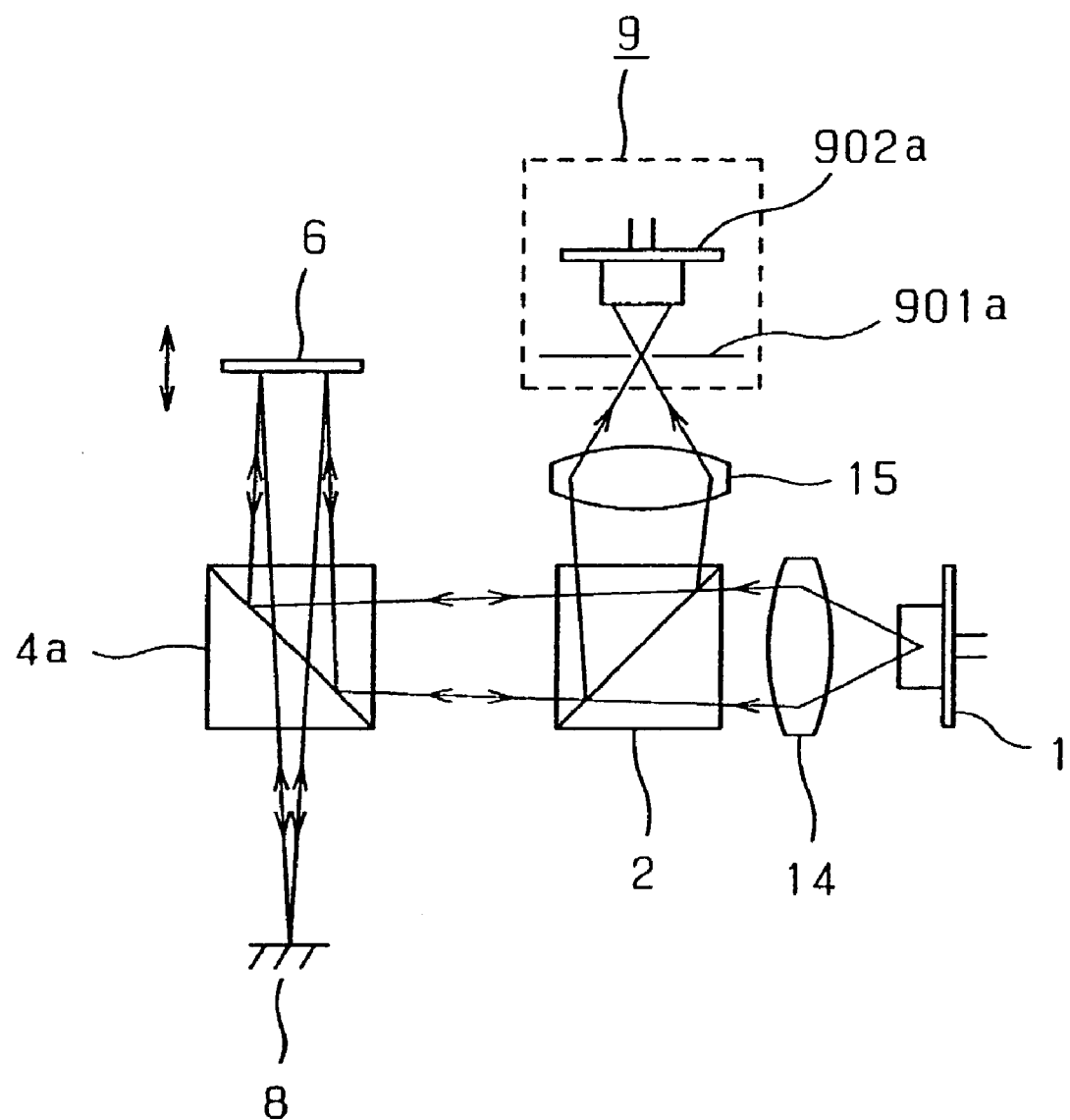
FIG. 13 shows a structure of another optical system in accordance with the embodiment of FIG. 12.
Figure 14:
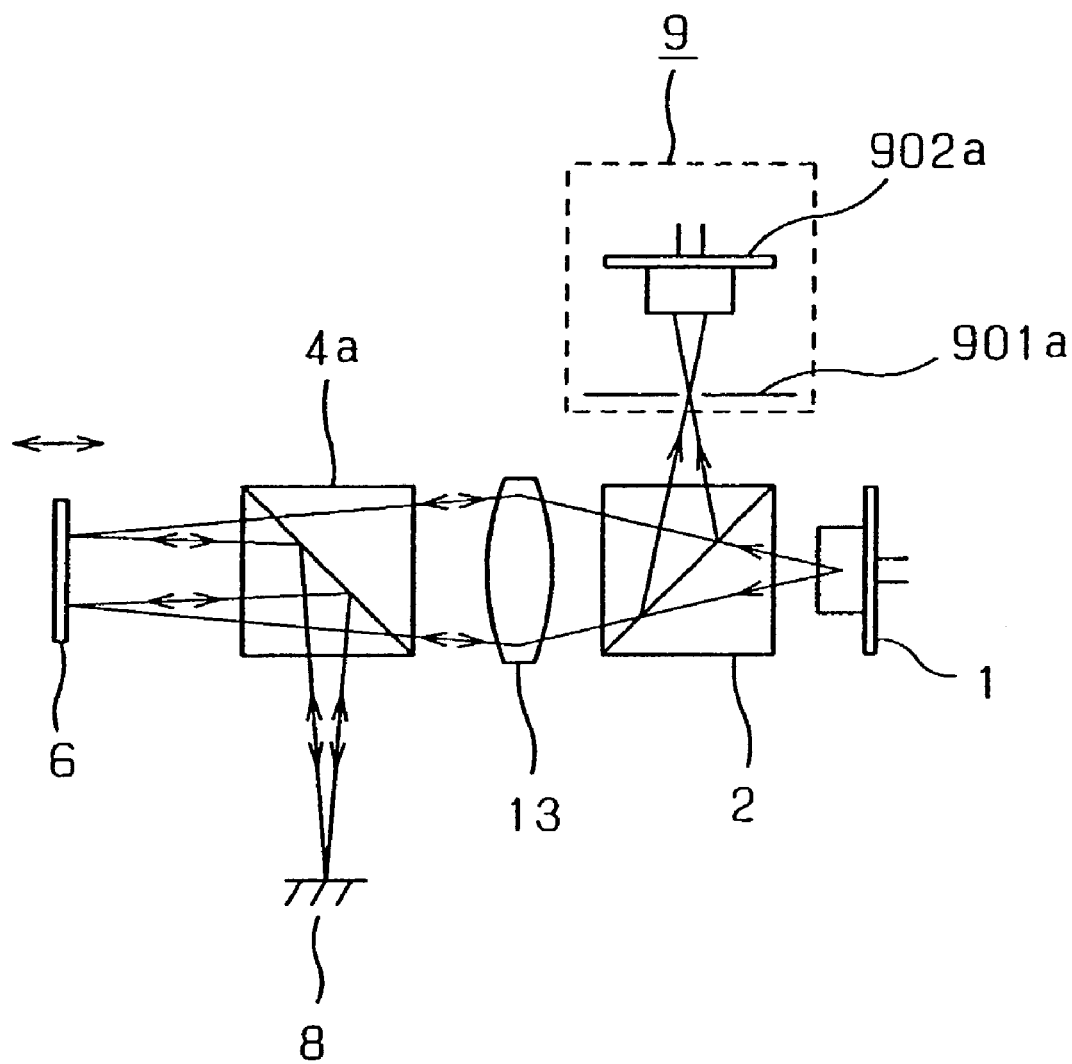
FIG. 14 shows a structure of an optical system in which a sixth light-converging element is used in the embodiment of FIG. 12.
Figure 15:
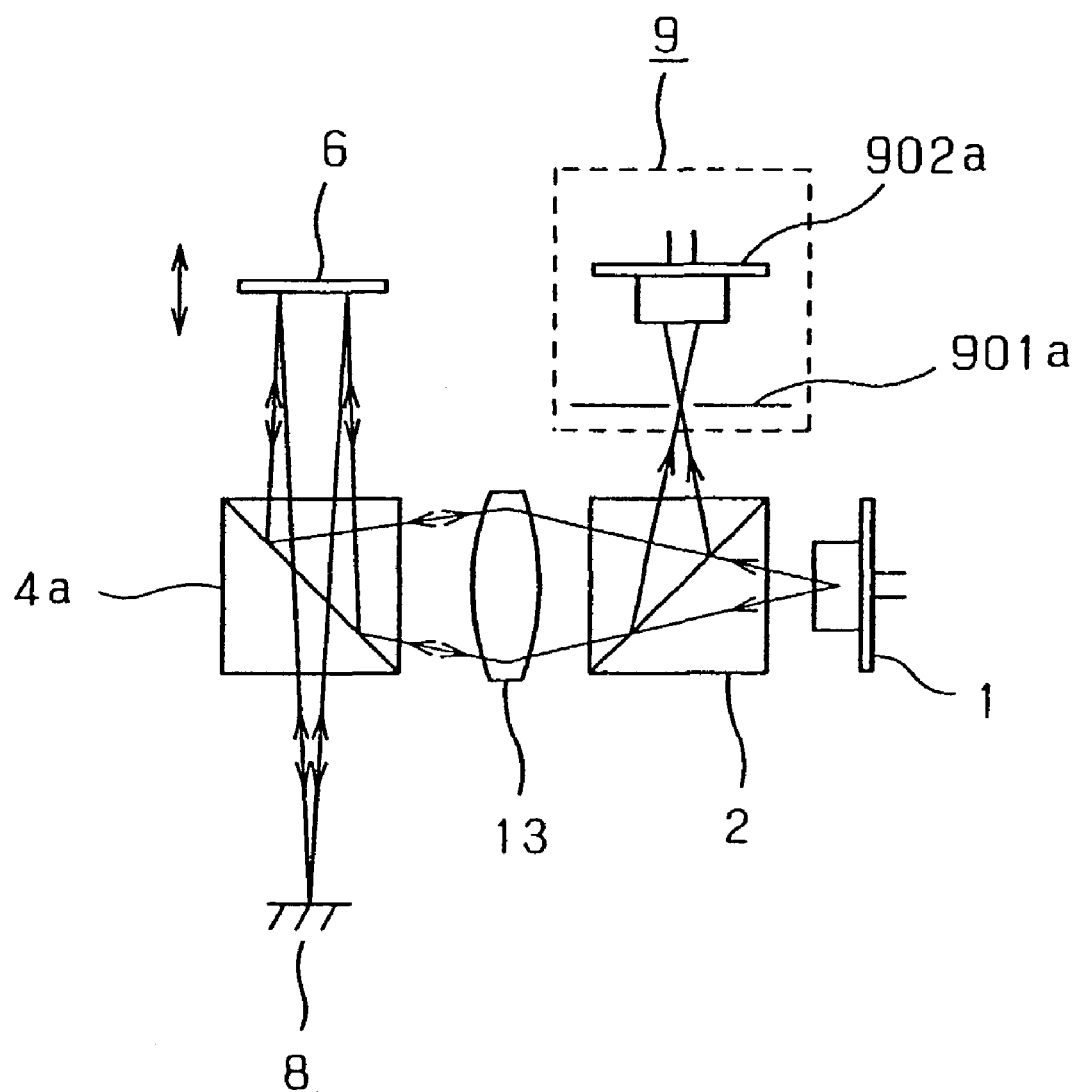
FIG. 15 shows a structure of another optical system in which a sixth light-converging element is used in the embodiment of FIG. 12.
Figure 16:
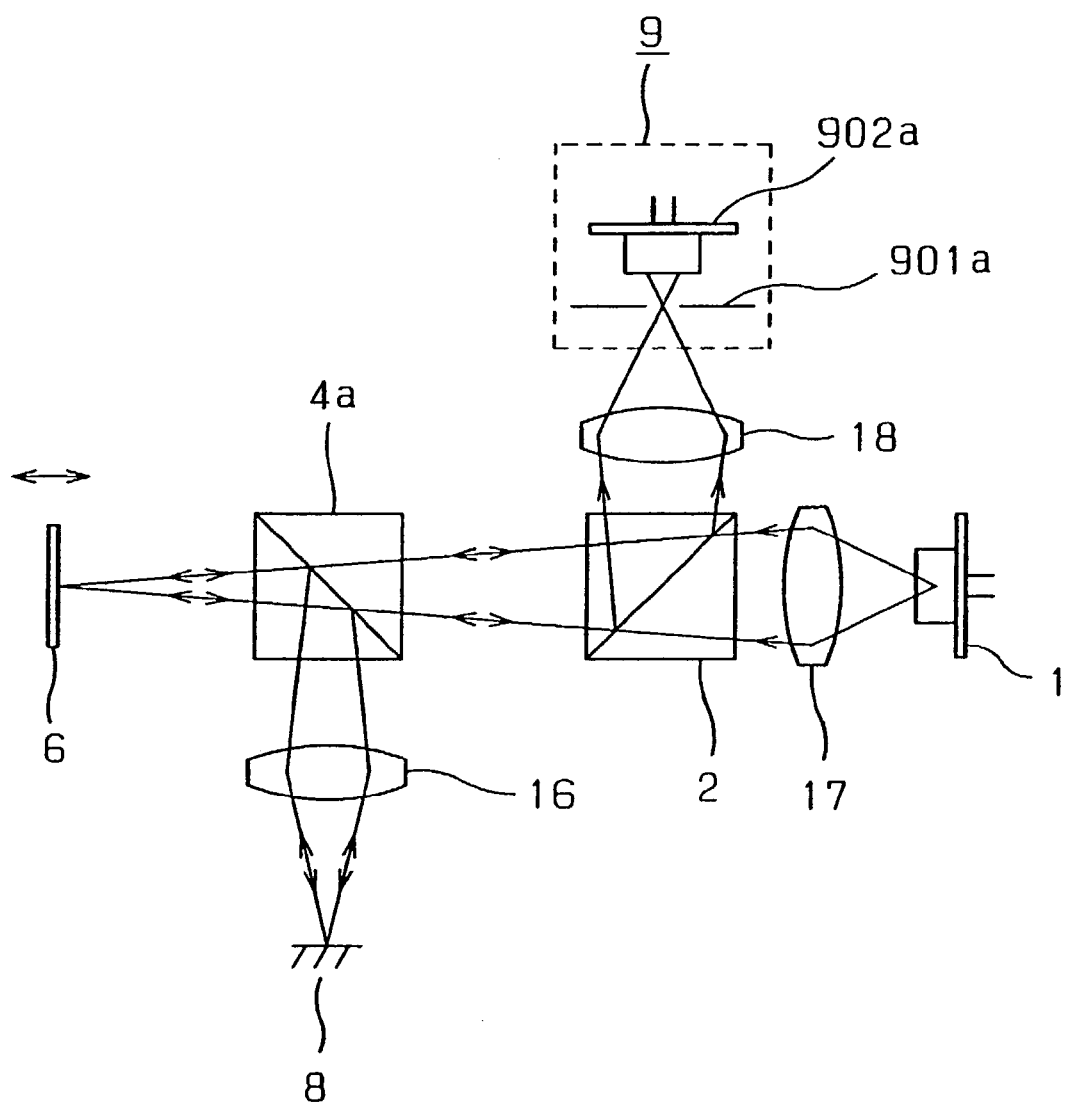
FIG. 16 shows a structure of an optical system in accordance with still another embodiment of the present invention.
Figure 17:
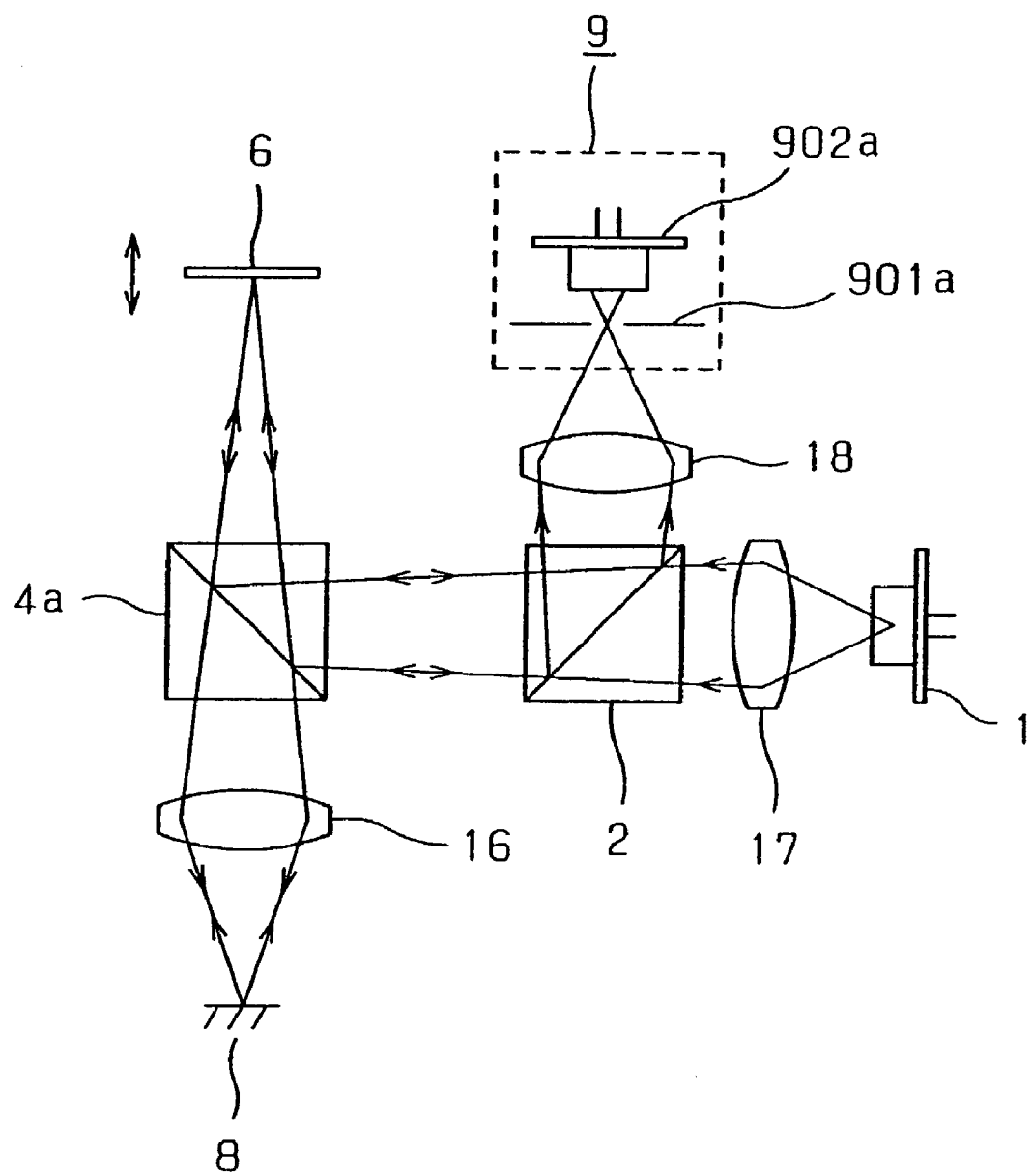
FIG. 17 shows a structure of another optical system in accordance with the embodiment of FIG. 16.
Figure 18:
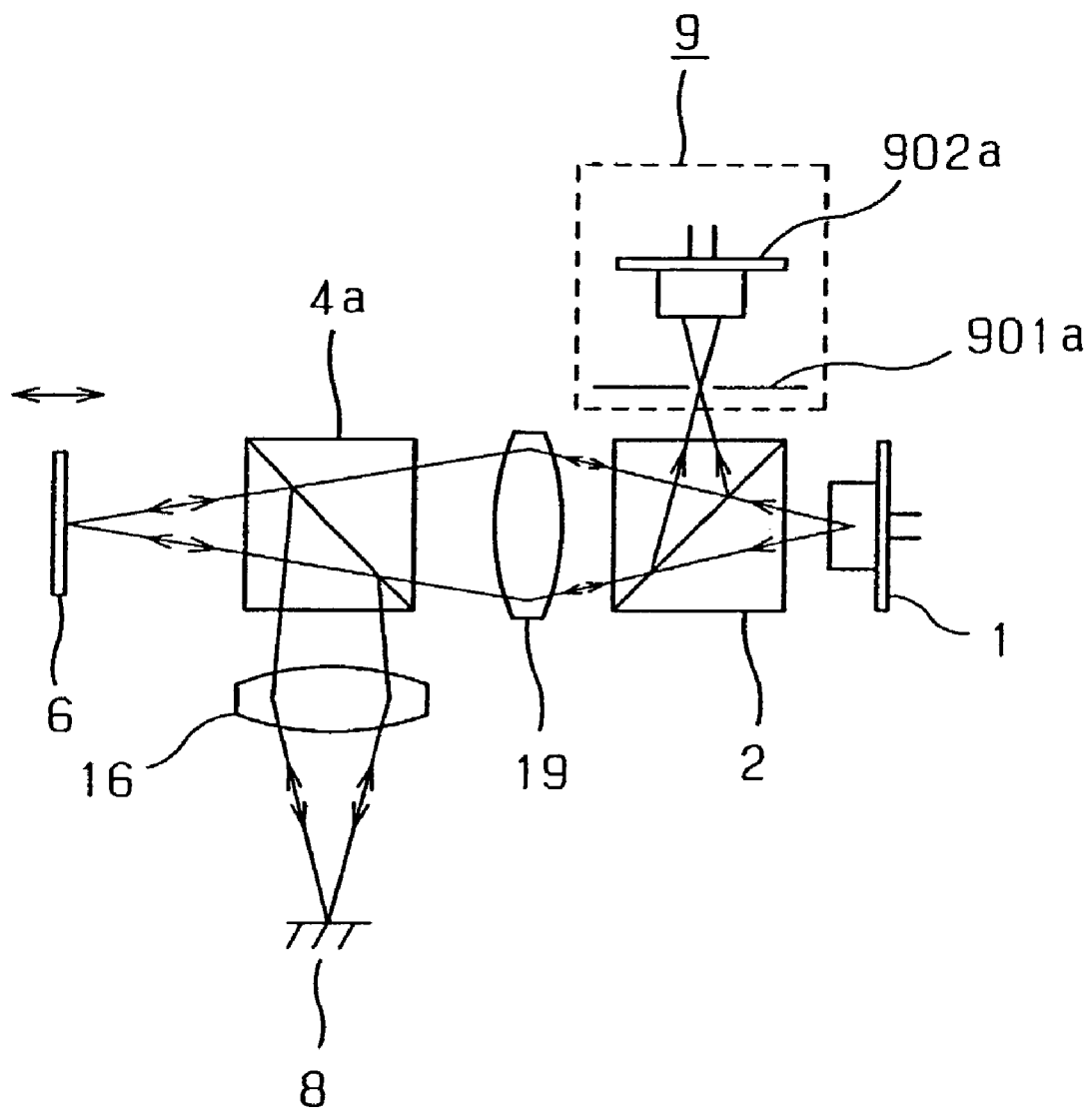
FIG. 18 shows a structure of an optical system in accordance with still another embodiment of the present invention.
Figure 19:
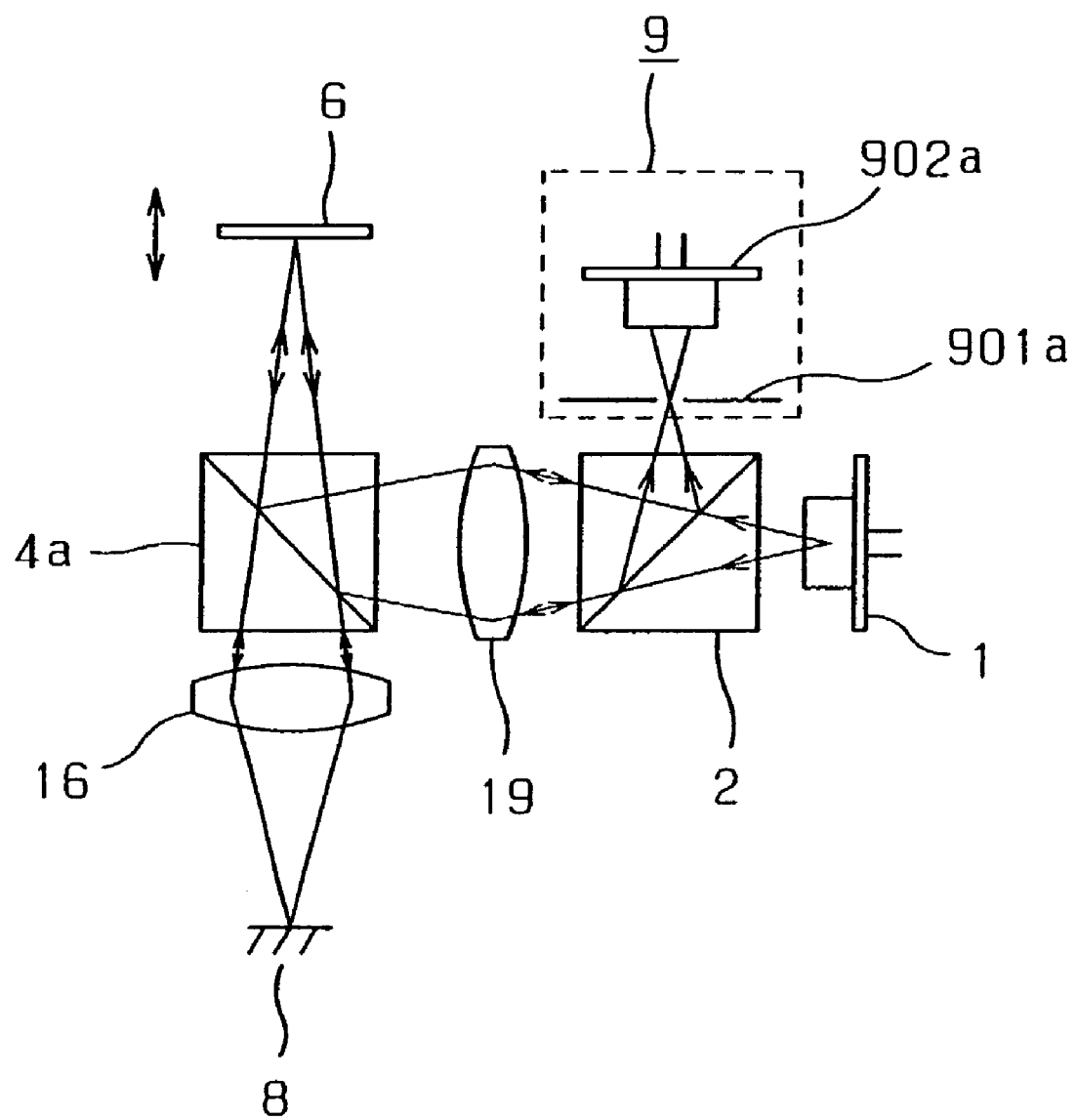
FIG. 19 shows a structure of another optical system in accordance with the embodiment of FIG. 18.
Figure 20:
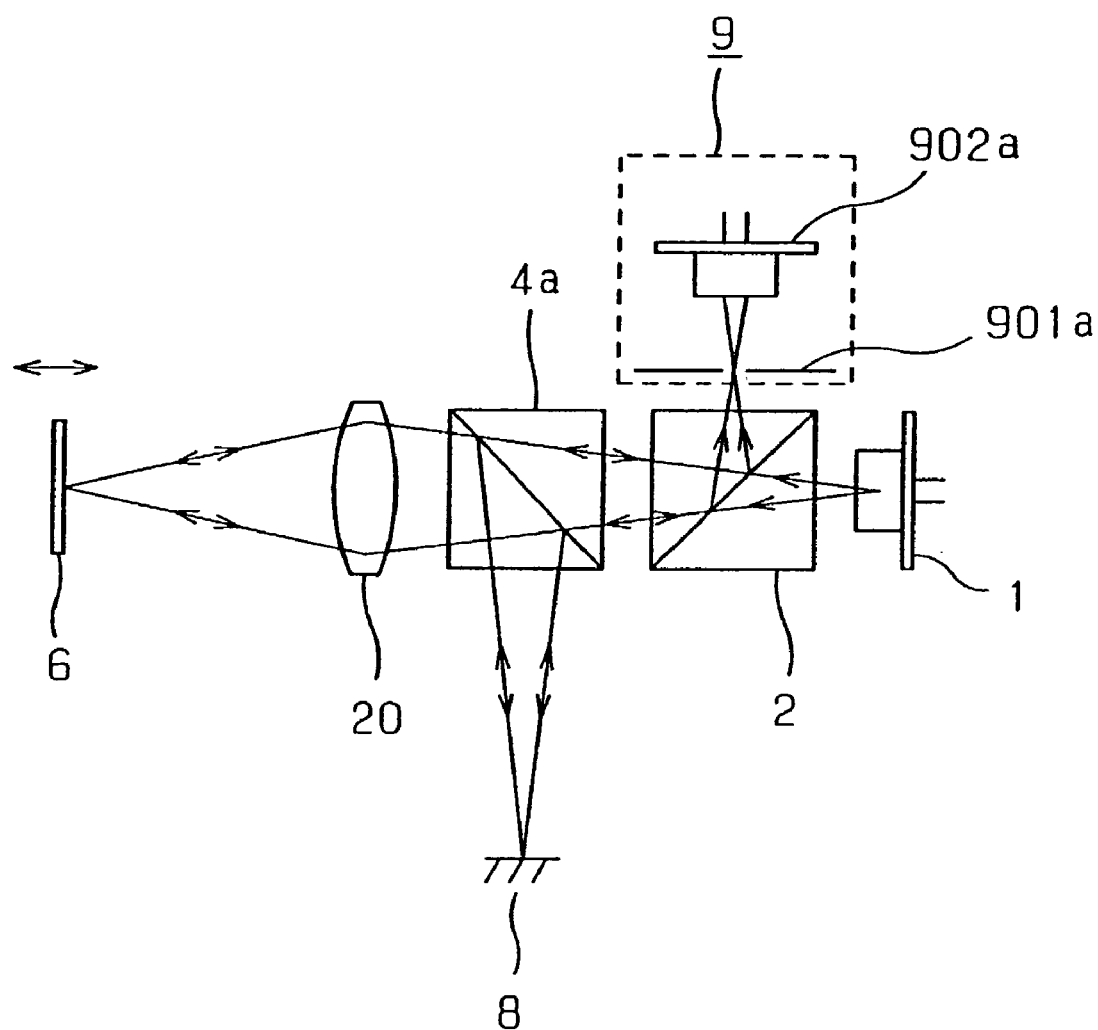
FIG. 20 shows a structure of an optical system in accordance with still another embodiment of the present invention.
Figure 21:
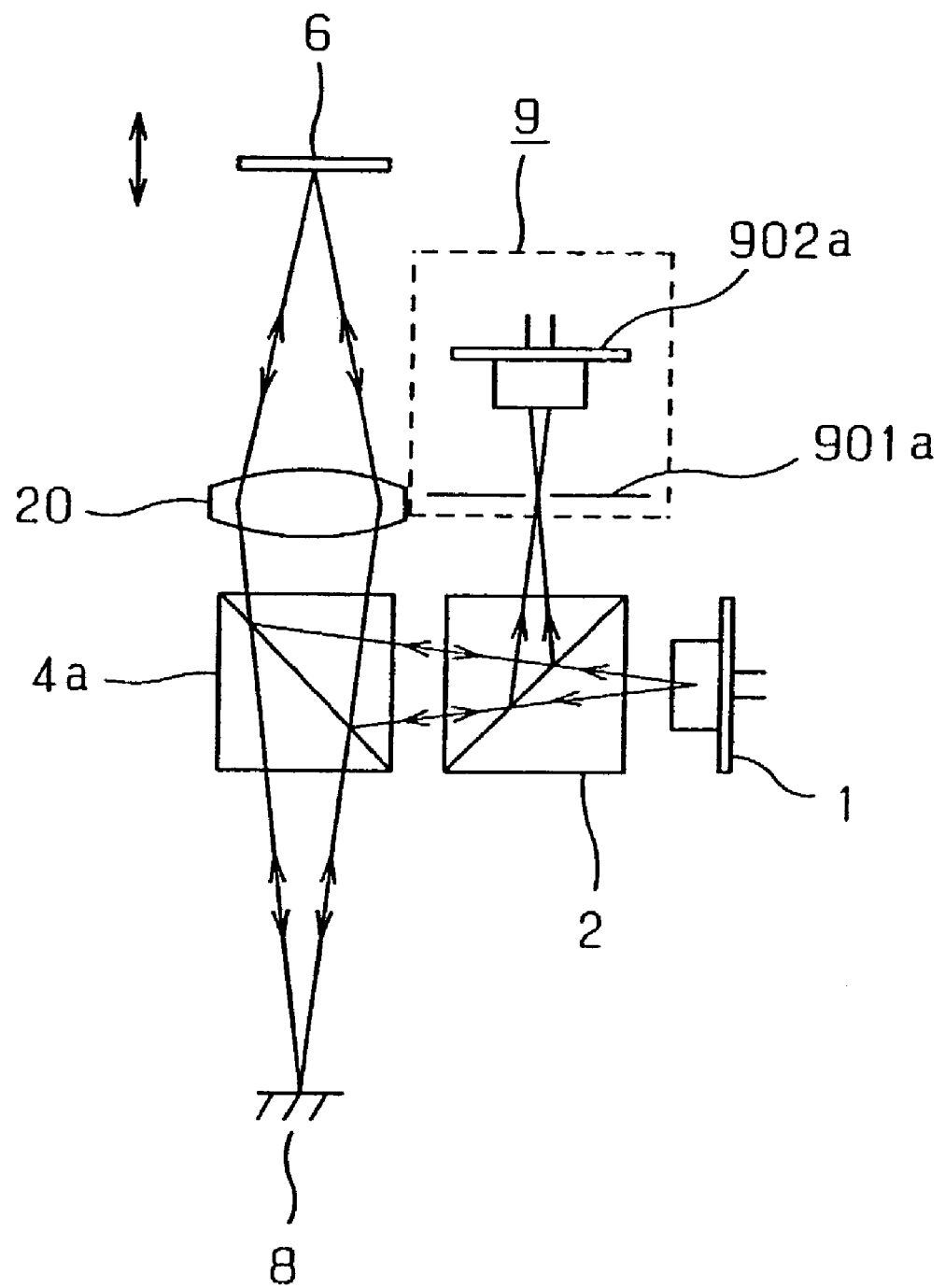
FIG. 21 shows a structure of another optical system in accordance with the embodiment of FIG. 20.
Figure 22:
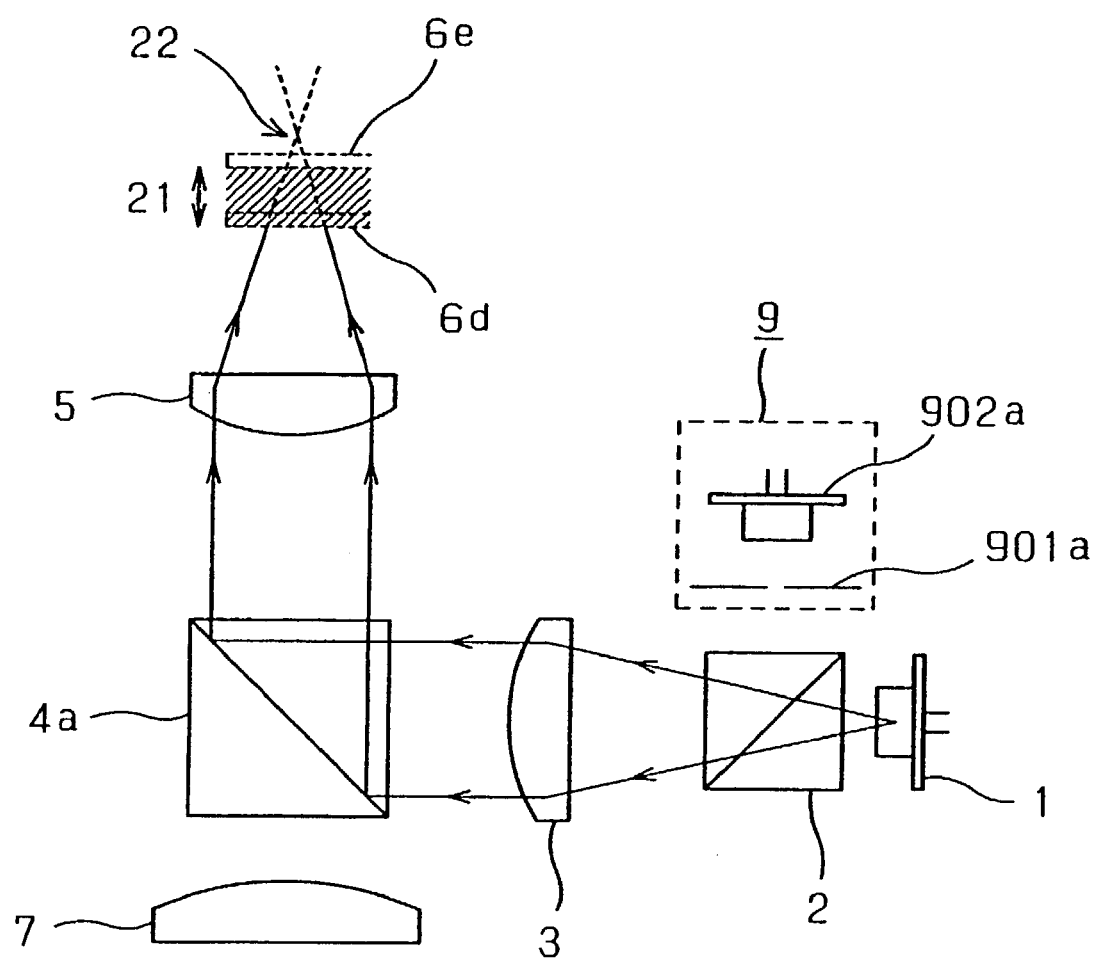
FIG. 22 is a drawing that shows a relationship between a structure of an optical system and luminous fluxes released from a light projection unit in another embodiment of the present invention.
Figure 23:
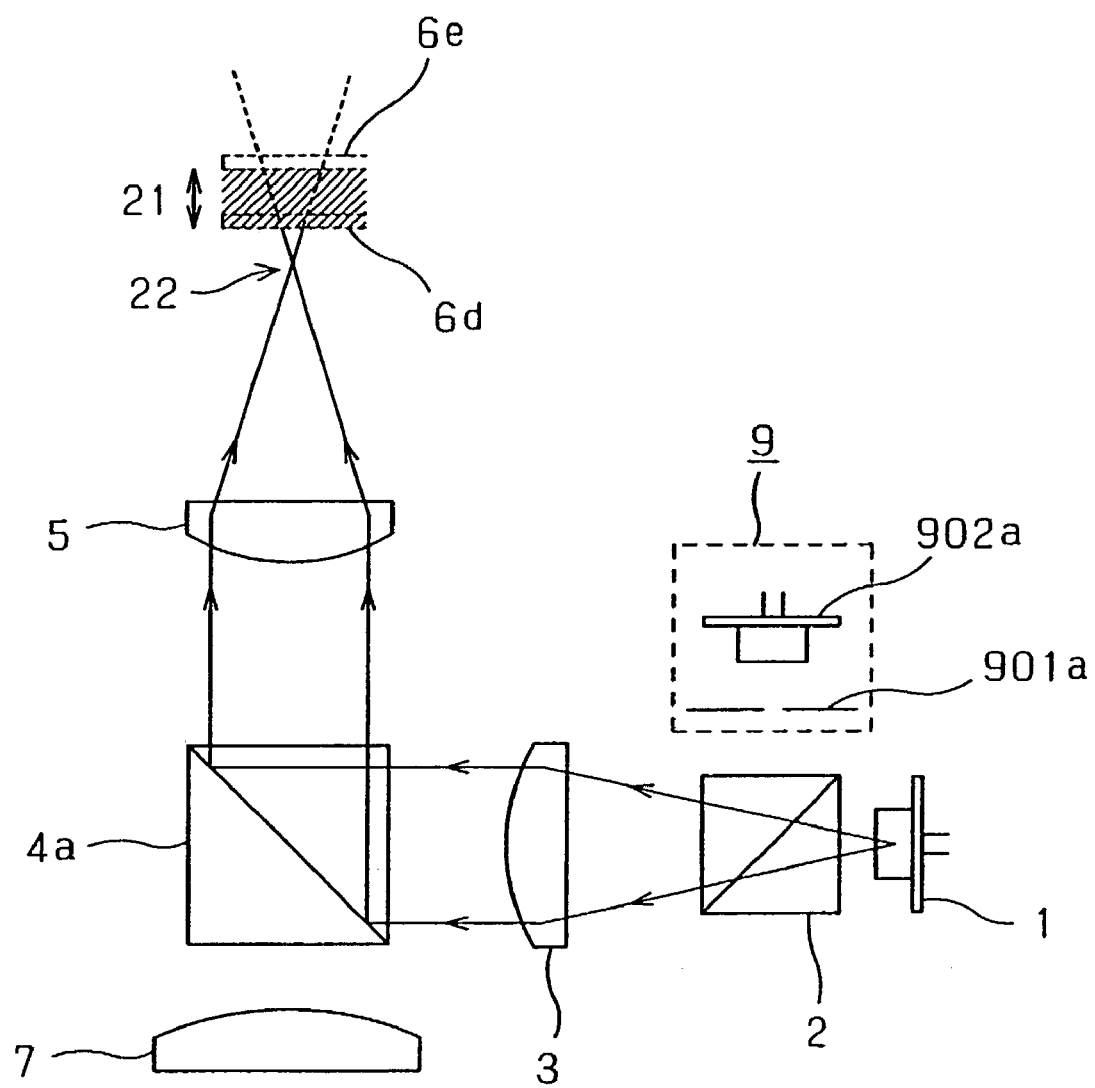
FIG. 23 is a drawing that shows a relationship between a structure of another optical system and luminous fluxes released from a light projection unit in the embodiment of FIG. 22.
Figure 24:
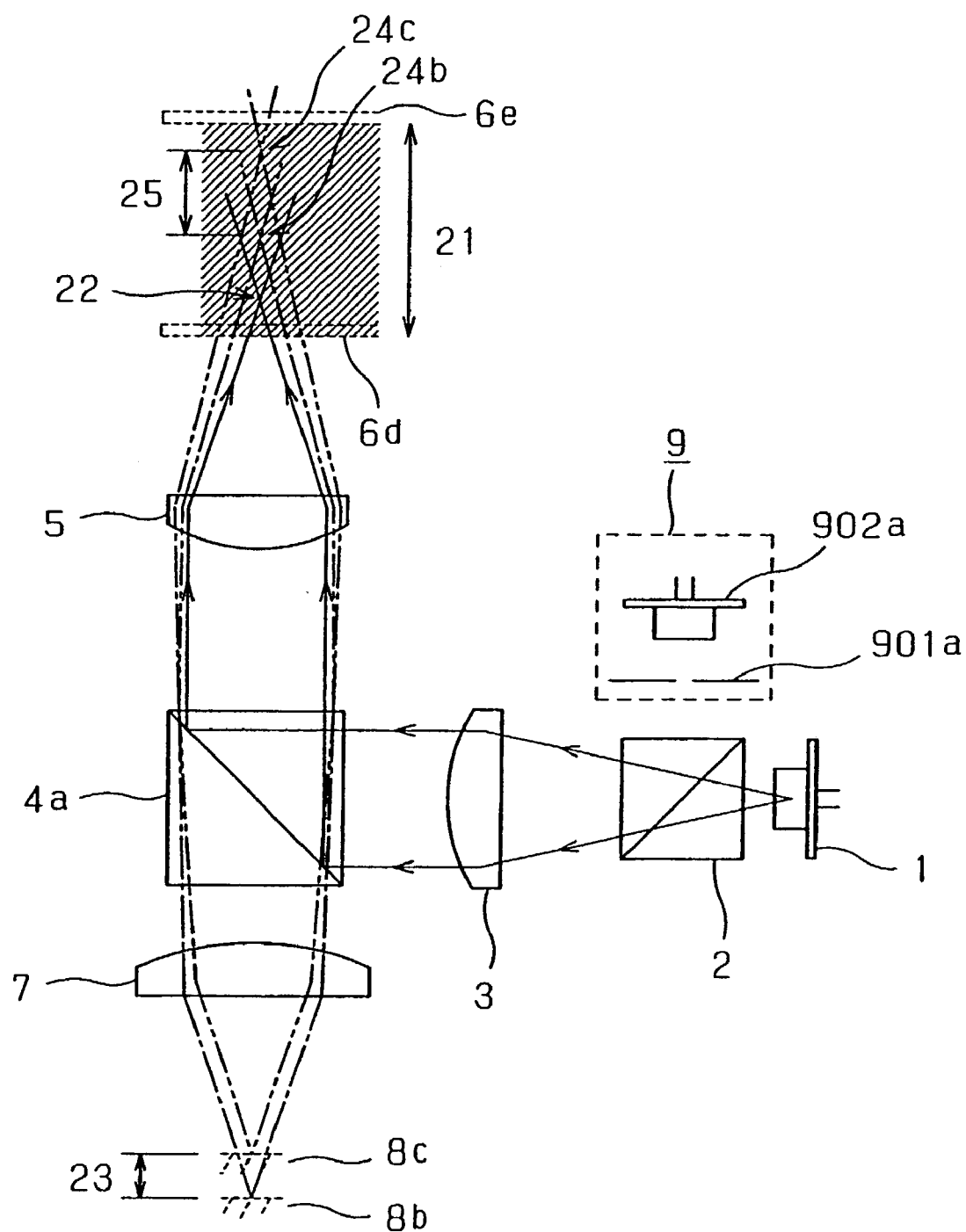
FIG. 24 is a drawing that shows a relationship between a structure of an optical system and luminous fluxes in still another embodiment of the present invention.
Figure 25:
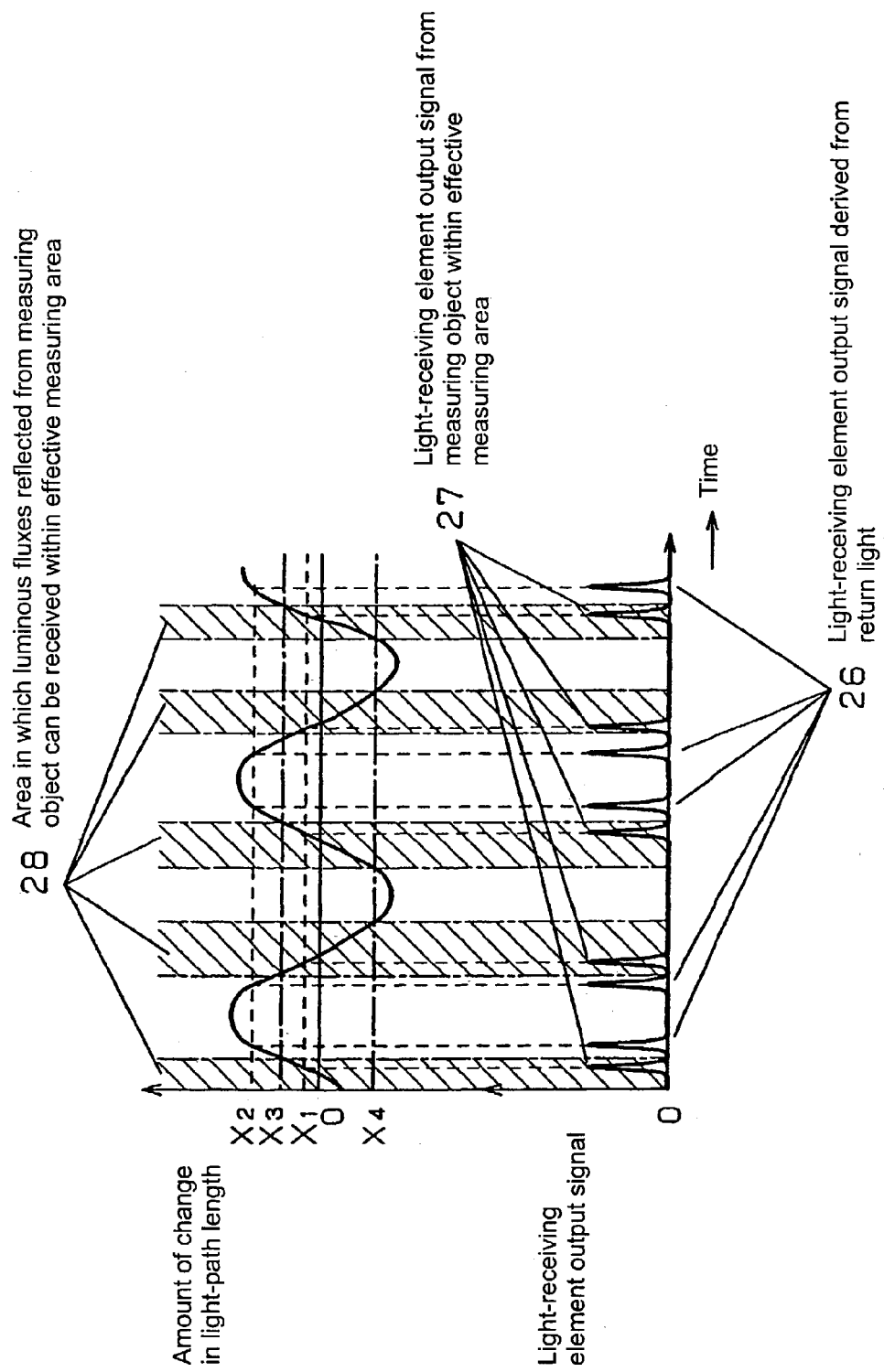
FIG. 25 is a drawing that shows an output signal of a light-receiving element in the embodiment of FIG. 24.
Figure 26:
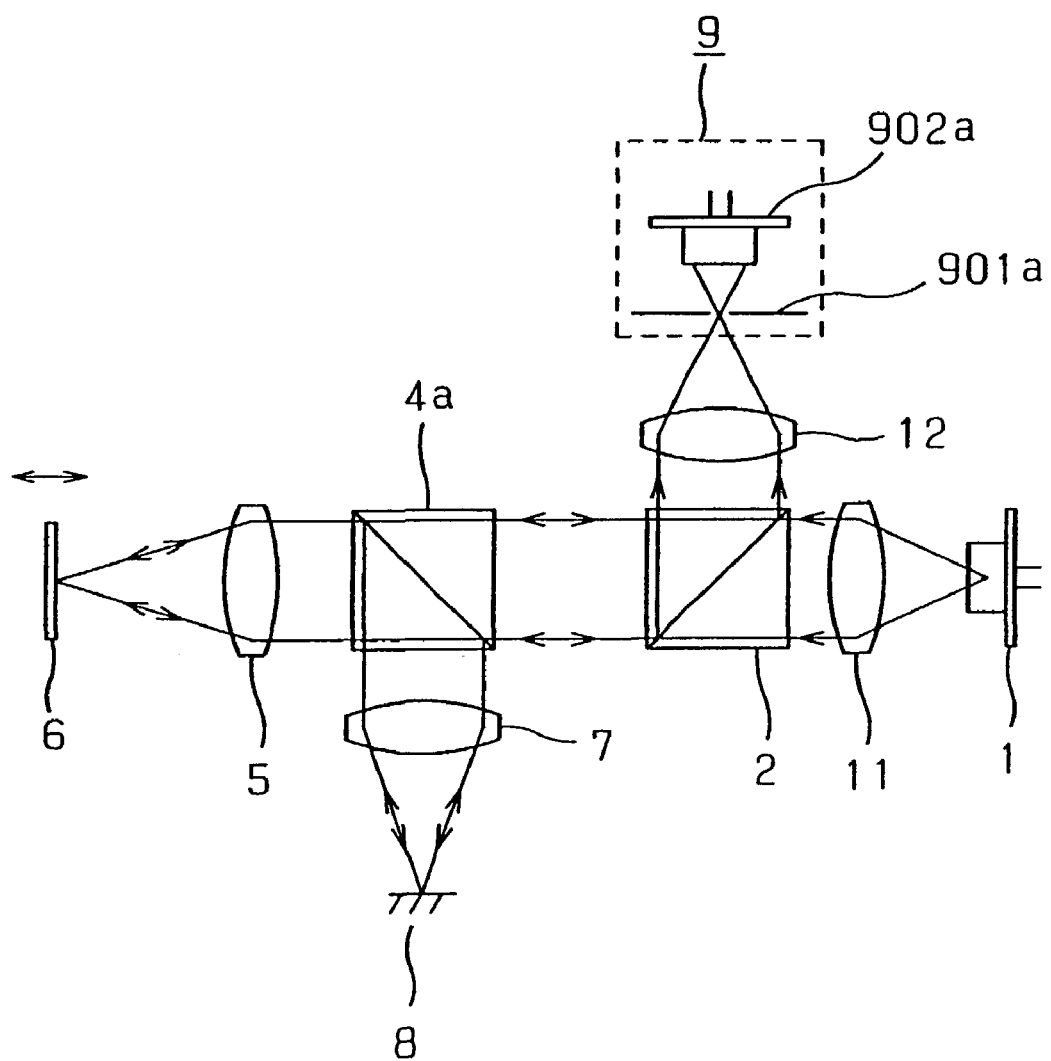
FIG. 26 shows a structure of an optical system in accordance with still another embodiment of the present invention.
Figure 27:
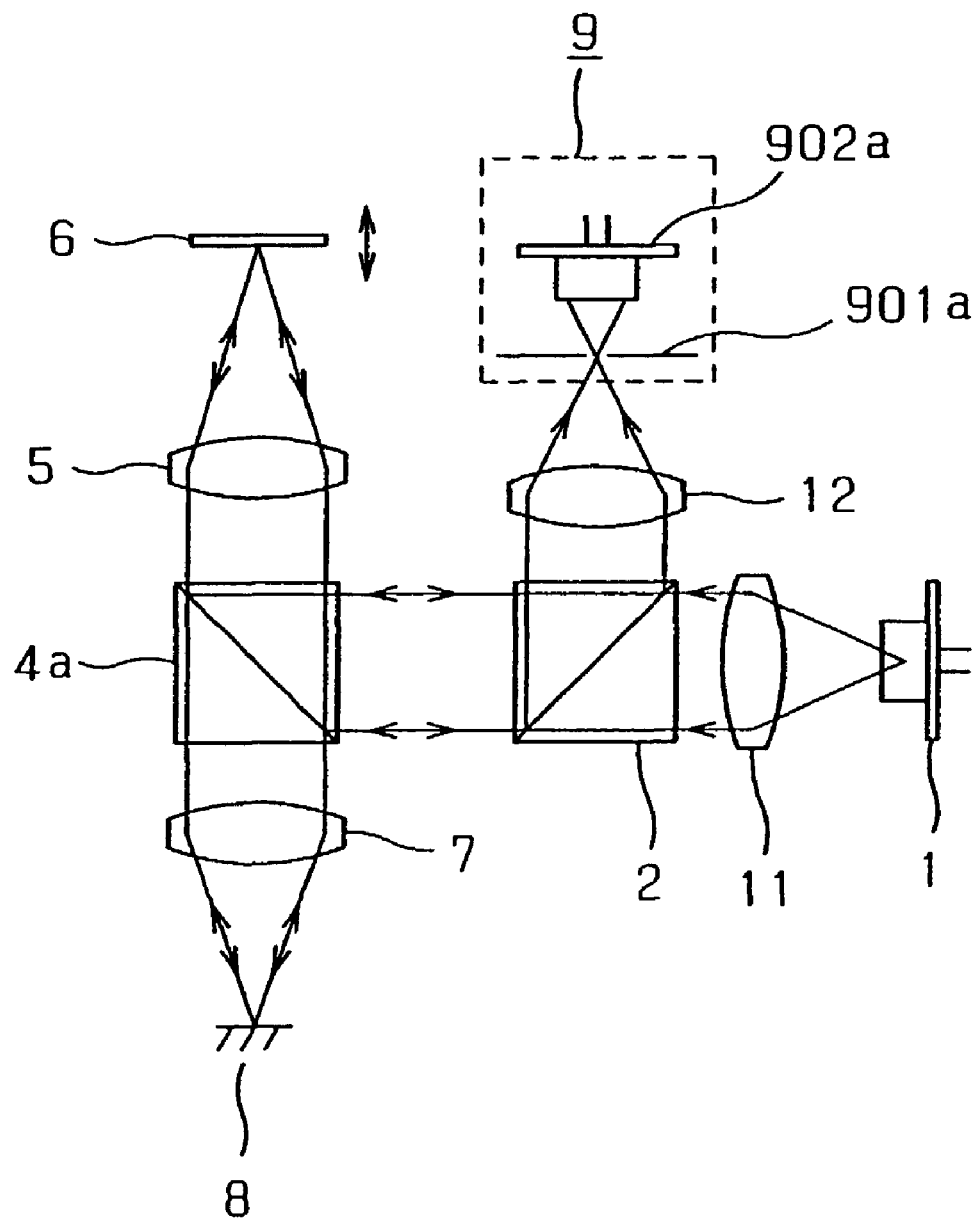
FIG. 27 shows a structure of another optical system in accordance with the embodiment of FIG. 26.
Figure 28:
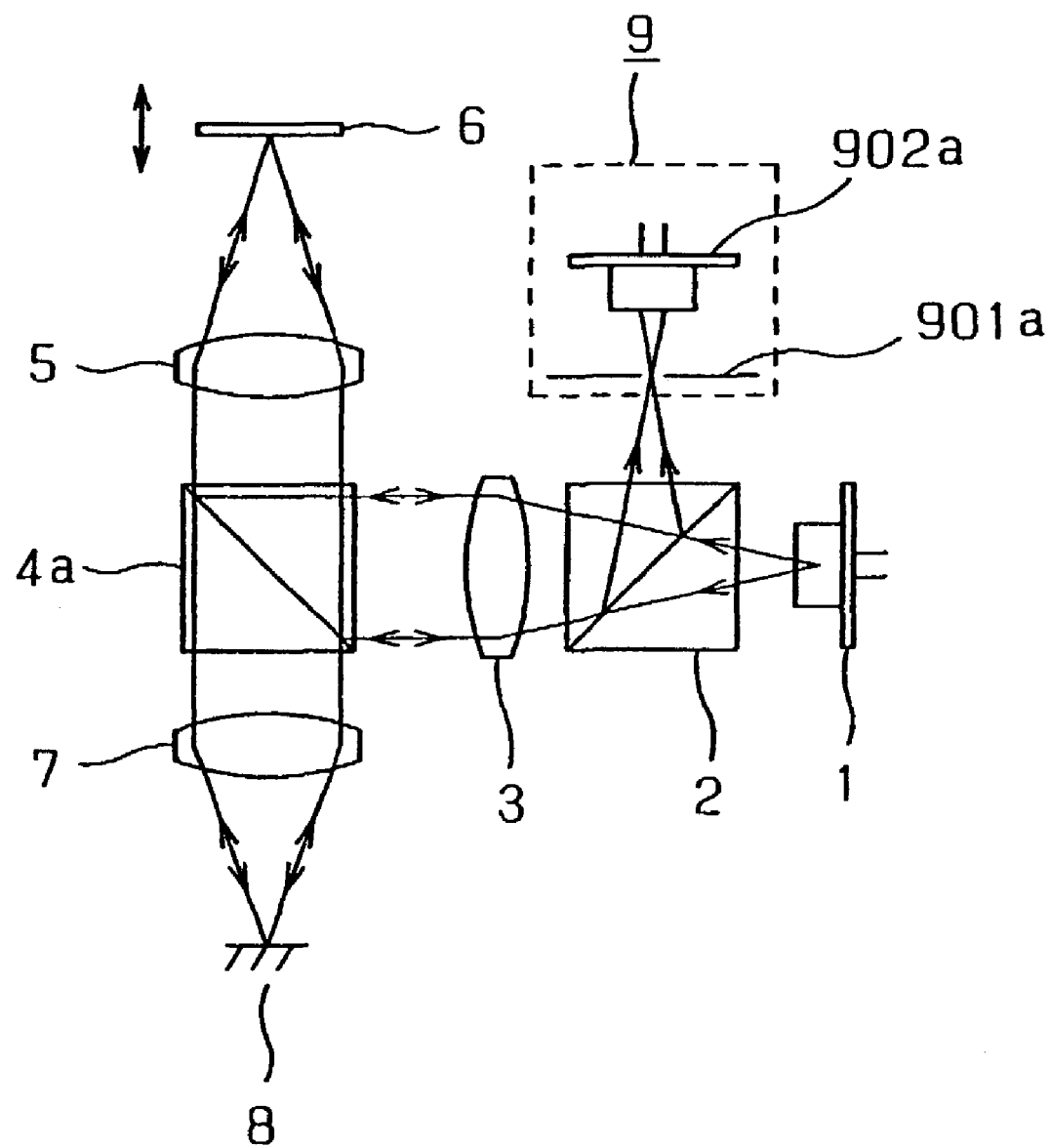
FIG. 28 shows a structure of an optical system in accordance with still another embodiment of the present invention.
Figure 29:
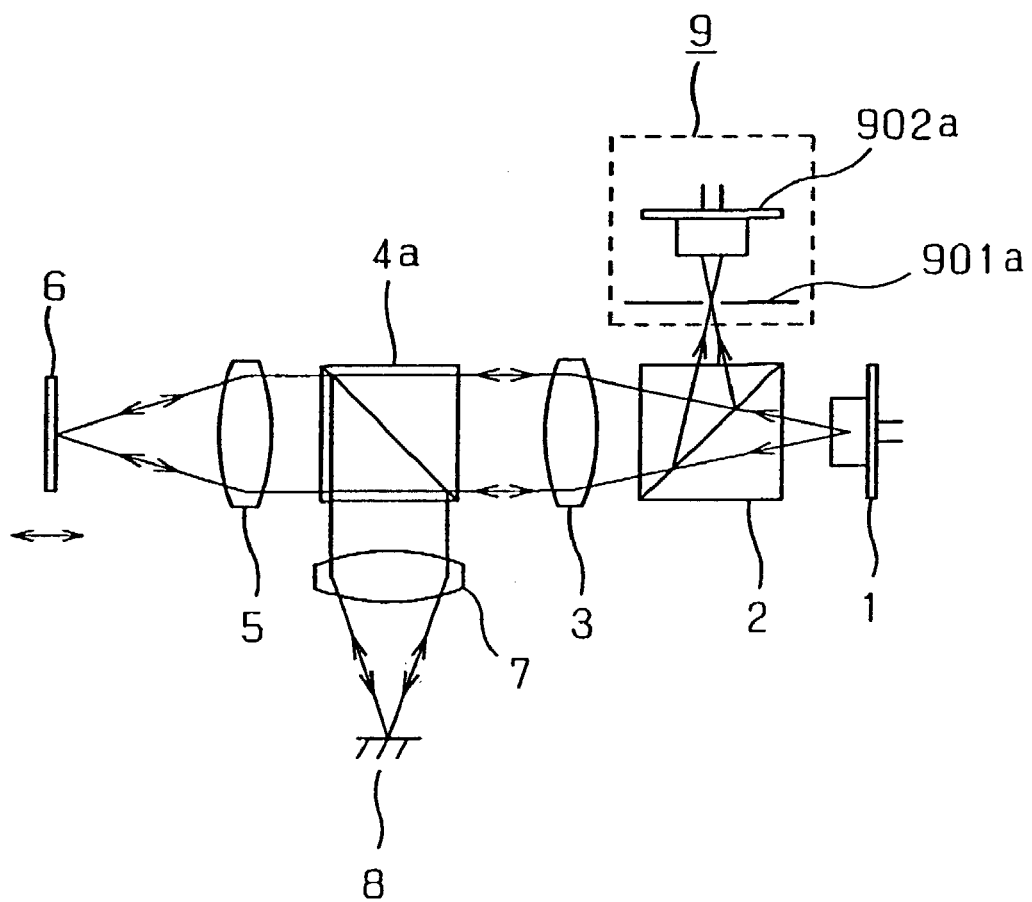
FIG. 29 shows a structure of another optical system in accordance with the embodiment of FIG. 28.
Figure 30:
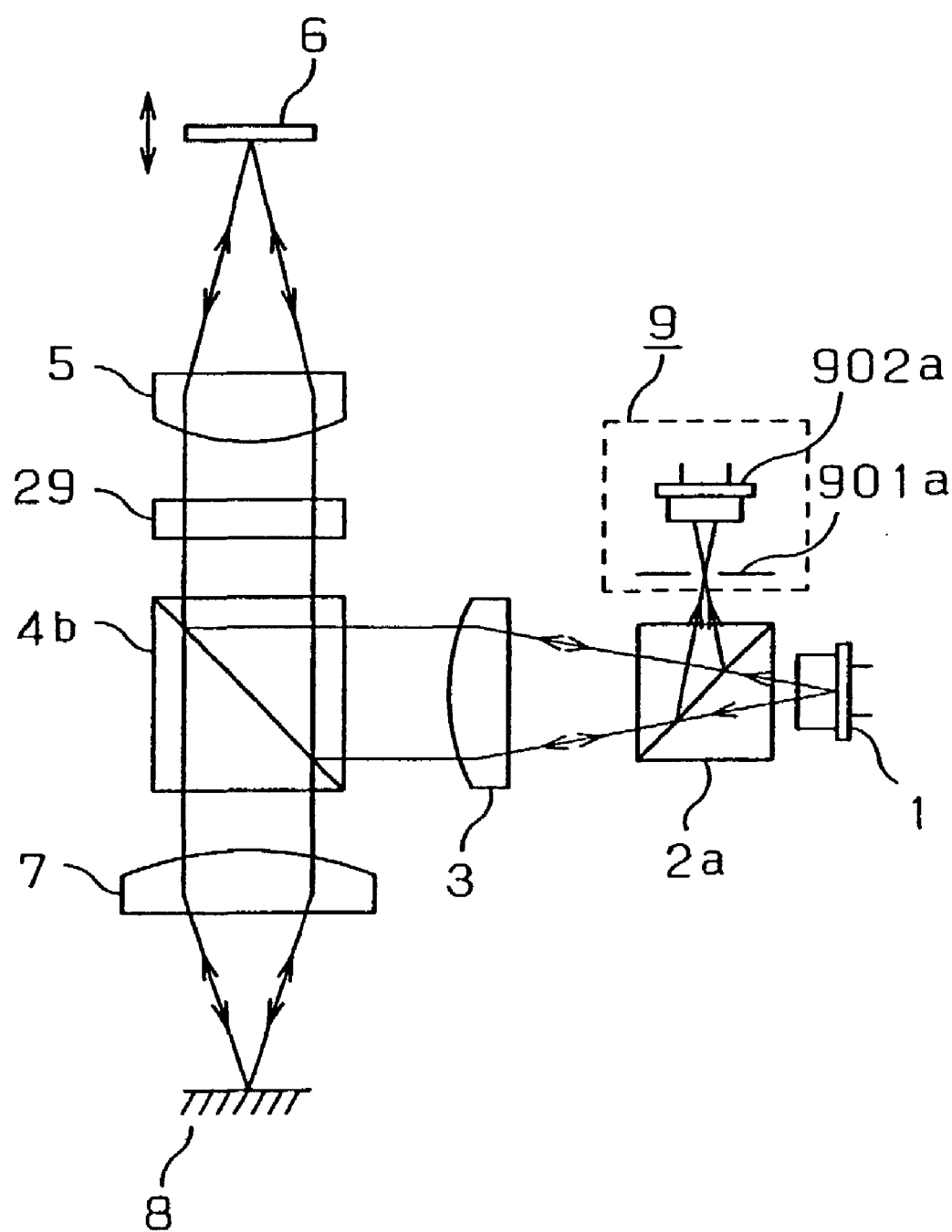
FIG. 30 shows a structure of an optical system in accordance with still another embodiment of the present invention.
Figure 31:
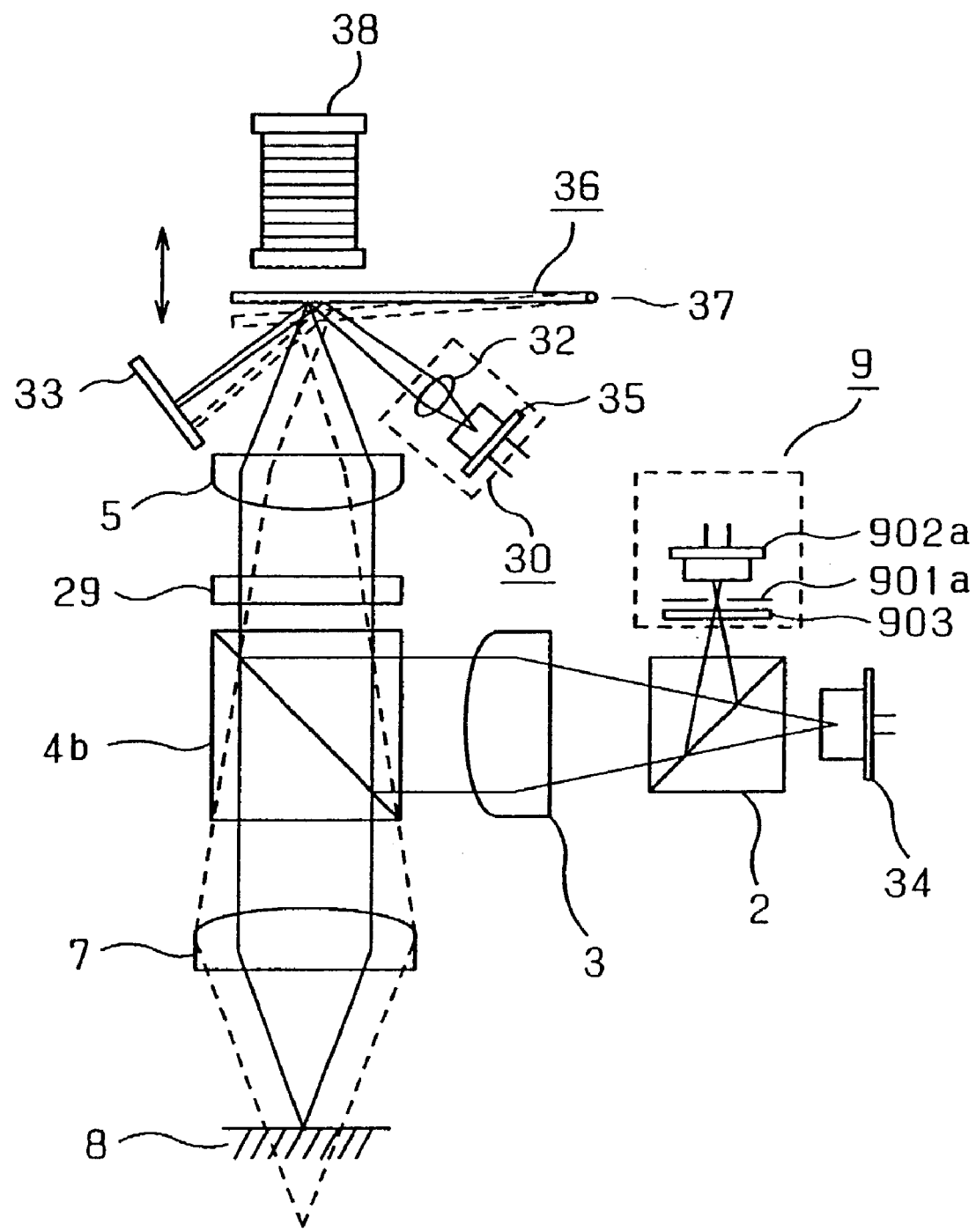
FIG. 31 shows a structure of an optical system in accordance with still another embodiment of the present invention.

FIG. 31 shows a layout of an optical system of the present displacement sensor. The optical system of the present sensor is provided with a red semiconductor laser 34 serving as a light projecting unit, a cube half mirror 2 serving as "a first light-path control element", a lens 3 commonly serves as a collimate lens and a light-receiving lens, an intermediate lens 5, an objective lens 7 serving as "a third light-converging element", a polarizing beam splitter 4b serving as "a second light-path control element", a ¼-wavelength plate 29 with respect to the wavelength of light released by the red semiconductor laser 34, a cantilever beam 36 and an electromagnet 38 serving as a light-path length sweeping mechanism, a pinhole 901a serving as a light-shielding mask of a light-receiving unit, a photodiode 902a serving as a light-receiving element of a light-receiving unit and a band-path filter 903.

Here, the lens 3, the intermediate lens 5 and the objective lens 7, which serve as "a first light-converging element", simultaneously function as "a second light-converging element". The collimate lens (lens 3 in the present embodiment), the intermediate lens 5 and the objective lens 7 correspond to "the first light-converging element" for converging a luminous flux released from a light projection unit onto a measuring object 8, and the objective lens 7, the intermediate lens 5 and the light-receiving lens (lens 3 in the present embodiment) correspond to "the second light-converging element" for converging a reflected luminous flux from the measuring object 8 to a luminous flux receiving unit, and in the present invention, since the lens 3 is commonly used as the collimate lens and the light-receiving lens so that the above-mentioned corresponding relationship is prepared.

Figure 32:
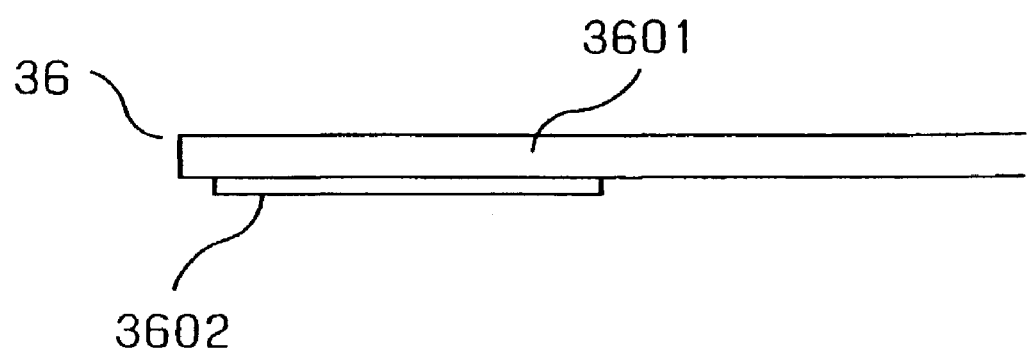
FIG. 32 shows a structural example of a cantilever beam in a light-path length sweeping mechanism.

The present displacement sensor is further provided with an infrared semiconductor laser 35 and a light-converging element 32 that constitute a light projection unit 30 for use in displacement amount measurements on a reflection face, and a position detection element 33. This Figure also shows the measuring object 8 in a combined manner. As shown in FIG. 32, the cantilever beam 36 is constituted by an oscillator 3601 and a mirror 3602 serving as a reflection face.

The light-projection light axis specified by the red semiconductor laser 34 and the lens 3 and the receiving-light light axis specified by the center of the pinhole 901a and the lens 3 are coaxially maintained on the measuring object 8 side by the cube half mirror 2. The light-emitting points of the pinhole 901a and the red semiconductor laser 34 are placed with a positional relationship in which they form mirror images with respect to the function of the cube half mirror 2.

A luminous flux with a plane polarization is released from the red semiconductor laser 34, and allowed to transmit the cube half mirror 2 so that it is formed into parallel luminous fluxes by the lens 3. The polarizing beam splitter 4b, which serves as the second light-path control element, is placed in a direction so as to reflect most of the parallel luminous fluxes with plane polarization. The parallel luminous fluxes reflected by the polarizing beam splitter 4b are converged in the vicinity of the mirror 3602 after having passed through the ¼-wavelength plate 29 and the intermediate lens 5, and also reflected by the mirror 3602 virtually perpendicular to the reflection face thereof. However, since the mirror 3602 forming the reflection face is displaced due to vibration of the cantilever beam with a point 37 serving as its fulcrum, a slight angle change occurs from the perpendicular direction. The luminous fluxes, reflected by the mirror 3602, are again made incident on the polarizing beam splitter 4b through the intermediate lens 5 and the ¼-wavelength plate 29. These luminous fluxes have plane polarization at 90 degrees with respect to the polarizing direction of the luminous fluxes directed toward the mirror 3602 prior to the transmission through the red ¼-wavelength plate, and are allowed to form parallel or virtually parallel luminous fluxes. These luminous fluxes are directed onto the measuring object 8 by the objective lens 7. After having been received by the objective lens 7, the reflected luminous fluxes from the measuring object 8 trace the path reversed to the irradiation path to the measuring object 8. In the case when the measuring object 8 is a mirror face object, since the polarizing direction of the reflected luminous fluxes is maintained, the 90-degree polarization is rotated through reciprocal transmissions through the ¼-wavelength plate in the same manner as the irradiation process, the reflected luminous fluxes are made incident on the cube half mirror 2 in the same polarizing direction as the polarizing direction of light that has been released by the red semiconductor laser 34. Here, in the case when the measuring object 8 is a diffusion reflective object, the polarizing direction of the reflected luminous fluxes includes various directions; however, only the components having the same polarizing direction as the direction at the time of the irradiation to the measuring object are allowed to reach the cube half mirror 2. Among the reflected luminous fluxes from the measuring object 8, those luminous fluxes reflected by the cube half mirror 2 are converged in the vicinity of the pinhole 901a, and the luminous fluxes that have passed through the pinhole 901a are received by the photodiode 902a. A band-pass filter, which allows only the wavelengths of the red semiconductor laser 34 to transmit, is inserted before the pinhole 901a so that stray light other than the reflected luminous fluxes from the measuring object 8 is removed.

Since the red semiconductor laser allows to visually observe spots on the measuring object 8, it is very convenient in the application of a sensor. Not limited to red, the color of the light is desirably set as long as it is visible light. Invisible light such as infrared light rays may also be used.

The reason that both of the cube half mirror 2 and the polarizing beam splitter 4b are formed into not a plate shape, but a cube shape is because the plate shape would cause astigmatism in the transmitted light, resulting in a spread minimum spot size on the measuring object as well as on the mask on which the pinhole is formed. Plate-shaped half mirror and polarizing beam splitter may be used with a plate-shaped light-transmitting medium (for example, transparent plate glass) being inserted into a light path; thus, the astigmatism may be corrected. Moreover, in FIG. 31, the cube half mirror 2 and the polarizing beam splitter 4b are set so that the respective incident luminous fluxes and reflected luminous fluxes are placed on the same plane; however, the present invention is not intended to be limited by this arrangement.

Moreover, since polarization is utilized, it is preferable to use a medium having virtually no birefringence, such a glass, as the optical parts that transmit luminous fluxes.

The luminous fluxes, released from the infrared semiconductor laser 35, are converged on the light-receiving face of the position detection element 33 by the light-converging element 32. The relationship among the width of the luminous fluxes, the incident angle onto the mirror 3602 and the size of the mirror 3602 is set to that, on the way to this process, all the luminous fluxes thus released are always reflected by the mirror 3602 even with displacement, and made incident on the position detection element 33. It is preferable to set the size of the mirror 3602 smaller, since this makes it possible to provide a higher frequency at the time of vibration. The spot size on the light-receiving face of the position detection element is preferably set to be as small as possible, since the greater spot size causes adverse effects on the resolution of the output of the position detection element. In the present arrangement, in an attempt to preferentially improve the resolution, the luminous fluxes are converged on the position detection element; however, in an attempt to preferentially increase the sweeping frequency, the luminous fluxes may be converged on the mirror 3602. The infrared semiconductor laser 35 is used because the application thereof makes it possible to prevent stray light such as diffused light from optical parts from being made incident on the photodiode 902a and causing degradation in the S/N ratio of weak reflected light from the measuring object 8 that is derived from light of the infrared semiconductor laser 34. Therefore, not limited to infrared rays, the wavelength of the infrared semiconductor laser 35 may be set to any wavelength as long as it is not transmitted by the band pass filter 903, with the same effects.

Figure 33:
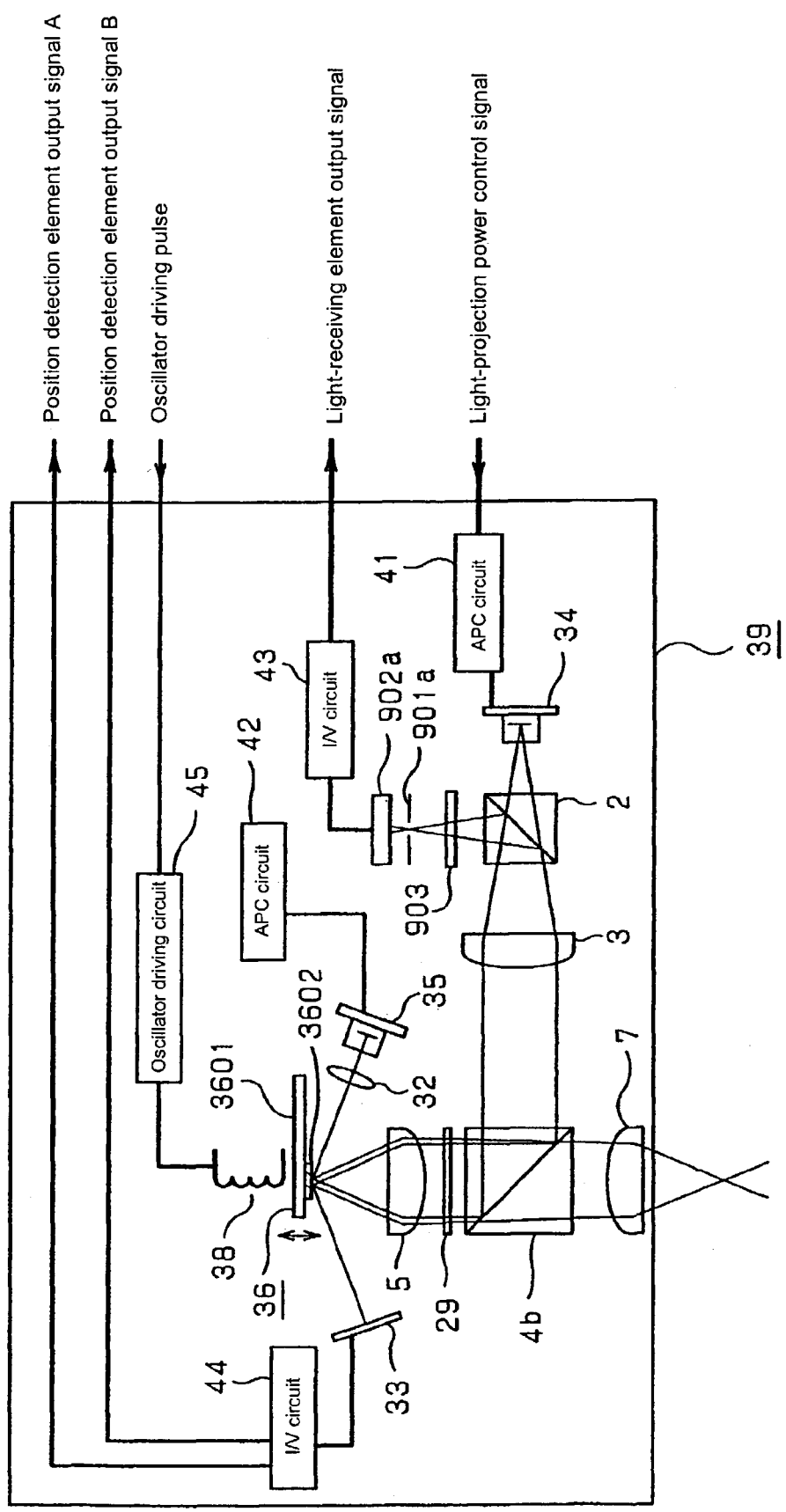
FIG. 33 shows an inner structure of a sensor head in accordance with one embodiment of the present invention.
Figure 34:
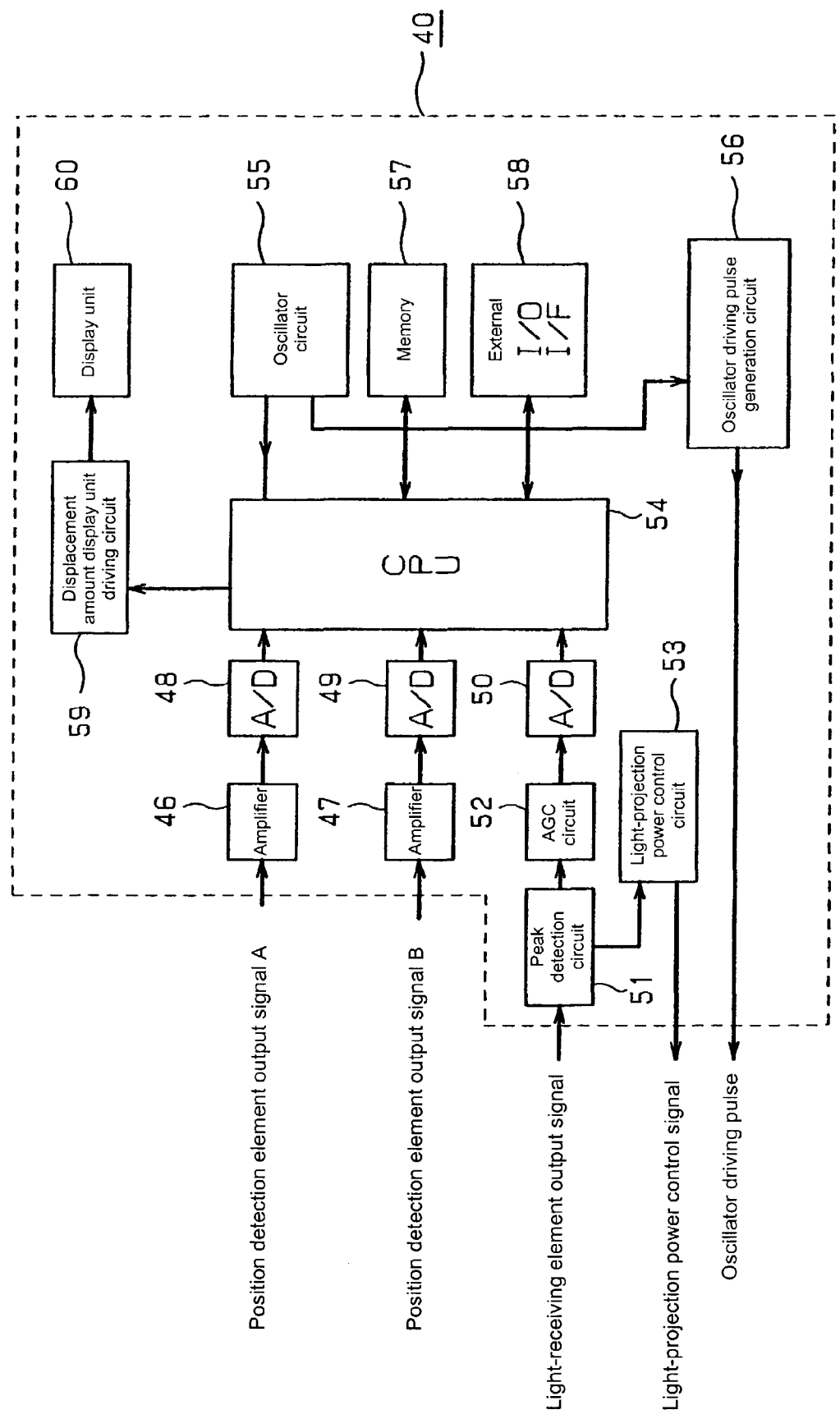
FIG. 34 shows an inner structure of a controller unit that is connected to the sensor head in accordance with the embodiment of the present invention.
Figure 35:
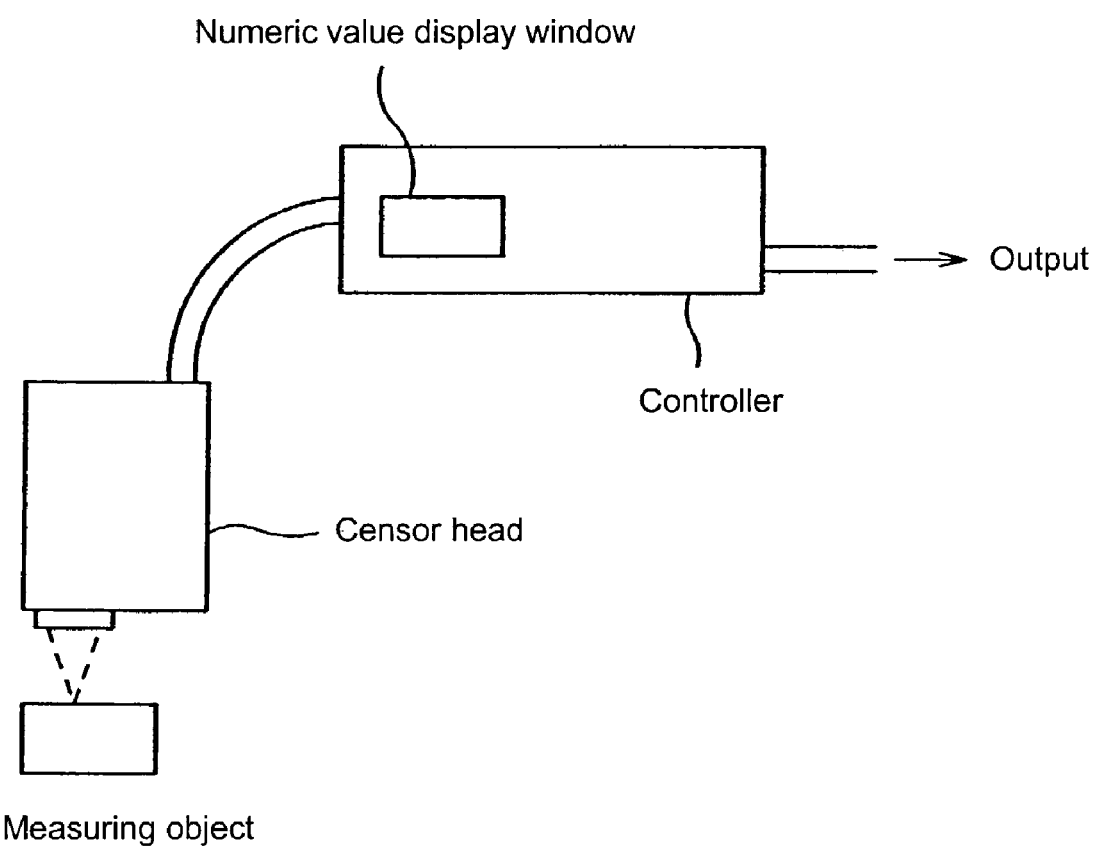
FIG. 35 shows an entire structure of a displacement sensor in accordance with the present invention.

Next, FIG. 33 shows an inner structure of a sensor head of the present sensor, and FIG. 34 shows an inner structure of a controller unit to be connected to the sensor head. FIG. 35 shows the entire structure of the present displacement sensor that is constituted by the sensor head and the controller.

In addition to the optical system explained by the above-mentioned FIG. 31, the sensor head 39 is provided with an APC circuit 41 for use in the red semiconductor laser 34, an APC circuit 42 for use in the infrared semiconductor laser 35, an I/V circuit 43 for use in the photodiode 902a, an I/V circuit 44 for use in the position detection element and an oscillator driving circuit 45.

The APC circuits 41, 42 are circuits which are used for driving the semiconductor layer with its output being maintained at a constant level, and in particular, the APC circuit 41 also has a function for controlling the size of the output of the semiconductor laser 35 in accordance with a projection light power control signal from the controller. The I/V circuit 43 is a circuit which converts an output current of the photodiode 902a to a voltage, and outputs the resulting light-receiving element output signal to the controller, and the I/V circuit 44 is a circuit which converts two output currents from the position detection element 33 into respective voltages, and outputs the resulting position detection element output signals A, B to the controller. The oscillator driving circuit 45 is a circuit for supplying a current used for driving the electromagnet 38 in accordance with an oscillator driving pulse released from the controller. Since the light-path length sweeping mechanism has a structure in which the cantilever beam 36 having the oscillator 3601 to which the mirror 3602 is attached is driven by the electromagnet 38, a magnetic material is used for the oscillator 3601. In FIG. 32, the mirror 3602 is bonded to the oscillator 3601; however, the surface of the oscillator may be polished to a mirror face, or a vapor deposition process may be carried out on the polished surface to form a mirror face.

The controller 40 is provided with amplifiers 46, 47, A/D conversion circuits 48, 49, 50, a peak detection circuit 51, an AGC (automatic gain control) circuit 52, a light-projection power control circuit 53, a CPU 54, an oscillator circuit 55, an oscillator driving pulse generation circuit 56, a memory 57, an outside I/O interface 58, a displacement-amount display unit driving circuit 59 and a display unit 60.

The position detection element output signals A, B from the sensor head are respectively amplified by the amplifiers 46, 47, converted to digital signals by the A/D conversion circuits 48, 49, and inputted to the CPU. The light-receiving element output signal from the censor head is first measured by the peak detection circuit 51 in its light-receiving amount. In accordance with the size, the light-projection power control circuit 53 sends a light-projection power control signal for optimizing the light-emitting power of the red semiconductor laser 34 to the APC circuit 41 of the sensor head 39 so that a feed-back controlling process is carried out. Next, the light-receiving element output signal is amplified or attenuated through the AGC circuit, converted to a digital signal by the A/D conversion circuit, and inputted to the CPU 54.

The oscillator circuit 55 is used as a reference clock for the CPU 54 and the oscillator driving pulse generation circuit 56. The oscillator driving pulse generation circuit 56 gives an oscillator driving pulse to the oscillator driving circuit 45. The oscillator driving pulse determines the pulse width and the period of a current to be applied to the electromagnet 38 so as to drive the oscillator 3601. The memory 57 stores the measured values and conversion equations to the displacement amount, and also stores data required for the CPU 54 to carry out the displacement-amount calculations. The resulting displacement amount is outputted through the outside I/O interface. The controller 40 is provided with a display unit 60 so that the display unit 60 displays the amount of displacement through the displacement-amount display unit driving circuit 59. The CPU 54 detects a receiving-light element output signal through the A/D conversion circuit 50 so that the position-detection element output signals A and B (converted to digital signals by A/D conversion circuits 48, 49) are obtained in synchronized timing with the generation of the light-receiving element output signal; thus, calculations are carried out so as to obtain the position-detection element output calculation result, Y=A/(A+B), which has a correlation with the amount of change in the light-path length. Referring to the contents of the memory 57, the amount of displacement of the measuring object corresponding to the position-detection element output calculation result Y is found. Moreover, the amount of displacement of the measuring object thus found is outputted to the outside I/O interface 58 and the displacement-amount display unit driving circuit 59.

Figure 36:
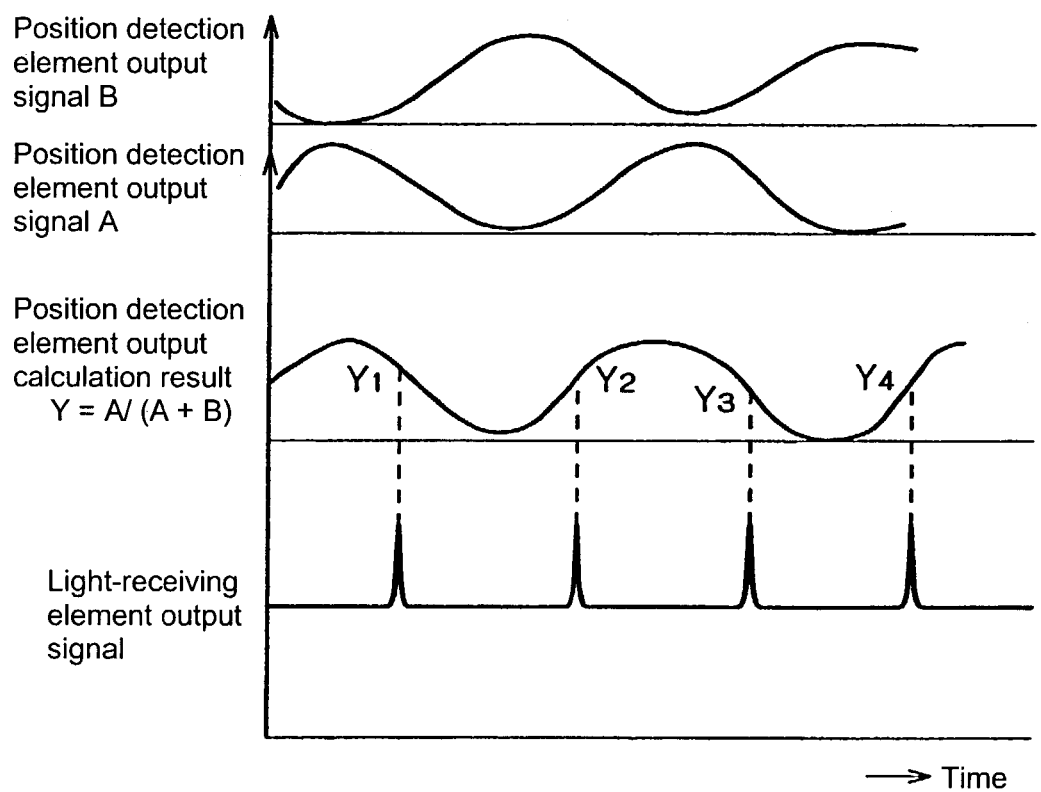
FIG. 36 is a drawing that shows a light-receiving element, an output signal of a position-detection element and calculation results of the position-detection element output in accordance with the 13$^{th}$ embodiment of the present invention.

FIG. 36 is a drawing that shows the output signal, and the like of the light-receiving element obtained by the present embodiment. In accordance with the displacement of the mirror 3602, the position detection element output signals A, B are changed in the form of a sine wave so that the light-receiving element output signal is obtained as pulses in response to the time at which the irradiation luminous fluxes are converged on the measuring object 8. The present embodiment deals with a case in which the range in which the mirror 3602 is displaced along the light-axis direction does not contain a position at which the luminous fluxes released from the red semiconductor layer 34 are converged by the intermediate lens 5, and the return light from the mirror 3602 is not included in the output signal of the light-receiving element. The position-detection element output calculation results Y=A/(A+B), obtained from the position-detection element output signals A, B at the time when the pulse of the light-receiving element output signal has a peak, are indicated as Y1, Y2, Y3, Y4. Here, conversion equations from the position-detection element output calculation result Y to the amount of displacement of the measuring object 8 have been preliminarily stored in the memory 57 so that the corresponding amount of displacement is calculated.

For example, the amount of displacement ΔX of the measuring object 8 is calculated from the following conversion equations based upon the relationship of lens converged images.

$\Delta X = L2 - L0$ $L2 = 1/\{1/F - 1/L1\}$ $L1 = D + H \cdot A/(A+B)$

Here, F represents a focal length of a composite lens of the intermediate lens 5 and the objective lens 7 (hereinafter, referred to as composite lens), L0 represents a distance between the reference position of the measuring object and the main point on the measuring object side of the composite lens, L1 represents an optical distance between the point at which luminous fluxes released from the semiconductor laser 34 are converged in the vicinity of the mirror 3602 and the main point on the mirror 3602 side of the composite lens, L2 is a distance between the measuring object 8 (which is coincident with the image of the mirror 3602 formed by the composite lens) and the main point on the measuring object side of the composite lens, and D and H are constants. The constants D, H can be obtained by actually displacing the measuring object by a predetermined amount.

Moreover, not limited to this method, by actually displacing the measuring object by predetermined amounts, the corresponding position-detection element output calculation results Y are maintained as a list of data, and the amount of displacement may be calculated by carrying out interpolation processes on these data, or a conversion equation may be directed from the list of data of the position-detection element output calculation results by using an appropriate approximation so that the amount of displacement may be calculated by the conversion equation.

Figure 37:
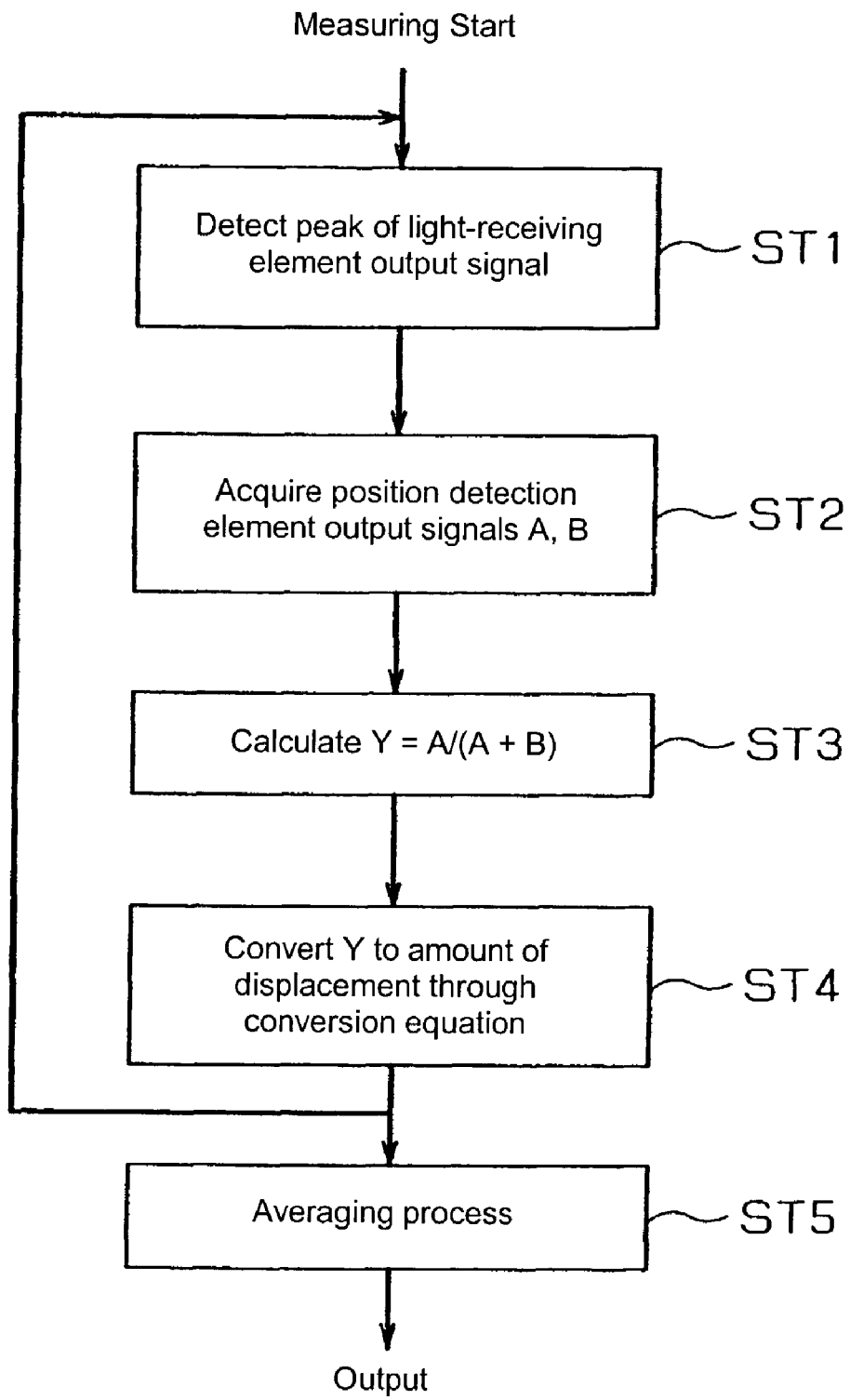
FIG. 37 is a flow chart that shows the sequence of measurements of amount of displacement in accordance with one embodiment of the present invention.

FIG. 37 shows a flow chart that indicates the above-mentioned processes. Processes from ST1 to ST5 are carried out by the CPU. After the start of the measuring processes, at ST1, the peak of the light-receiving element output signal obtained from the A/D conversion circuit 50 is detected. At ST2, the position-detection element output signals A, B that are correspond to the timing of the peak of the light-receiving element output signal detected at ST1 are obtained through the A/D conversion circuits 48, 49. At ST3, the position-detection element output signals A, B obtained at ST2 are calculated so that the position-detection element output calculation result Y=A/(A+B) is obtained. At ST4, conversion processes carried out based upon the obtained calculation result Y and conversion equations preliminarily stored in the memory 57 so as to obtain the amount of displacement of the measuring object. After the conversion processes, the sequence again returns to ST1, and the processes of ST5 are carried out in parallel with each other. The averaging processes of ST5 are carried out so as to improve the measuring precision in the amount of displacement, and the number of times of the processes can be determined by the setting. After the averaging processes have been carried out a set number of times, the amount of displacement of the measuring object can be outputted.

Figure 38:
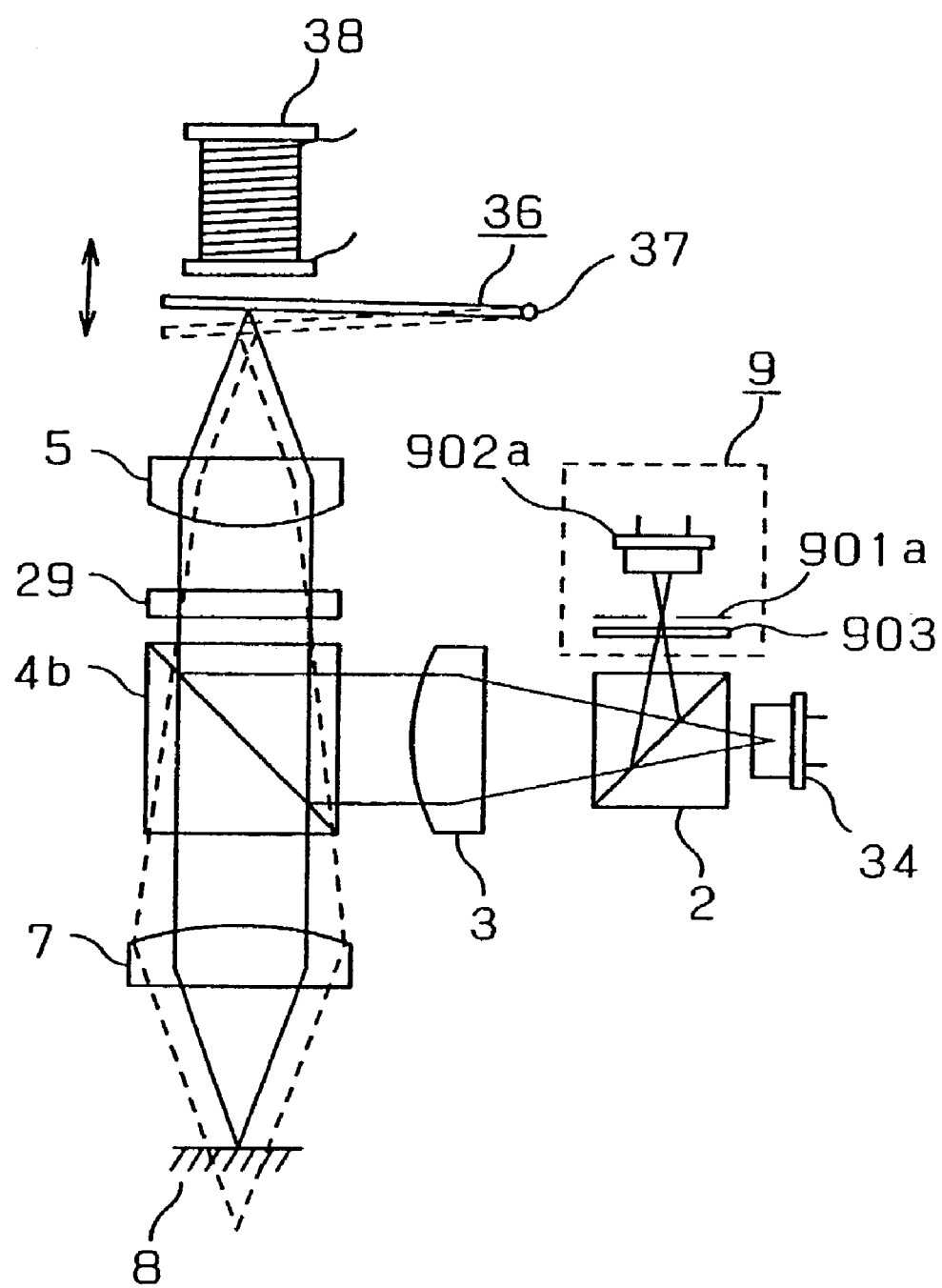
FIG. 38 shows a structure of an optical system in accordance with still another embodiment of the present invention.
Figure 39:
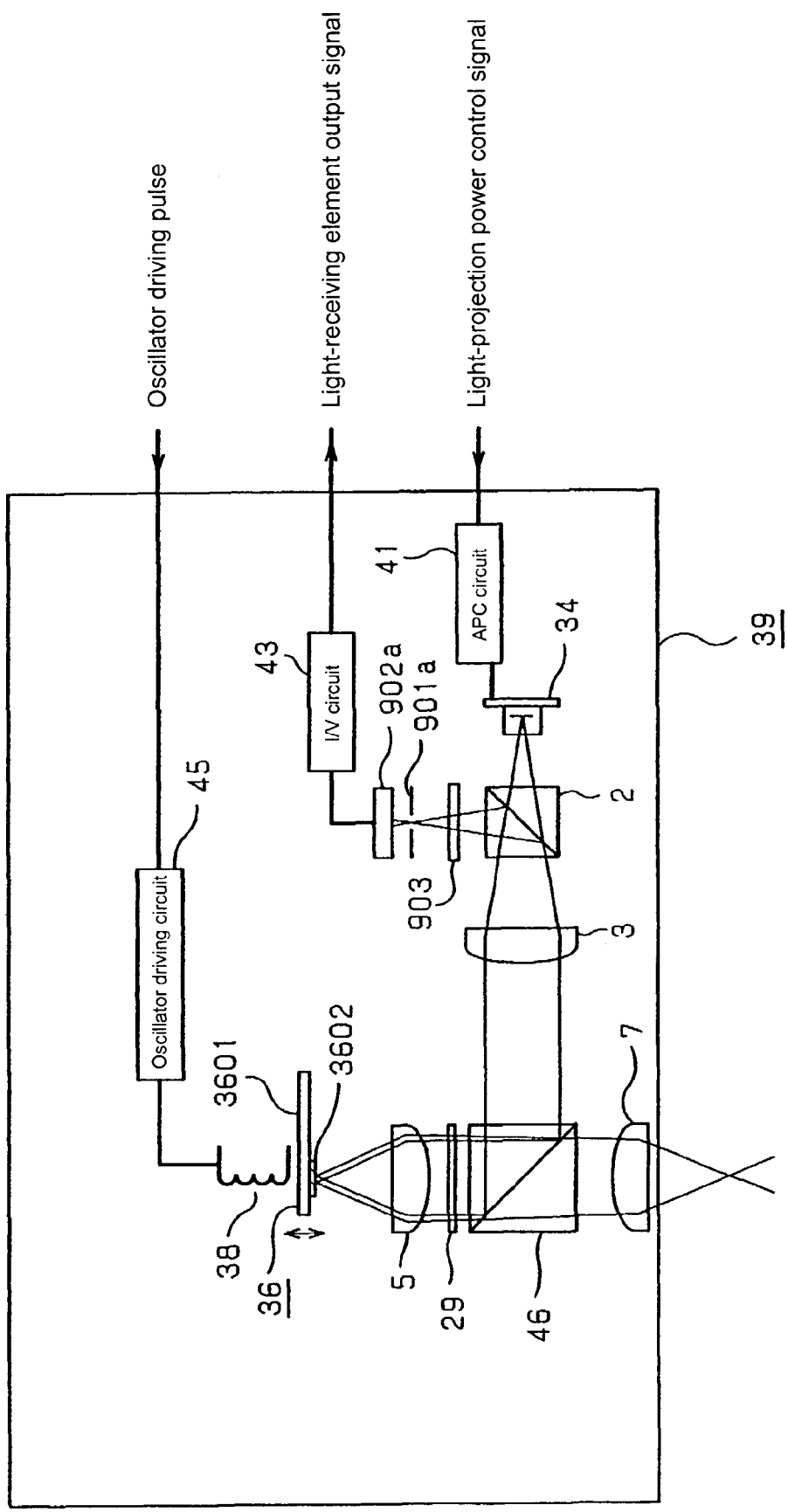
FIG. 39 shows an inner structure of a sensor head in accordance with another embodiment of the present invention.
Figure 40:
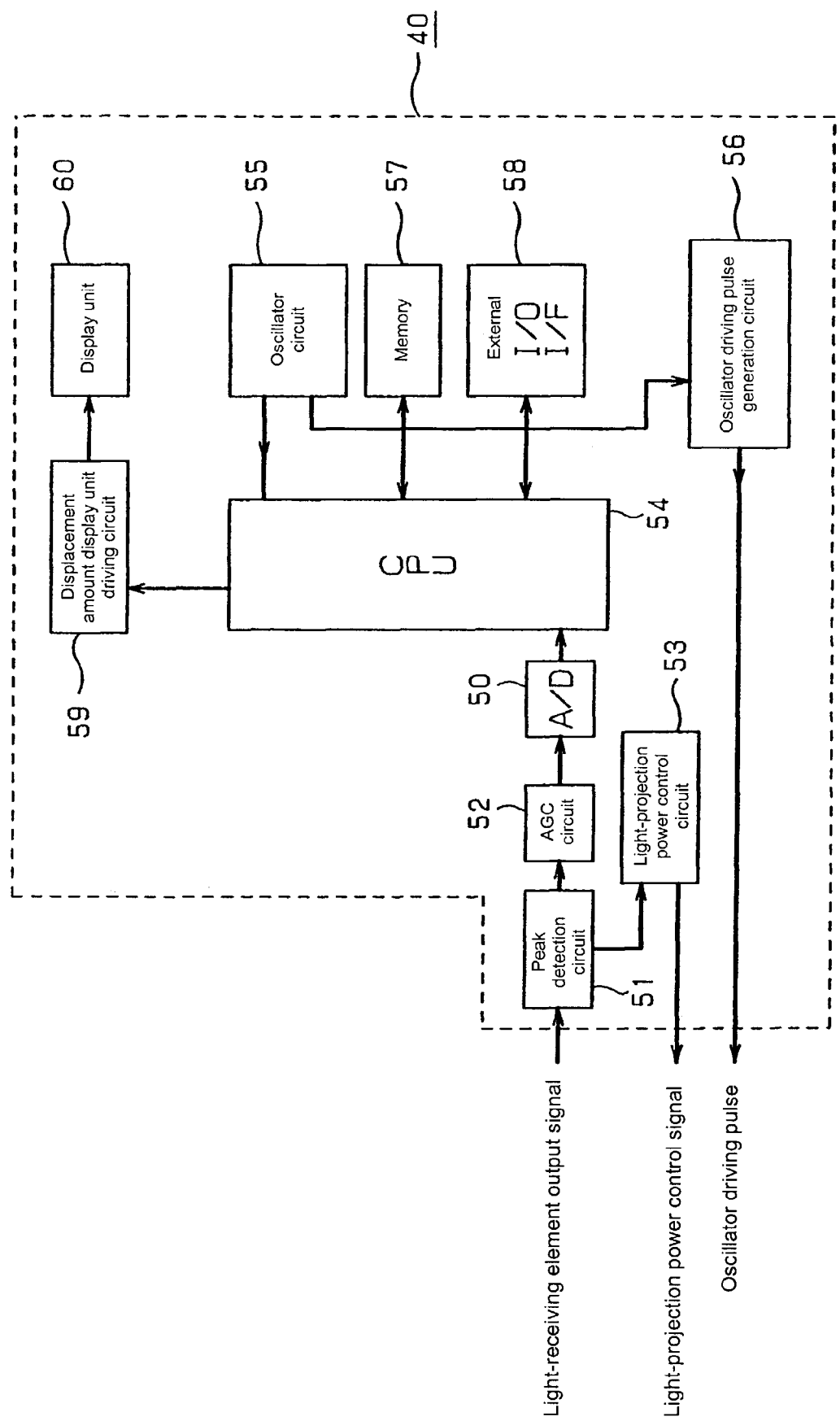
FIG. 40 shows an inner structure of a controller unit that is connected to the sensor head in accordance with the embodiment of the present invention.

The following description will discuss another embodiment in which: an area in which the mirror 3602 is displaced along the light axis direction includes a position at which luminous fluxes released from the red semiconductor laser 34 are converged by the intermediate lens 5, and when the measuring object 8 is located in the effective measuring area, an area in which the reflected luminous fluxes from the measuring object 8 can be converged by the intermediated lens 5 does not include a position at which the luminous fluxes released from the red semiconductor laser 34 are converged by the intermediate lens 5. In this embodiment, the amount of displacement of the mirror 3602 is not measured by using the light-projection unit 30 and the position detection element 32, and supposing that the change in the light path length corresponds to vibration in the form of a sine wave that changes periodically in terms of time, the change in the light path length at the corresponding time is found by calculating the period of time that has elapsed from the time of the generation of return light. In other words, the optical system is arranged as shown in FIG. 38, and this structure corresponds to a structure obtained by omitting the light-projection unit 30 (the, infrared semiconductor laser 35 and the light-converging element 32 for use in displacement-amount measurements on the reflection face) and the position detection element 33 from the structure of FIG. 31. FIG. 39 shows the inner structure of the sensor head, and FIG. 40 shows the inner structure of the controller, with the amplifier for processing the output signal of the position detection element and the A/D conversion circuit being omitted.

Figure 41:
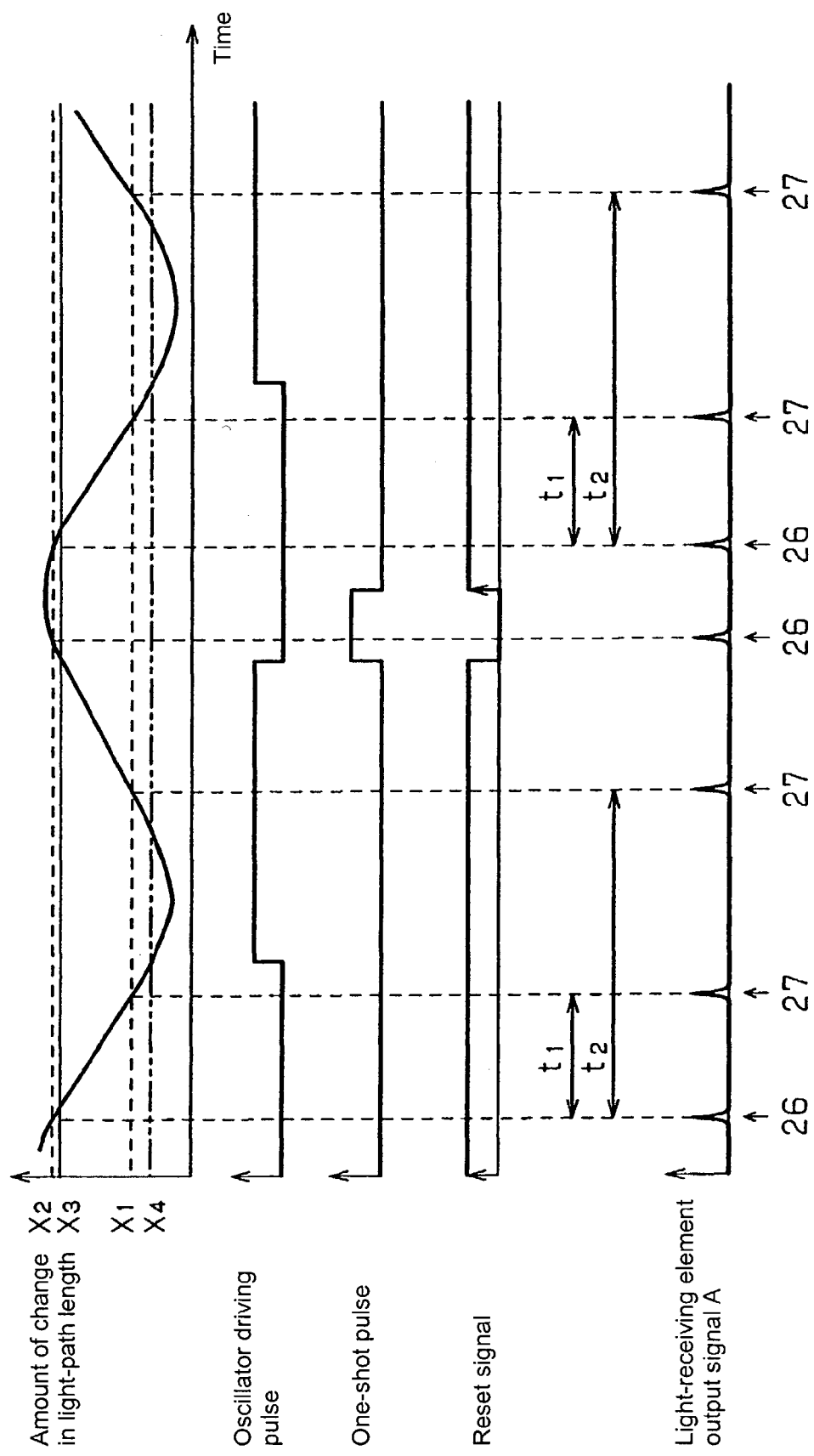
FIG. 41 is a drawing that shows a waveform relating to an output signal of a light-receiving element in accordance with another embodiment of the present invention.

FIG. 41 shows an output signal of the light-receiving element together with a related wave form in accordance with this embodiment. In response to the time at which the irradiation luminous fluxes are converged on the measuring object 8, a pulse-shaped light-receiving element output signal 27 is obtained, and in response to the time at which luminous fluxes released from the red semiconductor laser 34 are converged on the mirror 3602 by the intermediate lens 5, return light is obtained as a pulse-shaped light-receiving element output signal 26. The amount of change in the light path length in the form of a sine wave (the light path length also changes in the form of a sine wave when the mirror 3602 vibrates in the form of a sine wave) is also shown for reference. X1 indicates the amount of change in the light path length when irradiation luminous fluxes are converged on the measuring object 8, X2 indicates the amount of change in the light path length when luminous fluxes released from the red semiconductor laser 34 are converged on the mirror 3602 by the intermediate lens 5 (when return light is generated), X3 indicates the amount of change in the light path length when the irradiation luminous fluxes are converged at the farthest position from the objective lens 7 within the effective measuring area, and X4 indicates the amount of change in the light path length when the irradiation luminous fluxes are converged at the closest position from the objective lens 7 within the effective measuring area.

As indicated by the light-receiving element output signal of FIG. 41, when the mirror 3602 vibrates in the form of a sine wave, output signals derived from return light and the measuring object are respectively obtained in each of the outward and homeward movements. In the case when the output signal derived from return light is used as the reference, only the output signal derived from return light of either of the outward and homeward movements needs to be selected as the reference; therefore, the following description will discuss an example of such a method. FIG. 41 also shows an example of an oscillator driving pulse used for vibrating the mirror 3602 in the form of a sine wave; however, it is not possible to select either of the return lights 26 only by referring to this oscillator driving pulse. Therefore, supposing that the timing in which the oscillator is inverted at a position nearer to X2 for generating return light as shown in the figure is slightly delayed from the timing of the falling edge of the oscillator driving pulse, a one-shot pulse is generated by using this falling edge of the oscillator driving pulse as a trigger, and by inverting this one-shot pulse, a signal, which has a rise between the two return lights 26 of the outward and homeward movements without an output signal 27 derived from light convergence on the measuring object being sandwiched in between, is generated as a reset signal. When the acquiring process of the light-receiving element output signal is started by using this reset signal, the first pulse derived from the return light 26 always forms the reference pulse, and the following two pulses derived from the measuring object form output signals 27. Thus, elapsed times t1 and t2 are measured from the respective reference pulses, and by utilizing the fact that the light path length is changed periodically in terms of time in the form of a sine wave, the amounts of change in the light path length corresponding to t1 and t2 can be found. Consequently, the amount of change ΔX(t) of the measuring object 8 is calculated by, for example, the following conversion equations:

$$\Delta X(t1)=L2(t1)-(t1)-L0$$

$$\Delta X(t2)=L2(t2)-(t1)-L0$$

$$L2(t2)=1/\{1/F-1/L1(t2)\}$$

$$L2(t1)=1/\{1/F-1/L1(t1)\}$$

$$L1(t1)=D+K\cos(\omega t1+\phi 0)$$

$$L1(t2)=D+K\cos(\omega t2+\phi 0)$$

Here, F represents the focal distance of the composite lens, L0 represents the distance between the reference position of the measuring object and the main point on the measuring object side of the composite lens, L1 represents the optical distance between the point at which luminous fluxes released from the semiconductor laser 34 are converged in the vicinity of the mirror 3602 and the main point on the mirror 3602 side of the composite lens, L2 represents the distance between the measuring object 8 (corresponding to the image of the mirror 3602 derived from the composite lens) and the main point on the measuring object side of the composite lens, and D, K, ω and φ0 are constants. The value of ω is found from the period of the oscillator driving pulse, φ0 is found from the equation, $\cos(\omega t1+\phi 0)=\cos(\omega t2+\phi 0)$, and constants D, K can be found by actually displacing the measuring object by a predetermined amount.

Here, with respect to the conversion to the amount of displacement ΔX of the measuring object 8, not limited to this method in the same manner as the method as described above, by actually displacing the measuring object by predetermined amounts, the corresponding position-detection element output calculation results Y are maintained as a list of data, and the amount of displacement may be calculated by carrying out interpolation processes on these data, or a conversion equation may be directed from the list of data of the position-detection element output calculation results by using an appropriate approximation so that the amount of displacement may be calculated by the conversion equation.

Figure 42:
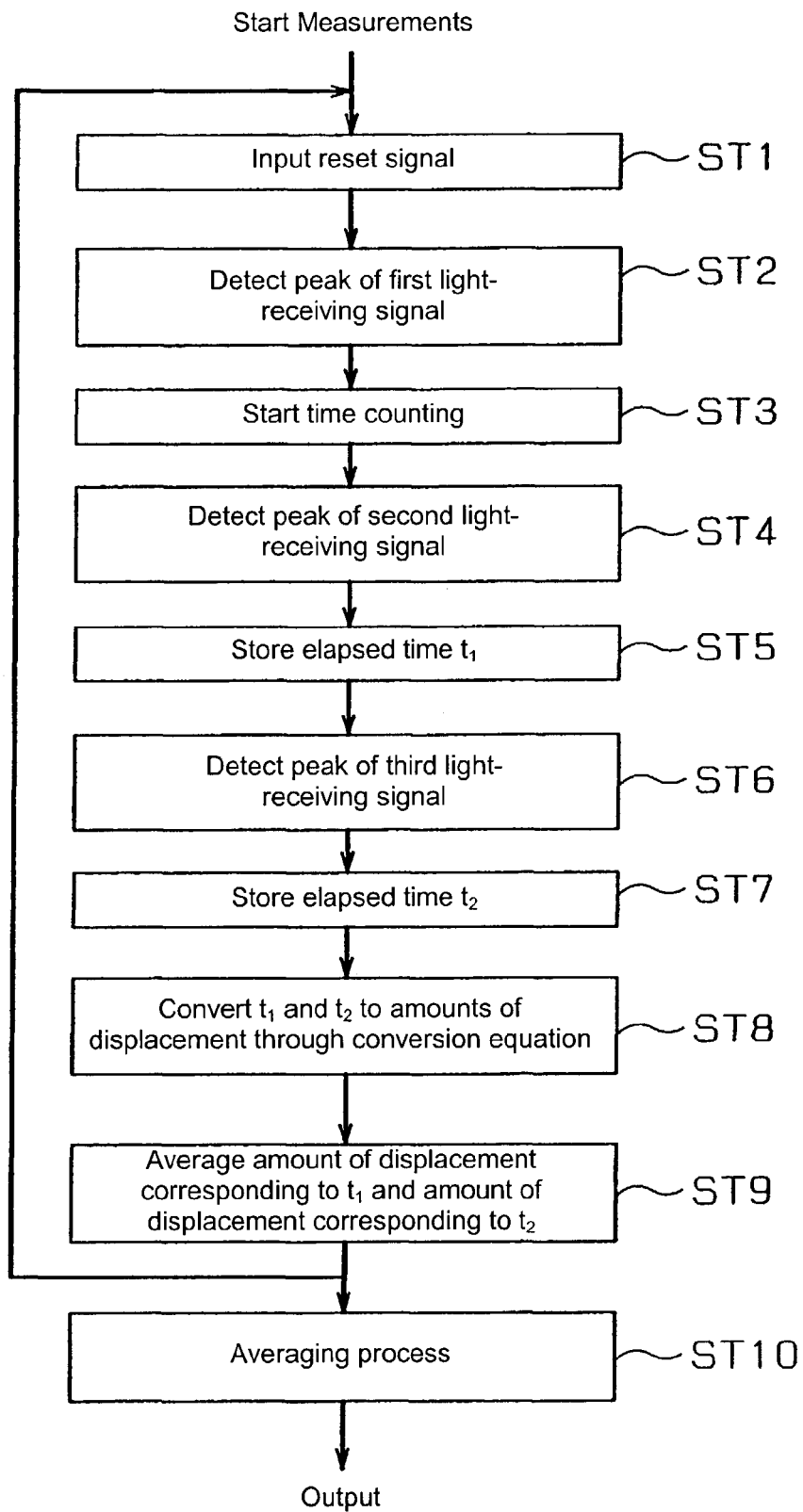
FIG. 42 is a flow chart that shows the sequence of measurements of amount of displacement in accordance with another embodiment of the present invention.

FIG. 42 shows a flow chart that indicates the measuring processes of the amount of displacement in the present embodiment. Processes from ST1 to ST10 are carried out by the CPU. After the start of the measuring processes, at ST1, the sequence first enters a stand-by state waiting for an input of a reset signal. At ST2, the first peak of the light-receiving element output signal that has been obtained from the A/D conversion circuit 50 since the input of the reset signal is detected. At ST3, upon detection of this peak, the time counting process is started. At ST4, the second peak of the second light-receiving element output signal is detected, and at ST5, an elapsed time t1 from the first peak of the light-receiving element output signal detected at ST3 until the time at which the second peak has been obtained is stored in the memory 57. At ST6, the third peak of the light-receiving element output signal is detected, and at ST7, an elapsed time t2 from the first peak of the light-receiving element output signal detected at ST3 until the time at which the third peak has been obtained is stored in the memory 57. At ST8, after the third peak of the light-receiving element output signal has been obtained, t1, t2 and conversion equations used for conversion processes to the amount of displacement of the measuring object are read out from the memory 57 so that conversion processes to the amounts of displacement of the measuring object that respectively correspond to t1 and t2 are carried out. At ST9, the two amounts of displacement of the measuring object, converted at ST9, are averaged. In the same manner as the processes shown in FIG. 37, the averaging processes of ST10 are carried out so as to improve the measuring precision in the amount of displacement, and the number of times of the processes can be determined by the setting or the like.

Figure 43:
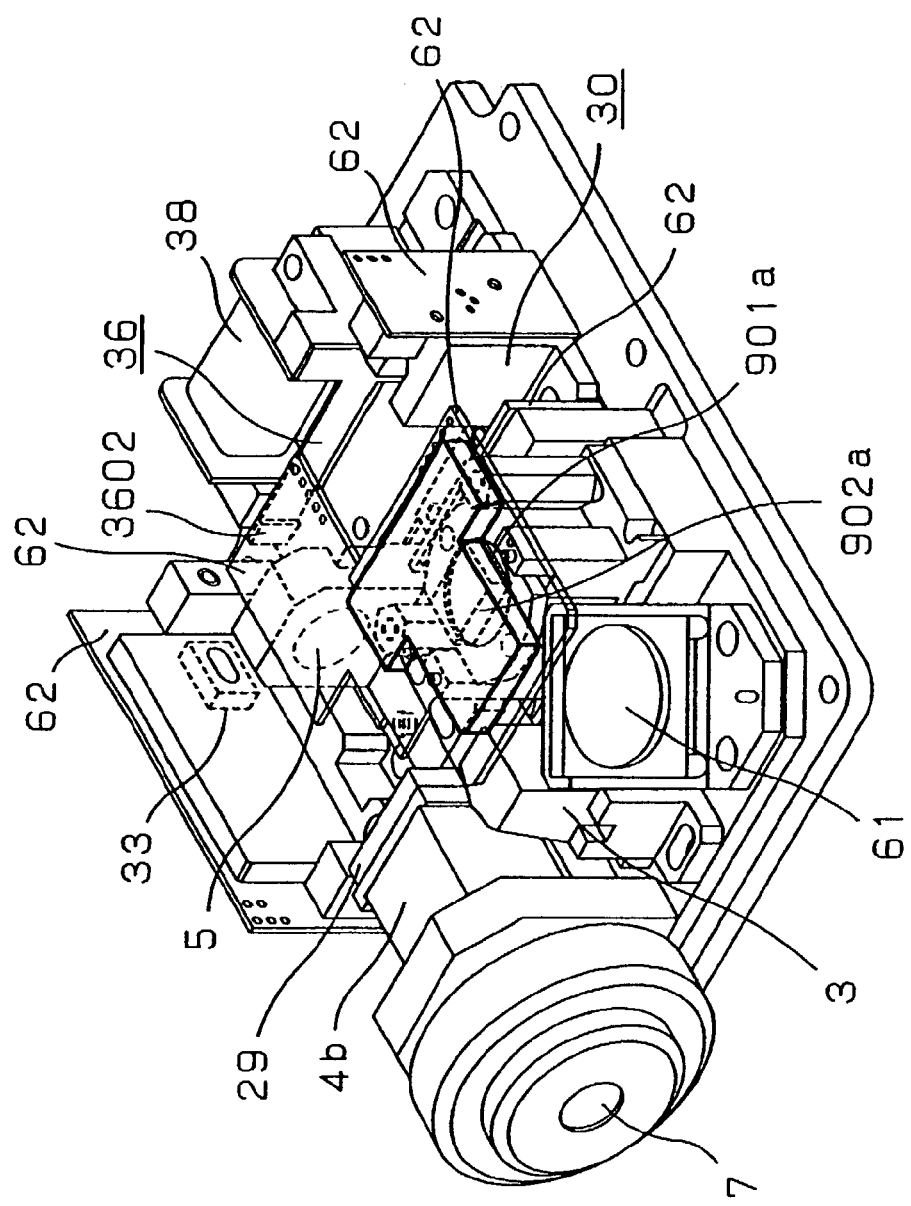
FIG. 43 is a perspective view that shows a censor head in accordance with one embodiment of the present invention.
Figure 44:
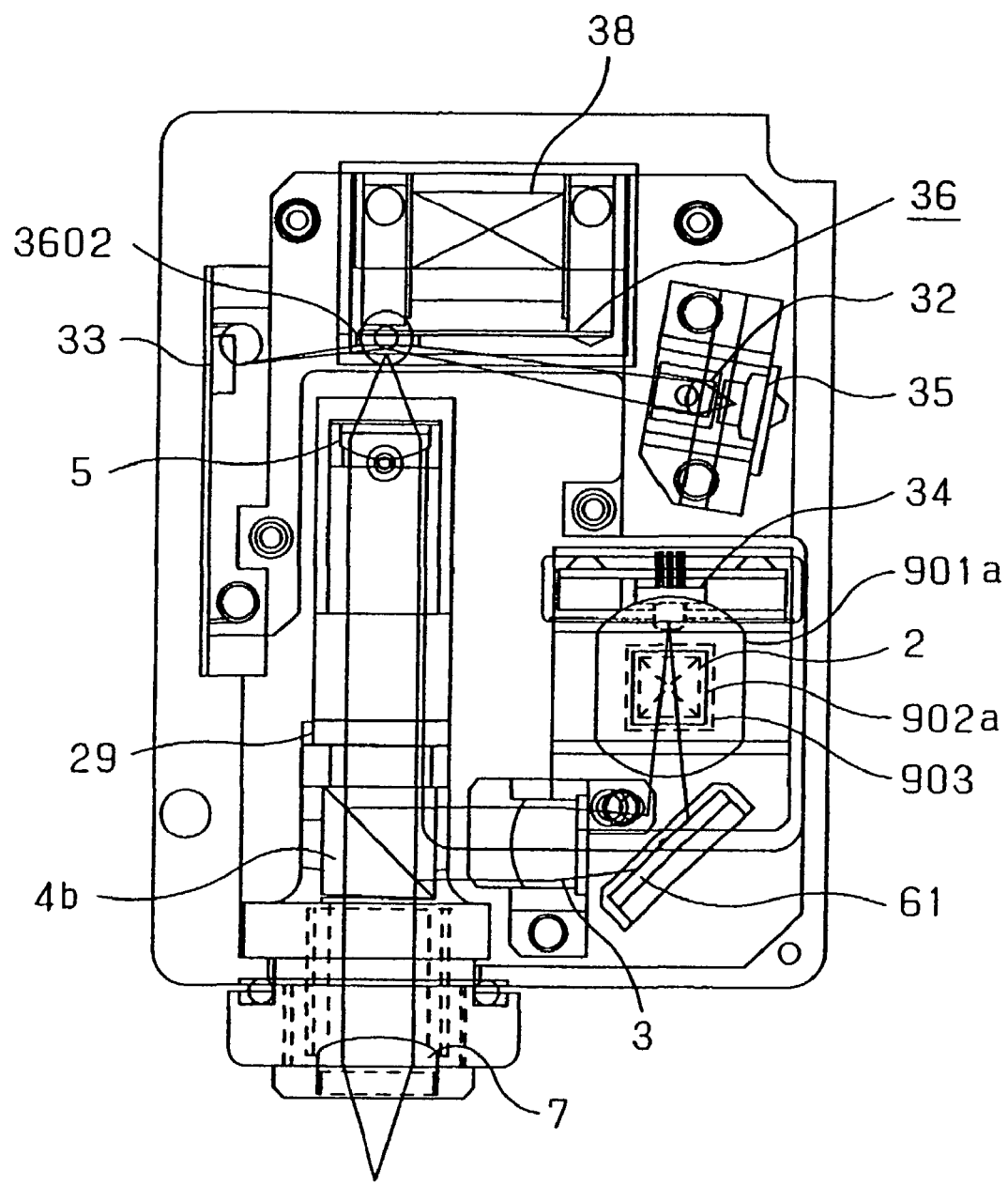
FIG. 44 is a front view of the censor head in accordance with the embodiment of the present invention.
Figure 45:
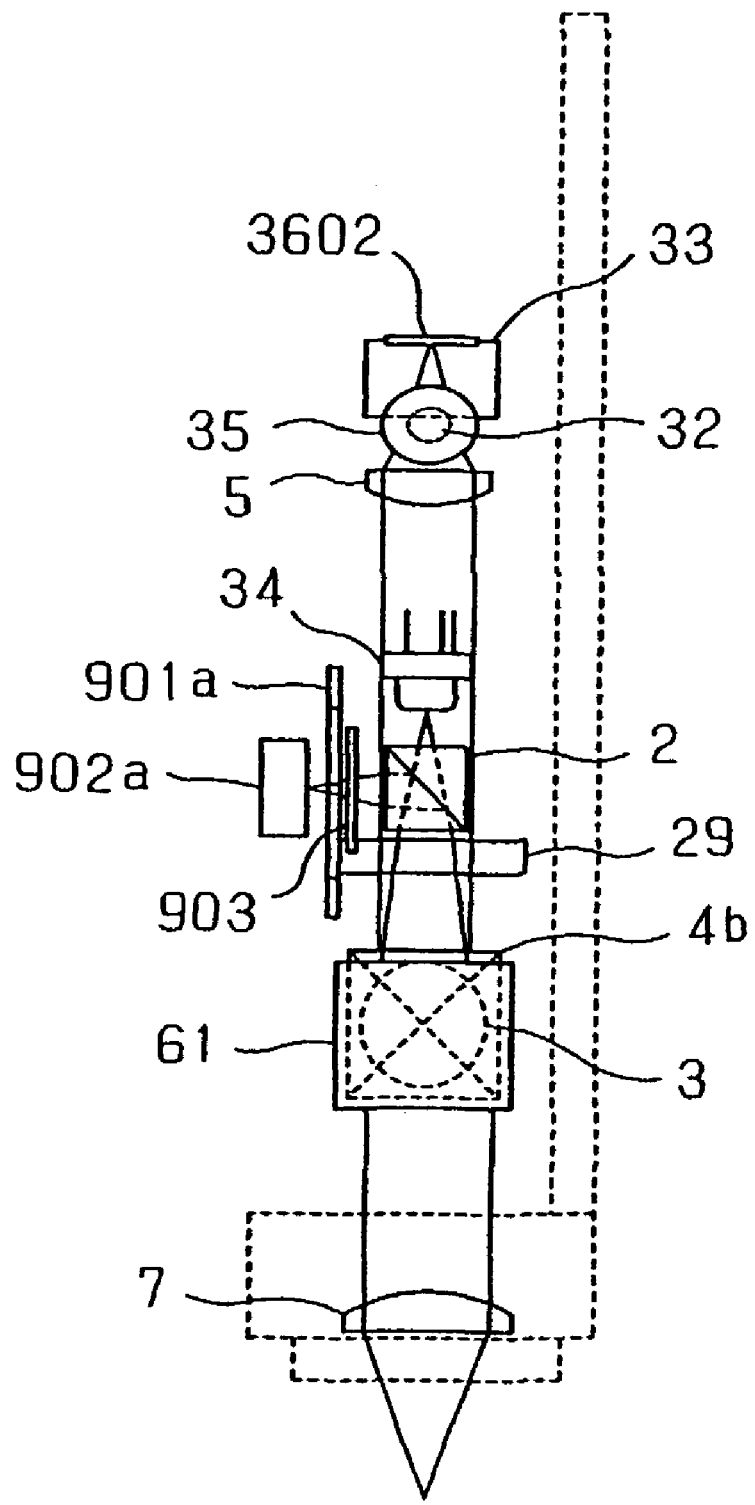
FIG. 45 is a side view of an optical system in the censor head in accordance with the embodiment of the present invention.

FIG. 43 is a perspective view that shows a more specific structure of a censor head. This figure indicates substrates used for circuits 41 to 45 to be installed on the sensor head as reference numeral 62. FIG. 44 shows a front view that relates to this figure, and FIG. 45 shows a side view thereof. However, in FIG. 44, one portion of the members, substrate, and the like is omitted so as to clarify the structure of the optical system, and FIG. 45 shows only the optical system. The structure of the optical system is the same as those of the embodiment shown in FIG. 31, and the same reference numerals as those of FIG. 31 are used. However, a mirror 61 is inserted between the cube half mirror 2 and the lens 3 so as to miniaturize the optical system.

Figure 46:
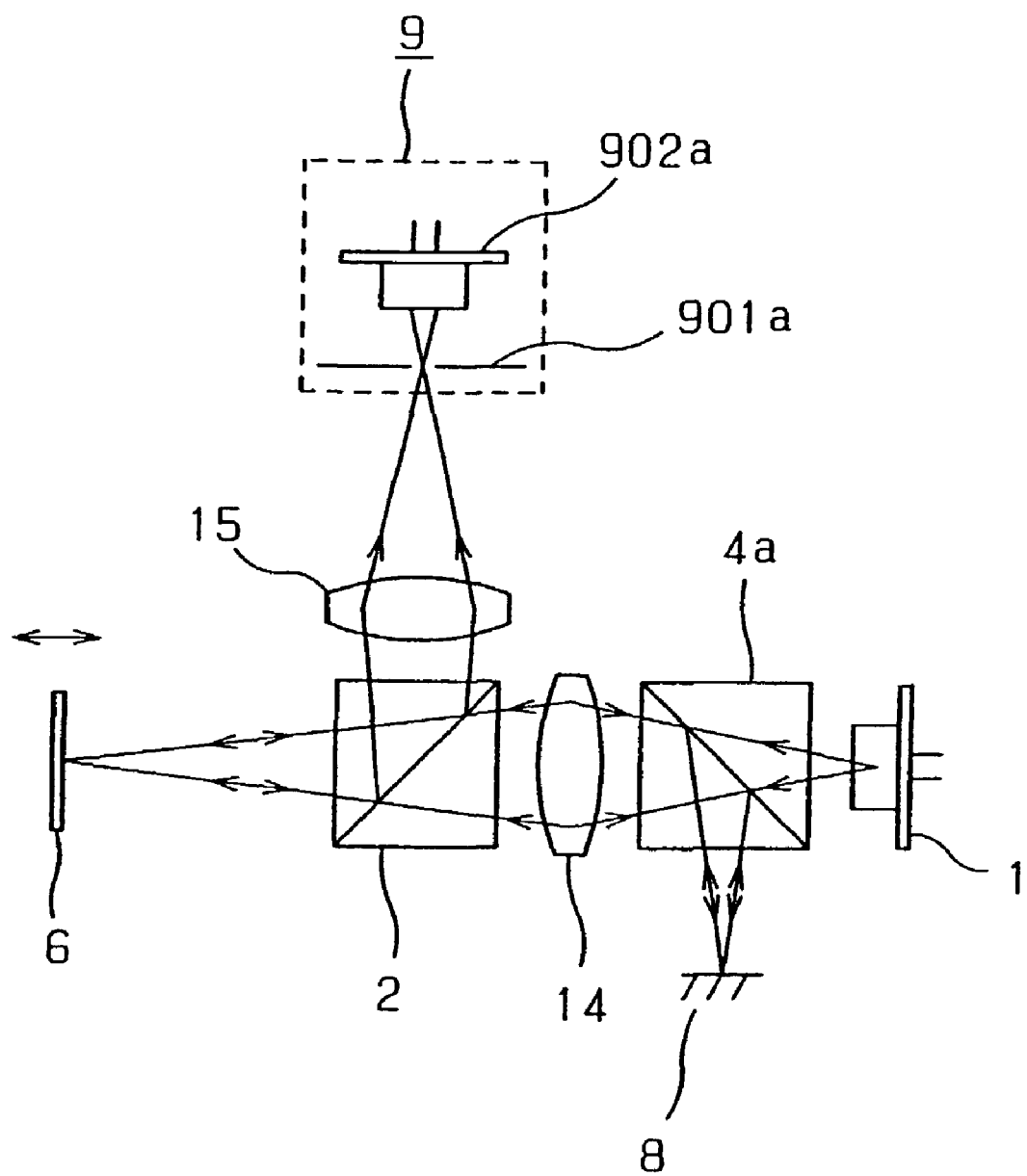
FIG. 46 is a drawing that shows an embodiment relating to a structure of another optical system of the present invention.
Figure 47:
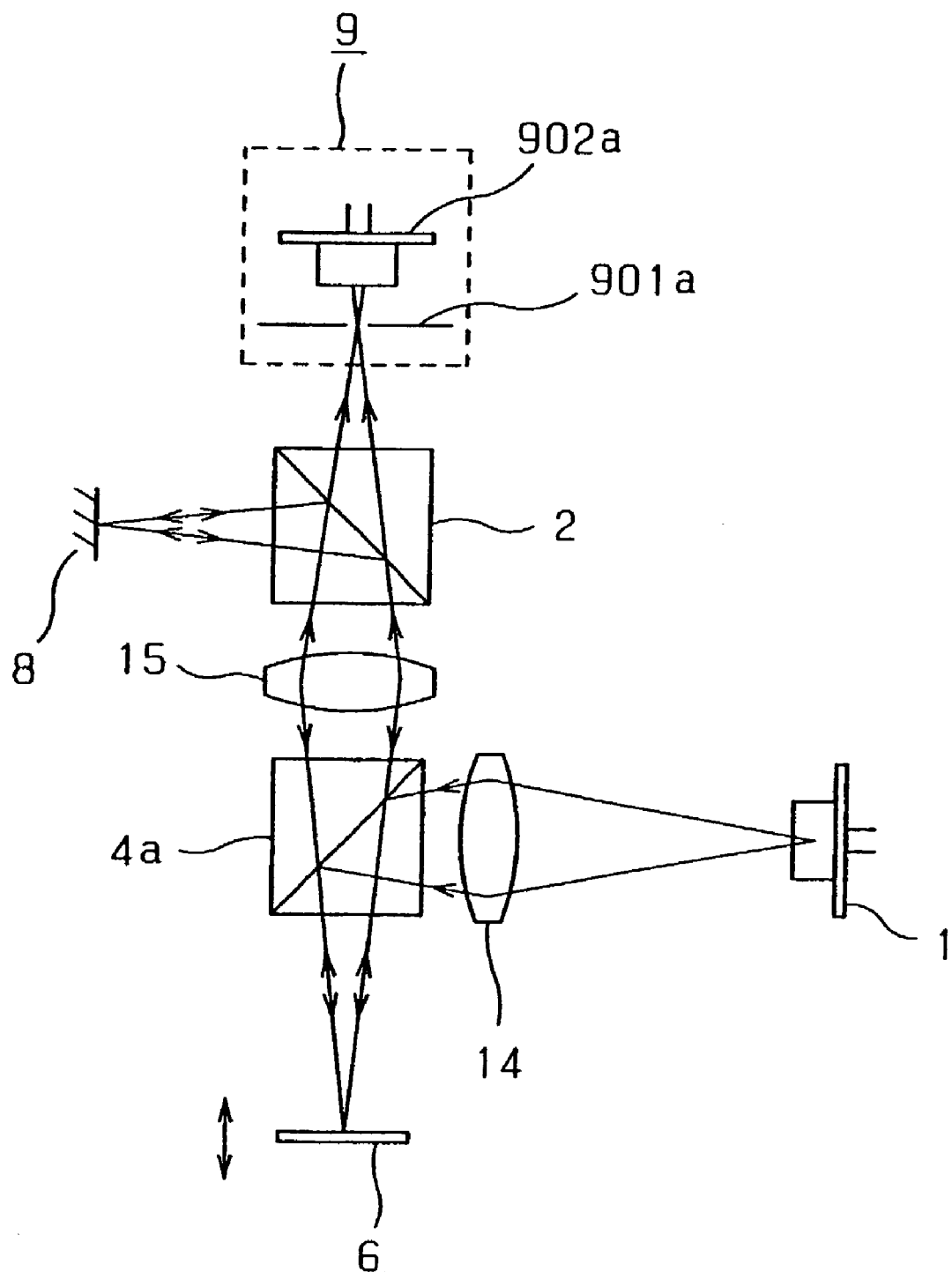
FIG. 47 is a drawing that shows an embodiment relating to a structure of still another optical system of the present invention.
Figure 48:
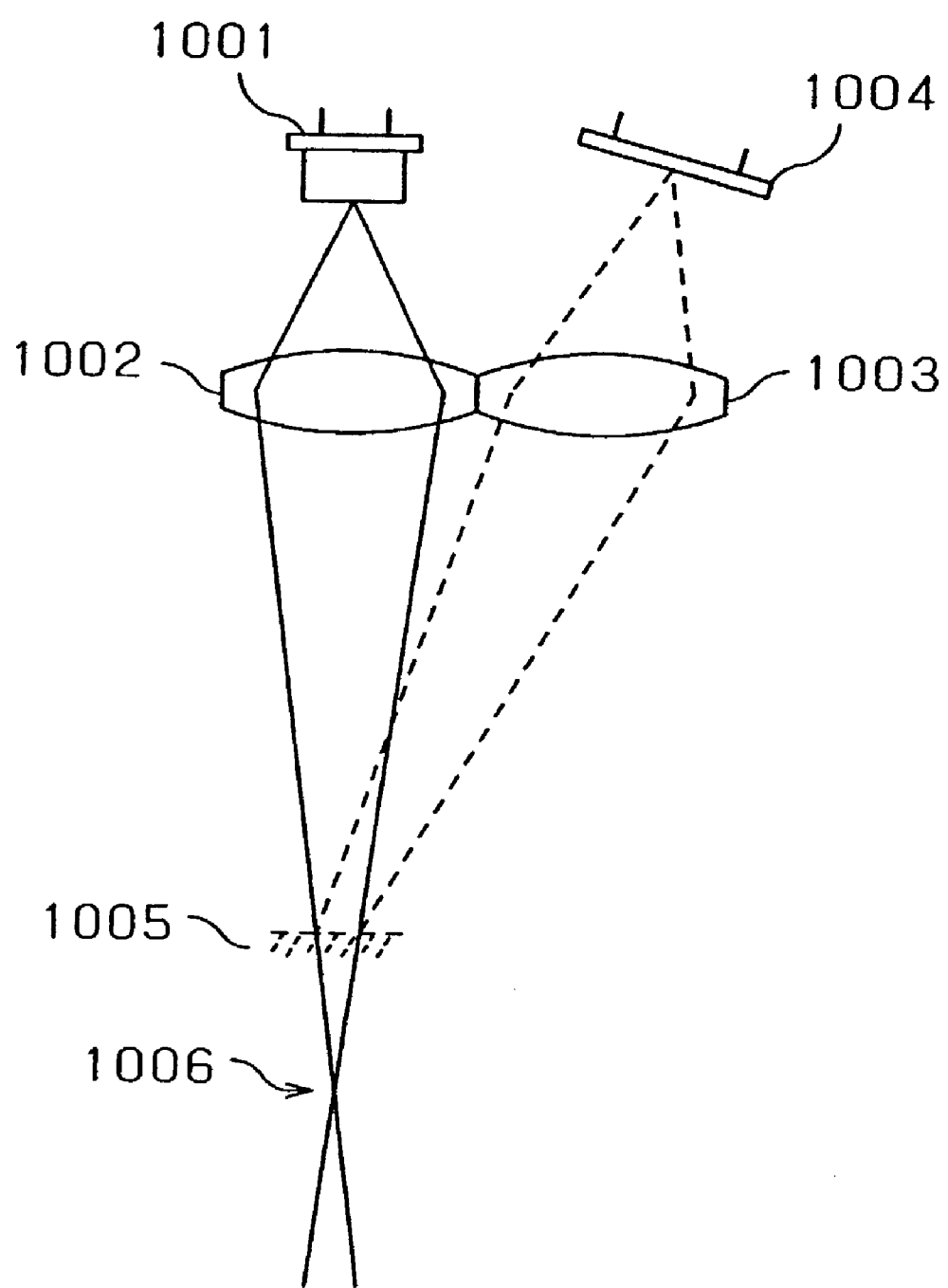
FIG. 48 shows an optical system that is used for conventional displacement measurements in accordance with a triangulation surveying method.

In addition to those as described above, with respect to another embodiment having a different structure of the optical system, an arrangement as shown in FIG. 46 may be used, in which: luminous fluxes released from a light-projection unit (1) are converged on a reflection face (6), and a second light-path control element (2) is placed between the light-projection unit (1) and the first light-converging element (14). In this arrangement, the first light-converging element (14) converges the luminous fluxes released from the light-projection unit (1) on the reflection face (6), and the luminous fluxes reflected by the reflection face (6) are converged on a measuring object (8). Moreover, a similar structure as shown in FIG. 47 may be used, in which: luminous fluxes released from a light-projection unit (1) are converged on a reflection face (6), and a second light-path control element (2) is placed between a light-receiving unit (9) and a second light-converging element (15). In this structure, the second light-converging element (15) converges the luminous fluxes reflected by the reflection face (6) onto the measuring object (8), and also converges the luminous fluxes that are derived from the measuring object (8) and reflected by the reflection face (6) onto the light-receiving unit (9).

In accordance with this invention, measuring processes are carried out based upon the light path length obtained at the time when irradiation luminous fluxes form fine spots on the measuring object; therefore, it is possible to carry out measurements of displacement without being adversely influenced by reflection intensity irregularities in the measuring object. Moreover, the light-converging function is carried out by using a light-converging element that is not moved, and in a separate manner from this, a light-path length sweeping mechanism, which has no light-converging function, but has a function for changing the light-path length, is installed; therefore, it is possible to achieve miniaturization and light weight of this light-path length sweeping mechanism. Thus, it becomes possible to increase the sweeping frequency, and also to provide a displacement sensor which can carry out measurements with high precision in a short measuring time.

What is claimed is:

1. A displacement sensor comprising:
   a light-projection unit;
   a light-receiving unit having a light-shielding mask and a light-receiving element;
   a first light-converging arrangement which converges luminous fluxes released from said light-projection unit on a measuring object;
   a second light-converging arrangement which converges luminous fluxes reflected from said measuring object on said light-receiving unit;
   a first light-path control element which is placed in a projection-light path extending from said light-projection unit to said measuring object and in a receiving-light path extending from said measuring object to said light-receiving unit, and allows a projection-light light axis specified by said first light-converging arrangement and said light-projection unit and a receiving-light light axis specified by said second light converging arrangement and said light-receiving unit, to be coaxially arranged on the measuring object side of the first light-path control element; and
   a light-path length sweeping mechanism which is placed in a light path in which said projection-light light axis and said receiving-light light axis are set coaxially as well as at a position in which the luminous fluxes in said projection-light path and the luminous fluxes in said receiving-light path are set to be non-collimated, and which continuously changes a light-path length from the light-projection unit to the measuring object and a light-path length from the measuring object to the light-receiving unit,
   wherein: said light-shielding mask is placed in a light path from said second light-converging arrangement to said light-receiving element so that, when the position at which luminous fluxes reflected from said measuring object are converged by said second light-converging arrangement, is changed by said light-path length sweeping mechanism, the ratio at which one portion of the reflected luminous fluxes is light-shielded by said light-shielding mask is changed, said light-receiving element being allowed to receive luminous fluxes that have been transmitted through said light-shielding mask so that information with respect to a distance up to the measuring object is obtained based upon the output signal of the light-receiving element that is varied by the operation of said light-path length sweeping mechanism, and
   wherein the light-path length sweeping mechanism comprises:
   a reflection face that is placed perpendicularly to the light axis and allowed to shift along the light-axis direction that has been coaxially set;
   a second light-path control element which directs luminous fluxes released from said light-projection unit to said reflection face, directs luminous fluxes reflected from said reflection face to the measuring object, and also directs luminous fluxes reflected from the measuring object in the reversed direction along the same light path as the light path through which the luminous fluxes have been directed to said measuring object;
   a reflection-face-use light-projection unit which releases luminous fluxes to said reflection face in a direction other than the direction perpendicular to the reflection face; and
   a position detection element which receives luminous fluxes that are released from said reflection-face-use light-projection unit after having been reflected by said reflection face, and
   wherein information with respect to a distance up to the measuring object is obtained based upon an output sianal from said position-detection element and an output signal from said light-receiving unit.

2. The displacement sensor according to claim 1, wherein:
said second light-path control element is operatively arranged between said first light-path control element and said reflection face;
said first light-converging element arrangement comprises a a first light converging element and a second light-converging element;
said second light-converging arrangement is constituted by a third light-converging element and a fourth light-converging element;
said second light-converging element is composed of a single lens or a plurality of lenses that are placed in a light path from said light-projection unit to said reflection face in a concentrated or dispersed manner, with at least one lens being placed in a light path from said light-projection unit to said second light-path control element so that luminous fluxes released from said light-projection unit converge in the vicinity of said reflection face;
said first light-converging element is composed of a single lens or a plurality of lenses that are placed between said reflection face and said measuring object, with at least one lens being placed between said second light-path control element and said measuring object so that luminous fluxes reflected by said reflection face converge toward said measuring object, with luminous fluxes reflected by said measuring object being converged toward said reflection face;
said fourth light-converging element is composed of a single lens or a plurality of lenses that are placed in a light path from said reflection face to said light-receiving unit, with at least one lens being placed in a light path from said second light-path control element to said light-receiving unit so that luminous fluxes that have been reflected by said reflection face after having been reflected by said measuring object converge toward said light-receiving unit.

3. The displacement sensor according to claim 2, wherein said second light-converging element and said fourth light-converging element comprise a third light converging device
which is operatively arranged between said first light-path control element and said second light-path control element.

4. The displacement sensor according to claim 2, wherein said first light-converging element, said second light-converging element and said fourth light-converging element
comprise a fourth light-converging device which is operatively arranged between said second light-path control element and said reflection face.

5. The displacement sensor according to claim 2, wherein said first light-path control element comprises a cube half mirror and wherein said light-projection unit and said light-receiving unit are oriented to face opposite sides of a reflecting surface in the cube half mirror.

6. The displacement sensor according to claim 5, wherein an area in which said reflection face is allowed to shift along the light-axis direction is set so as not to include a position at which luminous fluxes released from said light-projection unit are converged by said second light-converging element.

7. The displacement sensor according to claim 6, wherein:
said second light-converging element comprises a collimate lens and an intermediate lens, with said collimate lens being placed between the light-projection unit and said second light-path control element;
luminous fluxes released from said light-projection unit are made virtually collimated, with said intermediate lens being placed between said second light-path control element and said reflection face so that the luminous fluxes, made virtually collimated, converge in the vicinity of said reflection face; and
said fourth light-converging element is constituted by said intermediate lens and light-receiving lens, with said light-receiving lens being placed between said light-receiving unit and said second light-path control element, so that luminous fluxes reflected from the measuring object are converged on said light-receiving unit.

8. The displacement sensor according to claim 7, wherein:
said collimate lens and said light-receiving lens are prepared as a common lens, and placed between said first light-path control element and said second light-path control element.

9. The displacement sensor according to claim 7, wherein:
said light-projection unit releases plane polarized light,
said second light-path control element is a polarization beam splitter that is placed so that said plane polarized light is set vertically to or in parallel with the incident plane; and
a ¼-wavelength plate with respect to the wavelength of light released from said light-projection unit is placed in a light path through which luminous fluxes released from said polarization beam splitter are directed to said intermediate lens and a light path through which, after having been reflected by said reflection face, luminous fluxes released from said intermediate lens are directed to said polarization beam splitter.

10. The displacement sensor according to claim 5, wherein:
an area in which said reflection face is allowed to shift along the light-axis direction is set so as to include a position at which luminous fluxes released from said light-projection unit are converged by said fourth light-converging element, and
when said measuring object is located inside an effective measuring area, an area in which luminous fluxes reflected from said measuring object can be converged by said first light-converging element is set so as not to include a position at which luminous fluxes released from said light-projection unit are converged by said second light-converging element.

11. The displacement sensor according to claim 10, wherein;
displacement of said reflection face that is allowed to shift along the light-axis direction is given as periodic vibration, said displacement sensor being further provided with:
means which selects one of the output signal obtained when the displacement of said reflection face is in the outward movement and the output signal obtained when the displacement of said reflection face is in the homeward movement, from output signals of said light-receiving element generated when the position of said reflection face and the position at which luminous fluxes released from said light-projection unit are converged by said second light-converging element are coincident with each other, and acquires the resulting signal;
means which measures a period of time until the time at which, when luminous fluxes released from said light-projection unit are converged on said measuring object, an output signal of said light-receiving element is obtained due to the resulting reflected luminous fluxes, referring to the time at which the selected output signal is obtained; and means which obtains information with respect to the distance to the measuring object based upon said measured time.

12. A displacement sensor comprising:

a light-projection unit;

a light-receiving unit;

a first light-converging arrangement which converges luminous fluxes released from said light-projection unit on a measuring object;

a second light-converging arrangement which converges luminous fluxes reflected from said measuring object on said light-receiving unit;

a first light-path control element which is placed in a projection-light path extending from said light-projection unit to said measuring object and in a receiving-light path extending from said measuring object to said light-receiving unit, and allows a projection-light light axis specified by said first light-converging arrangement and said light-projection unit and a receiving-light light axis specified by said second light converging arrangement and said light-receiving unit, to be coaxially arranged on the measuring object side of the first light-path control element; and a light-path length sweeping mechanism which is placed in a light path in which said projection-light light axis and said receiving-light light axis are set coaxially as well as at a positon in which the luminous fluxes in said projection-light path and the luminous fluxes in said receiving-light path are set to be non-collimated, and which continuously changes a light-path length from the light-projection unit to the measuring object and a light-path length from the measuring object to the light-receiving unit, and wherein the first and second light converging elements comprise a single light-converging device that provides the function of both said first light-converging arrangement and said second light-converging arrangement, and wherein said first light-path control element is operatively arranged between said single light-converging device and both said light-projection unit and said light-receiving unit.

13. The displacement sensor according to claim 12, wherein the light receiving unit comprises a light-shielding mask and light-receiving element, and wherein said light-shielding mask is placed in a light path from said second light-converging arrangement to said light-receiving element so that, when the position at which luminous fluxes reflected from said measuring object are converged by said second light-converging arrangement is changed by said light-path length sweeping mechanism, the ratio at which one portion of the reflected luminous fluxes is light-shielded by said light-shielding mask is changed, said light-receiving element being allowed to receive luminous fluxes that have been transmitted through said light-shielding mask so that information with respect to a distance up to the measuring object is obtained based upon the output signal of the light-receiving element that is varied by the operation of said light-path length sweeping mechanism.

14. The displacement sensor according to claim 13, wherein said light-path length sweeping mechanism further comprises:

a reflection face that is placed perpendicularly to the light axis and allowed to shift along the light-axis direction that has been coaxially set, and a second light-path control element which directs luminous fluxes released from said light-projection unit to said reflection face, directs luminous fluxes reflected from said reflection face to the measuring object, and also directs luminous fluxes reflected from the measuring object in the reversed direction along the same light path as the light path through which the luminous fluxes have been directed to said measuring object.

15. The displacement sensor according to claim 14, further comprising:

a reflection-face-use light-projection unit which releases luminous fluxes to said reflection face in a direction other than the direction perpendicular to the reflection face; and a position detection element which receives luminous fluxes that are released from said reflection-face-use light-projection unit after having been reflected by said reflection face, wherein information with respect to a distance up to the measuring object is obtained based upon an output signal from said position-detection element and an output signal from said light-receiving unit.

16. A displacement sensor comprising:

a reflection-face-use light-projection unit which releases luminous fluxes to a reflection face that forms part of a light-path length sweeping mechanism which reflects light from a light projection unit that is directed against a measuring object and is received by a light receiving unit; and a position detection element which receives luminous fluxes that are released from said reflection-face-use light-projection unit after having been reflected by said reflection face, wherein the distance to the measuring object is determined based upon an output signal from said position-detection element and an output signal from said light-receiving unit.

\* \* \* \* \*